(12) United States Patent
Asveren et al.

(10) Patent No.: US 10,841,344 B1
(45) Date of Patent: Nov. 17, 2020

(54) METHODS, SYSTEMS AND APPARATUS FOR EFFICIENT HANDLING OF REGISTRATIONS OF END DEVICES

(71) Applicant: Ribbon Communications Operating Company, Inc., Westford, MA (US)

(72) Inventors: Tolga Asveren, Bordentown, NJ (US); Subhransu S. Nayak, Acton, MA (US); Vijaya Nirmala Chakravarthy, Tyngsboro, MA (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 16/511,619

(22) Filed: Jul. 15, 2019

(51) Int. Cl.
*H04L 29/06* (2006.01)

(52) U.S. Cl.
CPC ...... *H04L 65/1006* (2013.01); *H04L 65/1073* (2013.01); *H04L 65/1076* (2013.01)

(58) Field of Classification Search
CPC ............... H04L 65/00–80; H04L 41/00–20
See application file for complete search history.

(56) References Cited

U.S. PATENT DOCUMENTS

| 2014/0078887 A1* | 3/2014 | Yu | H04L 45/04 370/219 |
| 2014/0258551 A1* | 9/2014 | Ye | H04L 67/14 709/228 |

\* cited by examiner

*Primary Examiner* — Clayton R Williams
(74) *Attorney, Agent, or Firm* — Straub & Straub; Stephen T. Straub; Michael P. Straub

(57) ABSTRACT

The present invention relates to methods and apparatus for efficient handling of registration messages by network equipment. An exemplary embodiment includes the steps of: operating network equipment in a first mode of operation; detecting that a first condition exists, switching the network equipment from said first mode of operation to a second mode of operation, said second mode of operation including: receiving a first initial SIP registration request message destined for a registrar; determining an address of record (AOR) value included in the first initial SIP registration request message; determining whether a matching registration record exists for the determined AOR value included in the first initial SIP registration request message; and when the network equipment determines that a matching registration record exists for the determined AOR value included in the initial SIP registration request message, treating said first initial SIP registration request message as a refresh SIP registration message.

20 Claims, 19 Drawing Sheets

12 

```
1200    /******************************************/
1210    /** MATCHING BASED ON AOR*******/
1220    /******************************************/

1230    total_contexts is a variable used for all contexts matching a particular AoR. It is the
        total number of contexts matching the AoR.

1240    updated is a variable used for each specific context. It indicates whether this context
        instance is already updated.

1250    After switchover
1260    Start a Timer-1
1270    As long as Timer-1 is not expired yet
1280            When a REGISTER is received on a TCP connection (includes TLS as well,
        it runs on top of TCP)

1290                    Try to find all the context based on AoR
1300                    IF found
1310                        IF total_context==0
1320                            total_contexts=number of matching content
1330                        IF updated_context<total_contexts
1340    Update any context with updated==0 with the source IP Address/port of the received
        packet
1350    updated = 1
1360    total_contexts=total_contexts + 1
1370    Treat REGISTER as a refresh request
1380            ELSE
1390                /*Context not found*/
1400                    Treat REGISTER as initial REGISTER request
```

| | |
|---|---|
| 1500 | /******************************************************************/ |
| 1510 | /** SHORT TERM UE POWER OUTAGE/NAT RESTART SCENARIO**/ |
| 1520 | /******************************************************************/ |
| 1530 | Measure initial REGISTER rate periodically and calculate a "normal average" (initial_reg_avg) |
| 1540 | Measure last period initial REGISTER rate (initial_reg_last) |
| 1550 | port_change_factor:   Provisioned percentage value indicating the threshold which should be exceeded to assume that an event causing UEs to use a different port for registrations has occurred. |
| 1560 | Possible events: |
| 1570 | NAT reset/reboot: Refresh REGISTER requests sent by UEs will be interpreted as initial REGISTER requests by SBC because of the source port (and even maybe IP for cases where NAT hosts more than one public IP Address) |
| 1580 | Short Term Power Outage/Manhatten Reboots: UEs will send initial REGISTER requests after reboot causing a registration avalanche |
| 1590 | num_of_updates: A variable used to keep track of how many RCBs in total are updated |
| 1600 | IF (intial_reg_last – initial_reg_avg > initial_reg_avg * port_change_factor) or (port_change_mode == 1) |
| 1610 | /*port_change_mode started or already in that mode*/ |
| 1620 | port_change_mode =1 |
| 1630 | num_of_existing_RCB = number of all current RCBs |
| 1640 | Find RCBs based on AoR (and optionally on IP) |
| 1650 | IF (a match is found) and (is not already marked as "updated") |
| 1660 | Update the RCB IP/port information and mark it as "updated" |
| 1670 | num_of_updates++ |
| 1680 | ELSE |
| 1690 | /*No match to an existing RCB*/ |
| 1700 | Treat as initial REGISTER |
| 1710 | /*Periodic measurement of REGISTER rate continues but it is not used to update the average in port_change_mode*/ |
| 1720 | IF (number_of_updates == number_of_existing_RCBs) or (initial_reg_last – initial_reg_avg <= initial_reg_avg * port_change_factor) |
| 1730 | /*Exit port_change_mode*/ |
| 1740 | port_change_mode = 0 |

FIGURE 13

```
1800    /*************************************************************/
1810    /LONG TERM UE POWER OUTAGE SCENARIO/
1820    /*************************************************************/

1830    Measure refresh REGISTER rate periodically and calculate a "normal_average"
        (refresh_reg_avg) /* or alternatively use existing negotiated expiration values to
        calculate*/

1840    IF (refresh_reg_last – refresh_reg_avg < refresh_reg_avg *
        long_term_power_outage_factor) or (long_term_power_outage_mode == 1)
1850    /*Observed refresh REGISTER rate is significantly lower than the average*/
1860    /*or this check could be based on rate of registration expires*/
1870    long_term_power_outage_mode = 1
1880    Keep existing RCBs even "inactive", don't purge them until expiry from registrar
perspective (i.e., connection between network equipment device and registrar expires)
1890    Find RCBs based on AoR (and optionally on IP)
1900                IF (a match is found) and (is not already marked as "updated)
1910    Update the RCB IP/port information and mark it as "updated"
1920    num_of_updates++
1930                ELSE
1940                    /*No match to an existing RCB*/
1950                    Treat as initial REGISTER
1960    IF (number_of_updates == number_of_existing_RCBs)
1970    /*Exit mode*/
```

FIGURE 14

METHODS, SYSTEMS AND APPARATUS FOR EFFICIENT HANDLING OF REGISTRATIONS OF END DEVICES

FIELD OF INVENTION

The present invention relates to communications methods, systems and apparatus for minimizing the impact on services provided to end user equipment devices during failover of network equipment, power outages affecting user devices and/or resets of network address translation devices. The present invention also relates to protecting communications systems from various types of attacks and minimizing failover impacts through throttling traffic toward registrars after failover of network equipment, power outages affecting user devices and/or resets of network address translation devices.

BACKGROUND

In communications networks, network equipment, e.g., Session Border Controllers, interfacing directly or through Network Address Translation (NAT) devices with end devices also sometimes referred to herein as user equipment devices or communications end devices, e.g., user equipment including for example phones, computers, laptops, mobile devices, smartphones, Internet Protocol telephones, cell phones, Voice Over Internet Protocol (VOIP) devices, etc. are typically implemented in a redundant manner, e.g., n+k, to provide resiliency in case of a network equipment failure. It is desirable that this failover happens in a way limiting or minimizing the impact on services provided to the user equipment. In communication networks which support Session Initiation Protocol (SIP), user equipment devices (UEs) register with the network before they can place or receive calls. During registration a user device sends a registration request to a registration entity that registers the user device with the network.

In some cases, a single address of record is used for each end device. However, SIP allows multiple registrations for the same address of record (AOR). This means that a user may operate and register multiple devices, e.g., such as a smartphone and a tablet device, using the same address of record (AOR). In simple terms an AOR is a like a username that is assigned to a SIP entity without regard to the device or devices that username might be used with. When a user sends a registration request from a device, the AOR corresponding to the user is specified in the TO header of the registration request. While a specified AOR corresponds to the user, the AOR does not specify the device or devices currently using that AOR. For example a user can use one single AOR to register multiple devices including, e.g., a smartphone, a SIP desk telephone, a PC, or a tablet device. The inclusion of an AOR in the contact header of registration requests or INVITE signals allows a user to associate one or more devices to a single AOR by using a different IP address or port number for each device. From the perspective of the receiving device the IP address and/or port number can be used in conjunction with the AOR to identify and/or correlate a service request to a registration instance of the AOR.

In communications system deployment models in which Transmission Control Protocol (TCP) is used as a transport protocol between network equipment and end devices and where Session Initiation Protocol (SIP) is used as the signaling protocol, network equipment such as for example session border controllers are deployed between the end devices and the Registrar. The network equipment devices provide protection from various types of attacks and also throttle traffic directed toward the Registrar.

Throttling of traffic is necessary because Registrars need to perform a non-negligible amount of processing for each SIP REGISTER request and the REGISTER message rate the Registrars can support is limited. At the same time, exchanging REGISTER request/responses is essential for end devices so that service connectivity to/from the end devices is probed and any failure is detected in a minimum amount of time. These two requirements are in conflict with each other: the REGISTER rate should be high between the end device and the network equipment and low between the network equipment and the Registrar. This dilemma is resolved by network equipment responding to most of the REGISTER requests sent by the end device locally and relaying REGISTER messages toward the Registrar only if the expiration time from the Registrar perspective is close enough.

TCP is a stateful protocol relying on sequence numbers (SEQ) to detect/retransmit lost/delayed packets. Synchronizing TCP state across active/standby member devices of a network equipment redundancy cluster introduces issues and problems such as requiring frequent updates and therefore is not implemented/used in many networks.

Not synchronizing TCP SEQ numbers introduces issues after a switchover. The TCP connection established before switchover is not present from the network equipment perspective but the TCP connection still exists from the end device perspective. After network switchover, the first REGISTER request sent by the end device is not matched to an existing TCP connection on the newly activated network equipment. This eventually leads to the end device becoming aware of the lost TCP connection and the end device would then establish a new TCP connection and send an initial REGISTER request to the Registrar via the newly activated network equipment. This initial REGISTER request would be sent by using the same Internet Protocol address but with a different port number compared to the TCP connection established before the network equipment switchover as the selection of client source port for a new TCP connection is usually ephemeral.

An initial REGISTER request is relayed by network equipment device to the Registrar as it creates a new Address of Record (AOR) (AOR being the SIP identity construct used by end device) context. Therefore a high rate of REGISTER requests would be received by the Registrar after a network equipment switchover which can overwhelm the Registrar.

Additionally, when a network address translation device resets or there is a short term power outage affecting a number of user equipment devices, there will be an excessive number of initial Register requests from the user equipment devices before the existing user equipment/network equipment registrations expire. Once again resulting in a situation which can overwhelm the Registrar if all of the initial Register requests are relayed to the Registrar and also affect the service provided to the UE devices.

Furthermore, under some conditions, e.g., a power outage affecting a large number of user equipment devices (e.g., entire business or geographical area) can result in excessive registration expiry between the user equipment/network equipment or a low refresh REGISTER rate compared to an average refresh REGISTER rate which in turn can result in a situation which can overwhelm the Registrar if all of the initial Register requests are relayed to the Registrar. In such a situation when the Registrar is overwhelmed with an avalanche of initial registrar requests it affects the registrars ability to provide services the UE devices.

From the foregoing it is apparent that there is a need for new and/or improved methods, system and apparatus that can provide a technological solution of how to effectively handle registration messages by network equipment positioned between end devices and a registrar after various events such as for example switchover from a first network equipment device to a second network equipment device upon the first network equipment device's failure, power outages affecting end devices being serviced by the network equipment device and resets of Network Address Translation devices position between the end devices and the network equipment so as to avoid the registrar being overwhelmed. It is also desirable for new and/or improved methods that can prevent or minimize the negative effects of registration request avalanches resulting from power failures, NAT device resets/reboots and network equipment switchovers. There is also a need for new and improved methods, systems and apparatus for adjusting procedures for network equipment throttling of registration requests so as to provide efficient handling and management of registration requests while also limiting the impact on services provided to end devices and/or also providing protection to registrars so that they are not overwhelmed.

SUMMARY

The present invention is directed to various features relating to communications methods, systems and apparatus for handling of registration messages directed to a registrar from end devices via a network equipment device. Various embodiments of the present invention, address one or more of the problems described above.

Various embodiments of the present invention minimize the impact on services provided to end user equipment devices during failover of network equipment, power outages affecting user devices and/or resets of network address translation devices. This is achieved by detecting one or more of the aforementioned conditions and entering into a special mode of operation wherein instead of the network equipment device relaying all initial registration requests received, the network equipment device relays initial registration requests that it cannot match to an existing registration record. Furthermore, the initial registration requests that it can match to an existing registration record are treated by the network equipment device as refresh registration request messages which are handled locally at the network equipment device and are not relayed to registrar. These procedures avoid overwhelming the registrar when a large number of registration requests come in due to the loss of TCP connections resulting from the aforementioned conditions. In doing so, the present invention protects communications systems from various types of attacks and minimizes failover impacts through throttling traffic toward registrars after failover of network equipment, power outages affecting user devices and/or resets of network address translation devices. This is possible because the various embodiments of the invention are able to match incoming initial registration messages, e.g., initial SIP registration messages, to existing registrations from the same address of record or optionally address of record and source IP address which have not expired at the registrar because of the longer expiration times of registration connections between the network equipment device and the registrar.

An exemplary method in accordance with an embodiment of the present invention includes the steps of: operating a first network equipment device in a first mode of operation; monitoring, at the first network equipment device, for a first condition; when said first network equipment device detects that said first condition exists, switching the first network equipment device from said first mode of operation to a second mode of operation, said second mode of operation including: receiving, by the first network equipment device, a first initial SIP registration request message destined for a registrar; determining, by the first network equipment device, an address of record value included in the first initial SIP registration request message; determining, by the first network equipment device, whether or not a matching registration record exists for the determined address of record value included in the first initial SIP registration request message; and when the network equipment device determines that a matching registration record exists for the determined address of record value included in the initial SIP registration request message, treating, by the first network equipment device, said first initial SIP registration request message as a refresh SIP registration message.

In some embodiments, the first network equipment device is a first Session Border Controller positioned between a first user equipment device and the registrar, said first initial SIP registration request message being received from the first user equipment device over a TCP connection established in response to a TCP reset message transmitted to the first user equipment device from the first Session Border Controller.

In some embodiments, prior to receiving said first initial SIP registration request message at the first network equipment device transmitting said TCP reset message to the first user equipment device in response to receiving a first refresh SIP registration message from the first user equipment device over a second TCP connection while operating in said second mode of operation.

In some embodiments, the first network equipment device determines that a matching registration record does not exist for the determined address of record value included in the first initial SIP registration request message under the following conditions: (i) no existing registration record in the set of existing registration records includes the determined address of record value included in the first initial SIP registration request message, (ii) multiple existing registration records in the set of registration records include the same address of record as the determined address of record value included in the first initial SIP registration message but said multiple existing registration records do not include a source IP address matching a source IP address included in the first initial SIP registration request message, (iii) multiple existing registration records in the set of registration records include the same address of record and source IP address as the determined address of record value and the source IP address included in the first initial SIP registration message but do not include a source port number which matches a source port number included in the first initial SIP registration request message; and wherein said second mode of operation further includes: when said first network equipment device determines that a matching registration record does not exist for the determined address of record value included in the first initial SIP registration request message: (i) creating a new registration record for the determined address of record value included in the first initial SIP registration request message, and (ii) relaying the first initial SIP registration request message to the registrar.

In some embodiments, the step of relaying the first initial SIP registration request message to the registrar includes generating a new initial SIP registration request message based on the received first initial SIP registration request message and transmitting the new initial SIP registration request message to the SIP registrar.

In some embodiments, the first network equipment device is a session border controller operating in a Session Initiation Protocol back to back user agent configuration and positioned between a plurality of end devices and a SIP registrar (e.g., SIP Application Server that provides SIP registration services).

In various embodiments, the first condition is a condition indicative of a network equipment device having failed, one or more NAT devices or NAPT devices having reset, or a power outage affecting a plurality of end devices.

In some embodiments, the method further includes that the first network equipment device perform the following additional steps while operating in said second mode of operation: receiving, by the first network equipment device, additional first initial SIP registration request messages destined for a registrar; determining, by the first network equipment device, an address of record value included in each of the additional first initial SIP registration request messages; determining, by the first network equipment device, whether or not a matching registration record exists for each of the determined address of record values included in the corresponding additional first initial SIP registration request message; and when the network equipment device determines that a matching registration record exists for the determined address of record value included in the additional initial SIP registration request message, treating, by the first network equipment device, said additional first initial SIP registration request message as a refresh SIP registration message.

In some method embodiments, the step of determining whether or not a registration record exists for the determined address of record value includes: searching, by the first network equipment device, a set of registration records of existing registrations for one or more existing registration records that include an address of record value which matches the determined address of record value included in the first initial SIP registration request message; and determining that a registration record exists for the determined address of record value when the searching identifies in the set of registration records of existing registrations a single existing record that includes the address of record value which matches the determined address of record value included in the first initial SIP registration request message. In some such embodiments, the step of determining whether or not a registration record exists for the determined address of record value further includes: when more than one existing registration record in the set of existing recordation records includes the address of record value included in the first initial registration request message: determining whether a single existing record from the set of registration records of existing registrations includes an address of record value and a source IP address which matches the address of record value and a source IP address included in the first initial SIP registration request message; and when a single existing record from the set of registration records of existing registrations is determined to include the address of record value and the source IP address included in the first initial SIP registration request message determining that a registration record exists for the determined address of record value.

In some embodiments, the method further includes the steps of: identifying, by the first network equipment device, a source Internet Protocol (IP) address and a port number from the received first initial SIP registration request message; updating a source IP address and a port number included in the identified existing registration record with the matching address of record value to be the identified source IP address and port number from the received first initial SIP registration request message.

In some embodiments, the method includes the additional step of storing in each existing registration record that is updated information indicating that the registration record has been updated.

In some embodiments, the first mode of operation is a standby mode of operation; the second mode of operation is an active mode of operation; and the first condition is a condition indicative of a failure of another network equipment device.

In some embodiments of the method, the condition indicative of a failure of another network equipment device is the failure to receive a heartbeat signal from said another network equipment device.

In some embodiments, the second mode of operation further includes: monitoring, at the first network equipment device, for a second condition; and when said first network equipment device detects that the second condition exists switching to a third mode of operation, said third mode of operation including: relaying additional received initial SIP registration request messages destined for the registrar to the registrar without determining whether or not a matching registration record exists for the determined address of record value of the additional received initial SIP registration request messages.

In some embodiments, operating in said second mode of operation further includes the steps of: starting a second mode of operation duration timer, said second mode of operation duration timer having a first expiration time; and said second condition includes the expiration of the second mode of operation duration timer or completion of updating a first threshold number of registration records of the set of existing registration records.

In various embodiments, the first threshold number is the number of registration records in the set of exiting registration records at the time the first network equipment device switches from the first mode of operation to the second mode of operation.

In some embodiments, the method further comprises the step of determining, by the first network equipment device, the first expiration time based on one or more of the expiry times included in the registration records of the set of existing registration records.

In some embodiments, operating the first network equipment device, in said second mode of operation further includes the steps of: instructing packet level policers used to gate or restrict packet traffic flow to the first network equipment device from unknown Internet Protocol address and port number pairs to increase the number of packets allowed to be pass the policer.

In some embodiments, operating in said third mode of operation further includes: instructing, by the first network equipment device, packet level policers used to gate or restrict packet traffic flow to the first network equipment device from unknown Internet Protocol address and port number pairs to decrease the number of packets allowed to be pass the policer.

In some embodiments, the operation of treating the first initial SIP registration request message as a refresh SIP registration message includes: resetting a refresh registration expiry timer for the determined address of record registration; and responding to the first initial SIP registration request message without relaying the first initial SIP registration request message to the registrar.

In some embodiments, the operating the first network equipment device in the second mode of operation further includes: sending, by the first network equipment device, a challenge (e.g., SIP 4XX message including challenge) to the received first initial SIP registration request message after identifying an existing registration record including an address of record value which matches the address of record value included in the first initial SIP registration request, said challenge being included in said existing registration record including the address of record value matching the address of record value included in the first SIP registration request; and verifying the response to the challenge based on information (e.g., credentials) included in the existing registration record including an address of record value which matches the address of record value included in the first initial SIP registration request.

In some such embodiments, the challenge and information used to verify the response to the challenge (e.g., credentials) are stored in the existing registration record with the address of record value matching the address of record value included in the first initial SIP registration request message before said first network equipment device switches from said first mode of operation to said second mode of operation.

In some embodiments, the set of existing registration records are based upon registration records created by a second network equipment device prior to said first network equipment device switching from said first mode of operation to said second mode of operation, said set of existing registration records not including: (i) TCP sequence numbers, or (ii) TCP sequence numbers synchronized with the TCP sequence numbers included in the registration records created by the second network equipment device.

In some embodiments, the method further includes that while the first network equipment device is operating in the first mode of operation performing he additional steps of: (i) measures the rate of receipt of initial registration request messages during a predefined time period on an on-going periodic basis; (ii) generates based on the on-going periodic basis measured rates of receipt of initial registration request messages an average rate of receipt of initial registration request messages; and determining that first condition exists when the most recent rate of receipt of initial registration request messages exceeds a first threshold rate of receipt of initial registration request messages, said first threshold rate of receipt of initial registration request messages being based on said the average rate of receipt of initial registration request messages. In some such embodiments, first threshold rate of receipt of initial registration request messages is the average rate of receipt of initial registration request messages.

In some embodiments, the method further includes the steps of generating, by said first network equipment device, said set of existing registration records while operating in said first mode of operation prior to said detection of said first condition; in response to detecting a second condition while operating in said second mode of operation switching from operating in said second mode of operation back to operating in said first mode of operation; and when operating in said first mode of operation relaying, by said first network equipment device, received initial SIP registration request messages destined for the registrar to the registrar without determining whether or not a matching registration record exists for the determined address of record value included in said received initial SIP registration request messages.

In many embodiments, the first network equipment device while operating in the second mode of operation continues to: (i) measure the rate of receipt of initial registration request messages during a predefined time period on an on-going periodic basis; (ii) generate based on the on-going periodic basis measured rates of receipt of initial registration request messages an average rate of receipt of initial registration request messages; and wherein said detecting a second condition exists includes detecting when the most recent rate or receipt of initial registration request messages is less than a second threshold rate of receipt of initial registration request messages, said second threshold rate of receipt of initial registration request messages being based on said average rate of receipt of initial registration request messages or detecting the completion of updating a threshold number of registration records of the set of existing registration records.

In some embodiments, the second threshold rate of receipt of initial registration request messages is the average rate of receipt of initial registration request messages.

In some embodiments, the threshold number of registration records of the set of existing registration records is the number of existing registration records at the time the first network equipment device switched from the first mode of operation to the second mode of operation.

In some embodiments, the first network equipment device while operating in the first mode of operation: (i) measures the rate of receipt of refresh registration messages during a predefined time period on an on-going periodic basis; and (ii) generates based on the on-going periodic basis measured rates of receipt of refresh registration messages an average rate of receipt of refresh registration messages; and the first condition is determined to exist by the first network equipment device when the most recent rate of receipt of refresh registration messages is below a first threshold rate of receipt of refresh registration messages, said first threshold rate of receipt of refresh registration messages being based on the average rate of receipt of refresh registration request messages.

In some embodiments, the first threshold rate of receipt of refresh registration messages is the average rate of receipt of refresh registration request messages.

In some embodiments, the method further includes the steps of generating, by said first network equipment device, said set of existing registration records while operating in said first mode of operation prior to said detection of said first condition; in response to detecting a second condition while operating in said second mode of operation switching from operating in said second mode of operation back to operating in said first mode of operation; and when operating in said first mode of operation relaying, by said first network equipment device, received initial SIP registration request messages destined for the registrar to the registrar without determining whether or not a matching registration record exists for the determined address of record value included in said received initial SIP registration request messages.

In some embodiments, the first network equipment device while operating in the second mode of operation continues to: (i) measure the rate of receipt of refresh registration messages during a predefined time period on an on-going periodic basis; (ii) generate based on the on-going periodic basis measured rates of receipt of refresh registration messages an average rate of receipt of refresh registration request messages; and when the first network equipment device is operating in the second mode of operation, the first network equipment device only deletes existing registration records upon failure to receive a refresh register message or SIP initial register message which matches an existing registration record before the expiration of the time by which the first network equipment device is required to transmit a refresh register message to the registrar to avoid timeout of the registration by the registrar.

In some embodiments, the operation of detecting a second condition exists includes determining whether each of the registration records existing at the time of the switchover from the first mode of operation to the second mode of operation has either been updated or expired based on the timeout of the registration by the registrar.

In some embodiments, the first network equipment device determines that said second condition exists when it determines that each of the registration records existing at the time of the switchover from the first mode of operation to the second mode of operation has either been updated or expired based on the timeout of the registration by the registrar.

In another exemplary embodiment in accordance with the present invention includes a method comprising the steps of: operating a first network equipment device in a first mode of operation; monitoring, at a first network equipment device, for a first condition; when said first network equipment device detects that said first condition exists, switching the first network equipment device from said first mode of operation to a second mode of operation, said second mode of operation including: receiving, by the first network equipment device, a plurality of SIP registration messages from a plurality of user equipment devices destined for a registrar, each of said SIP registration messages including source identification information including: an address of record and a source IP address and port number pair; determining for each of the received SIP registration messages of the plurality of SIP registration messages, whether the received SIP registration message is an initial SIP registration request message or a refresh SIP registration request message; for each SIP packet determined to be an initial SIP registration request message determining based on at least some of said source identification information included in the corresponding initial SIP registration request message whether an existing registration record exists at the first network device; and when the network equipment device determines that an existing registration record exists further determining whether said existing registration record has been updated and when said existing registration record has not been previously marked as updated: (i) treating, by the first network equipment device, said first initial SIP registration request message as a refresh SIP registration message, and (ii) marking said existing registration record as having been updated; and when the network equipment device determines that an existing registration record does not exist or has been previously marked as updated relaying, by the first network equipment device, said first initial SIP registration request message to the registrar.

In some such embodiments, the at least some of said source identification information includes only an address of record. In some embodiment the as least some of said source identification information includes only an address of record and a source Internet Protocol address and excludes the source port number.

In some embodiments, the first network equipment device is a Session Border Controller positioned in a communication path between said plurality of user equipment devices and the registrar. In some embodiments a Network Address and Port Translation device is positioned in a communications path between at least some of said plurality of user equipment devices and the Session Border Controller. In such embodiments, the received registration request messages are typically received over a TCP connection.

The invention is also directed to systems and apparatus that are used to implement the various method embodiments of the invention. In some apparatus embodiments end devices, network equipment devices, NAT or NAPT devices, registrar, and each of the other apparatus/nodes/devices of the system include a processor and a memory, the memory including instructions which when executed by the processor control the apparatus/node/device of the system to operate to perform one or more steps or functions of the various method embodiments of the invention.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A and 10B.

FIG. 12 illustrates exemplary pseudocode for use in implementing an exemplary method or routine in accordance with one embodiment of the present invention.

FIG. 13 illustrates exemplary pseudocode for use in implementing an exemplary method or routine in accordance with one embodiment of the present invention.

FIG. 14 illustrates exemplary pseudocode for use in implementing an exemplary method or routine in accordance with one embodiment of the present invention.

DETAILED DESCRIPTION

Figure 1:
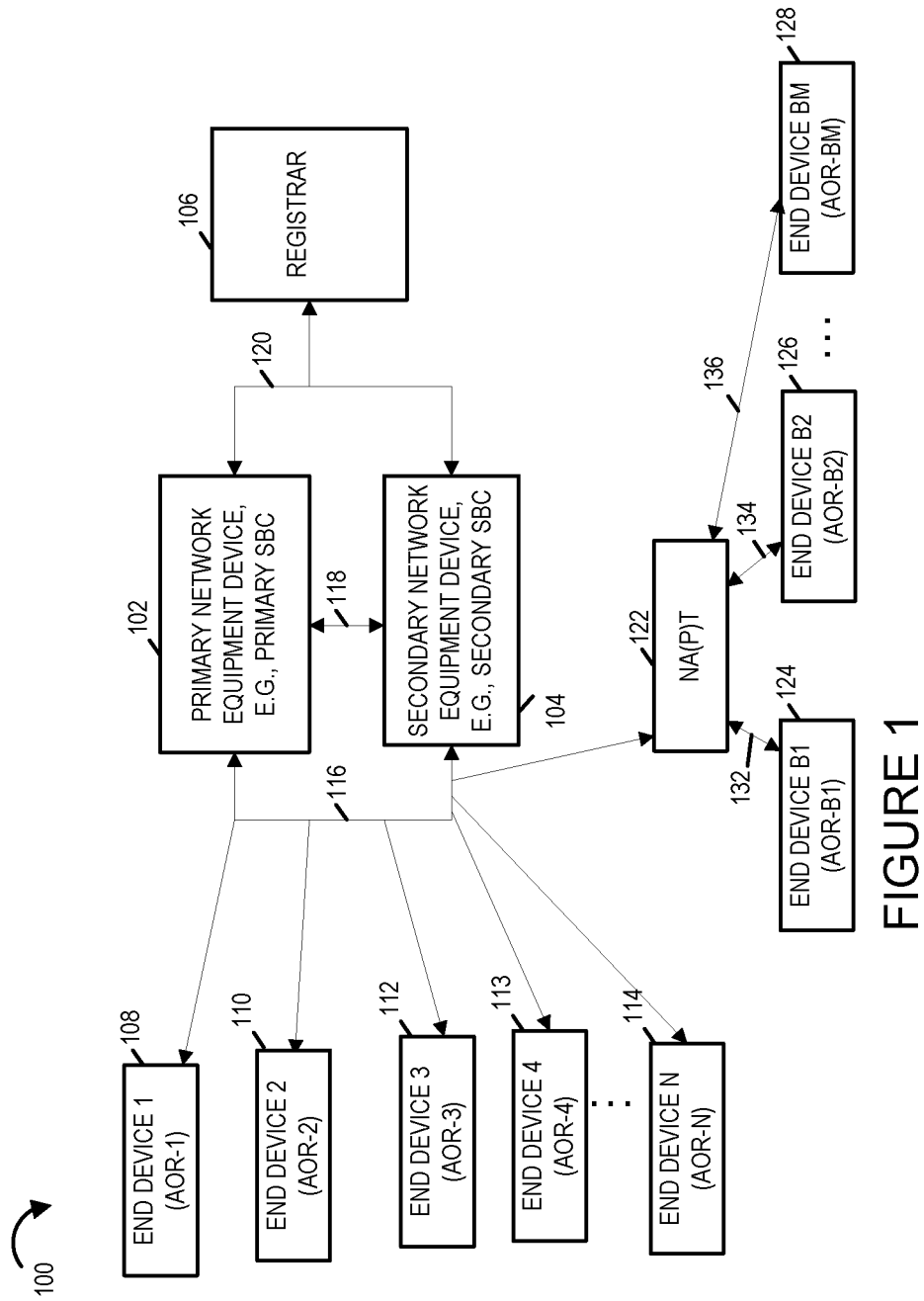
FIG. 1 illustrates an exemplary communications system in accordance with one embodiment of the present invention.

FIG. 1 illustrates an exemplary system 100 in accordance with an exemplary embodiment of the present invention. System 100 includes a primary network equipment device 102, a secondary network equipment device 104, a registrar 106, a Network Address and/or Port Translation (NA(P)T) device 122, a plurality of end devices, e.g., user equipment devices, and communications links. The Registrar 106 may, and in some embodiments is, a SIP application server that provides SIP application services as well as registration services (e.g., authentication of end devices or user devices before providing requested services). Exemplary network equipment devices are Session Border Controllers. The primary and secondary network equipment devices 102 and 104, may be, and in some embodiments are, Session Border Controllers (SBCs). The plurality of end devices (EDs) include end device 1 108, end device 2 110, end device 3 112, end device 4 113, . . . , end device N 114 where N is a positive integer number greater than 4 and end devices B1 124, B2 126, . . . BM 128 where M is is a positive integer number greater than 2. The end devices may be, and in some embodiments are, user equipment devices such as for example mobile or stationary communications devices, cellular phones, fixed wired phones, smartphones, tablet devices, laptop computers or other communications device. The end devices are communications devices that support among other communications methods Session Initiation Protocol signaling and are capable of communicating over an Internet Protocol network using Transmission Control Protocol.

In various embodiments the end devices 108, 110, 112, 113, . . . , 114, 124, 126, . . . , 128, the primary network equipment device 102, the secondary network equipment devices 104, the NA(P)T device 122 and registrar 106 communicate and exchange information over a communications network formed by the communications links 116, 118, 120, 132, 134, and 136. The end devices 108, 110, 112, 113, . . . , 114 and NA(P)T device are coupled to primary and secondary network equipment devices 102 and 104 over communications link 116. The end devices 124, 126, . . . , 128 are coupled to the NA(P)T device 122 via communications links 132, 134, . . . , 136 respectively. The primary and secondary network devices 102 and 104 are coupled to the registrar 106 over communications link 120. The primary network equipment device 102 is coupled to the secondary network equipment device 104 over communications link 118 which is typically a private communications link.

In some embodiments the exemplary network equipment devices 102 and 104 are session border controller (SBC) and the registrar 106 is a SIP registration server located at an operator/service provider's site. In various embodiments the end devices in the system 100 establish TCP (Transmission Control Protocol) connections for communicating with the primary network equipment device 102 and/or the secondary network equipment device 104. The end devices 124, 126, . . . , 128 establish TCP connections with the NA(P)T which in turn establishes TCP connections for communicating with the primary network equipment device 102 and/or the secondary network equipment device 104. Typically only one of the network equipment devices 102 or 104 is active in servicing the end devices at a time. For example, the primary network equipment device typically services requests, e.g., registration requests from the end devices. Upon an occurrence of a switchover event, the secondary network device 104, takes over servicing the end devices which were previously being served by the primary network equipment device 102. A switch over can occur for example when the primary network equipment device fails. The secondary network equipment device can detect such a failure based on monitoring messages, e.g., heartbeat messages being received from the primary network equipment device being received over the communication link 118. The primary and secondary network equipment devices in some embodiments share the same Internet Protocol address but only one of the primary or secondary network equipment devices are active at any one time. In some embodiments, one or more of the communications links of the system 100 are a plurality of multiple communications links and/or support a plurality of communications channels.

An exemplary embodiment of the present invention will now be described in connection with the communications system 100. In the exemplary embodiment, the primary and secondary network equipment devices each have two modes of operation a first mode and a second mode of operation. The first mode of operation is sometimes referred to as a normal or regular mode of operation and the second mode of operation is sometimes referred to as a switchover mode of operation. Both modes of operation relate to how the network equipment devices 102 and 104 operate in connection with communications concerning register request messages. The primary and secondary network equipment devices 102 and 104 switch between different modes of operation based on the detection of one or more trigger events or criteria.

In one embodiment, wherein the secondary network equipment device 104 is operating as a standby or backup network equipment device and detects the failure of the primary or active network equipment device 102, the secondary network equipment device assumes or becomes the active network equipment device. As part of the switchover from the primary to the secondary network equipment device, the secondary network equipment device becomes the active network equipment device by assuming the IP address of the first network equipment device 102 and replacing the primary network equipment device 102 as the network equipment device providing services to the end devices previously being serviced by the primary equipment device 102 before the detection of the failure. The secondary network equipment device 104 starts a timer after the switchover. The secondary network equipment device 104 enters a switchover mode of operation regarding procedures and/or operational steps for handling SIP REGISTER requests and remains in the switchover mode of operation regarding SIP REGISTER requests until the expiration of the timer. The value of the timer is configurable and/or adjusted based on expiry negotiated with the end devices (e.g., UEs) for an Address of Record (AOR). While operating in the switchover mode of operation, the first refresh REGISTER packet sent from an end device is rejected by secondary network equipment device 104. In response to the first refresh REGISTER packet sent from the end device, the secondary network equipment device transmits to the end device that sent the first refresh REGISTER packet a TCP RST (TCP reset message). In some embodiments, the secondary network equipment device's TCP/IP protocol stack (e.g., software or hardware component that processes the TCP protocol messages) rejects the first refresh REGISTER packet from an end device and generates and sends the TCP RST to the end device.

The end device in response to receiving the TCP RST message, establishes a new TCP connection toward the secondary network device 104. The end device sends an initial REGISTER request to the secondary network device 104. The secondary network device 104 instead of relaying the initial REGISTER request to the Registrar 106 tries to match the initial REGISTER request to any of the existing Address of Record (AoR) contexts (e.g., registration records) by comparing the AoR value received as part of the initial REGISTER request to the AoR value of existing contexts. Optionally, the source IP address of the initial REGISTER request message may also be used by the secondary network equipment device 104 for determining if there is a match with existing AoR contexts. If a match with an existing AoR context is found then the initial REGISTER request message is treated as a refresh REGISTER request. This procedure is applied only for as many initial REGISTER request messages as the number of existing matching contexts received after the switchover for a particular AoR. All subsequent initial REGISTER request messages are treated by the secondary network equipment device using standard procedures in which the secondary network equipment device relays the initial REGISTER request message to the REGISTRAR 106.

Optionally, as an additional step in the method, challenge/credentials used for the last challenged REGISTER request from by the primary network equipment device 102 before the switchover to the secondary network equipment device 104 are communicated to the secondary network device 104 from the primary network device 102 and are saved and synchronized on the secondary network equipment device 104 for each AoR. These saved challenge/credential values are used by the secondary network equipment device 104 to challenge the end devices from which initial REGISTER request messages are received after the switchover. In such cases, the initial REGISTER message is only treated as a refresh REGISTER request message when credentials provided by the end device AoR are valid.

Another optional additional step is for any packet level policers used to gate traffic from unknown IP address/port pairs are adjusted to a higher value during the timer period and then readjusted back to its original value once the timer expires.

Once the timer expires, the secondary network equipment device 104 switches to a normal or regular mode of operation in handling received REGISTER request messages wherein first refresh REGISTER packets sent by end devices are not rejected by the secondary network equipment device 104 with a TCP RST message and initial REGISTER requests are treated as initial REGISTER requests and not as refresh REGISTER requests.

The above described exemplary method will now be described in further detail in connection with FIGS. 2 and 3.

Figure 2:
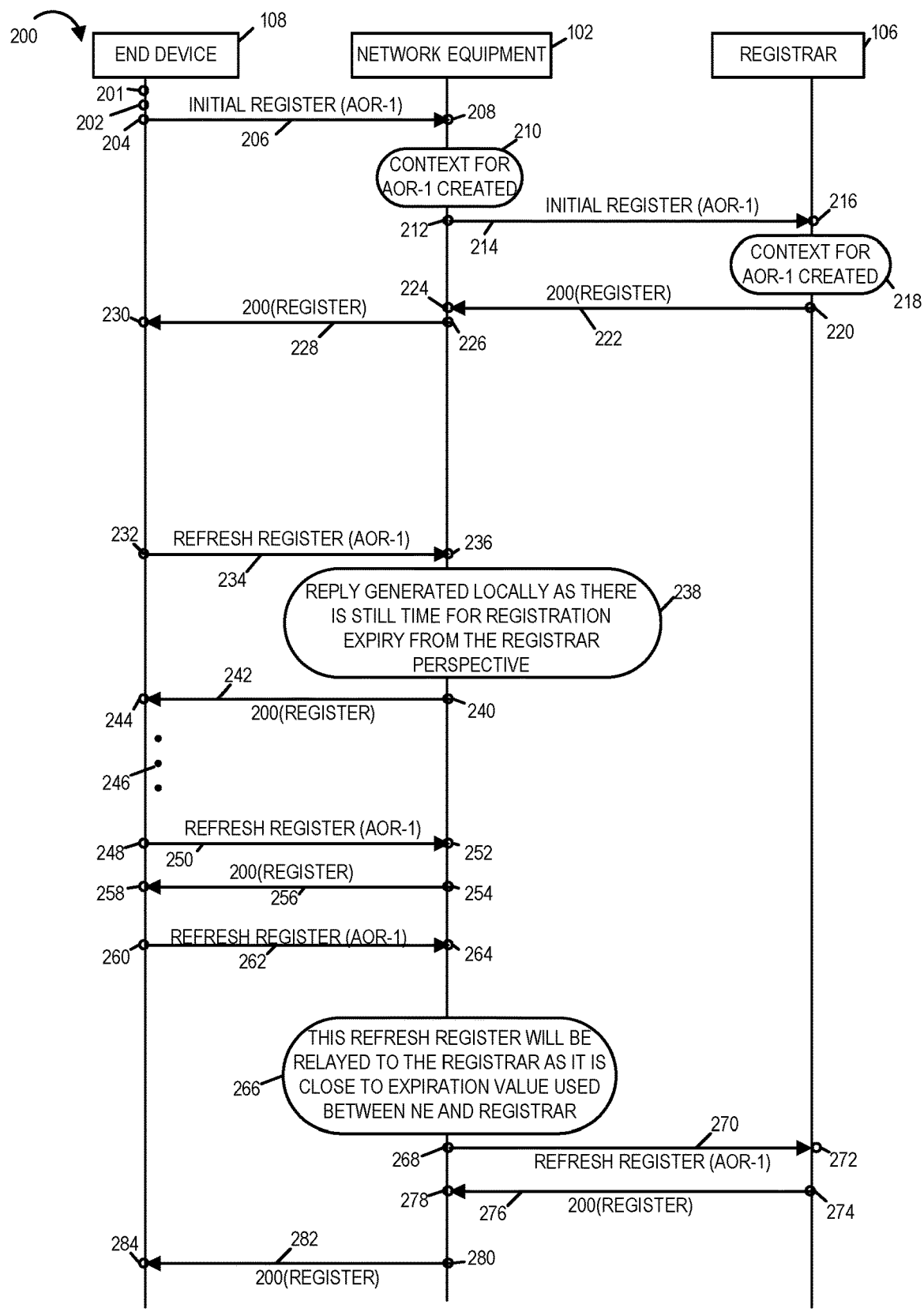
FIG. 2 illustrates an exemplary signaling flow diagram showing REGISTER message throttling by a network equipment device during regular operation in an exemplary embodiment of the present invention.

Diagram 200 of FIG. 2 illustrates an exemplary signaling flow/method diagram showing the steps of REGISTER message throttling by a network equipment device during a regular or normal mode of operation in which the network equipment device is active in providing services to end devices such as user equipment in an exemplary embodiment of the present invention. The signaling is shown among end device 1 108, primary network equipment device 102 in an active mode of operation, and Registrar 106 of exemplary communications system 100.

For explanatory purposes simplified request and response messages are depicted with the messages and/or information contained therein illustrated which are most pertinent to explaining the exemplary method embodiment 200. As it will be appreciated additional information and formatting of the messages as well as the use of additional messages may be and typically is used in initiating, registering and communicating among devices in networks. For explanatory purposes, the messages exchanged between the end device 108, network equipment device 102 and registrar 106 of system 100 are shown however it will be understood by those of skill in the art that additional message exchanges occur as messages traverse the network in the system 100.

Operation begins in start step 201. Operation proceeds from start step 201 to step 202.

In step 202, the end device 108, e.g., a user equipment device such as a smartphone or IP communications device, generates initial SIP REGISTER (AOR-1) message 206. The initial REGISTER message 206 includes the address of record AOR-1 and is destined for or directed to the registrar 106 via network equipment device 102 which may be, for example a Session Border Controller. Operation proceeds from step 202 to step 204.

In step 204, the end device 108 transmits the initial SIP REGISTER message 206 to the network equipment device 102. Operation proceeds from step 204 to step 208.

In step 208, the network equipment device 102 receives and processes the initial SIP REGISTER message 206. Operation proceeds from step 208 to step 210. In step 210, network equipment device 102 generates or creates a context for AOR-1, e.g., a data structure such as a record containing data corresponding to the address of record AOR-1 including an AOR-1 identifier. The AOR-1 context is typically stored in memory of the network equipment device 102 and sent to secondary network equipment device 104 where it is also stored in memory. Alternatively, in some embodiments the generated AOR-1 context is stored in a storage device coupled to and accessible to both the primary and secondary network equipment devices 102 and 104. Operation proceeds from step 210 to step 212.

In step 212, in response to the initial SIP REGISTER message 206 received from the end device 108, the network equipment device 102 generates and transmits initial SIP REGISTER message 214 to the registrar 106. The initial SIP REGISTER message 214 being based on information contained in initial SIP REGISTER message 206. The initial SIP REGISTER message 214 including the address of record (AOR-1). In some embodiments, the initial SIP REGISTER message 206 is relayed by the network equipment device 102 to the registrar 106. Operation proceeds from step 212 to step 216.

In step 216, the registrar 106 receives the initial SIP REGISTER message 214 from the network equipment device 102 and processes it. Operation proceeds from step 216 to step 218. In step 218, the registrar 106 generates or creates a context for AOR-1 and stores it in its memory. Operation proceeds from step 218 to step 220.

In step 220, in response to initial SIP REGISTER (AOR-1) message 214, the registrar 106 generates and transmits SIP 200 (REGISTER) message 222 indicating that the registrar 106 has successfully registered the end device 1 AOR-1 108. Operation proceeds from step 220 to step 224. In step 224, the network equipment device 102 receives and processes the 200 (REGISTER) response message 222 from the registrar 106. As part of processing the received 200 (REGISTER) message 222, the network equipment device 102 updates the context for AOR-1 to indicate successful registration of the end device 1 AOR-1 108. Operation proceeds from step 224 to step 226.

In step 226, the network equipment device 102 generates or creates SIP 200 (REGISTER) message 228 based on SIP 200 (REGISTER) message 222 and transmits the SIP 200 (REGISTER) message 228 to the end device 1 AOR-1 108 in response to the SIP initial REGISTER (AOR-1) message 206. In some embodiments, the network equipment device 102 relays the SIP 200 (REGISTER) message 222 to the end device 1 AOR-1 108. Operation proceeds from step 226 to step 230.

In step 230, the end device 108 AOR-1 receives and processes the SIP 200 (REGISTER) message 228 indicating that the end device 108 AOR-1 has been successfully registered. Operation proceeds from step 230 to step 232.

In step 232, the end device 108 AOR-1 generates and transmits SIP REFRESH REGISTER (AOR-1) message 234 to network equipment device 102. Operation proceeds from step 232 to step 236.

In step 236, the network equipment device 102 receives and processes the SIP REFRESH REGISTER (AOR-1) message 234. Operation proceeds from step 236 to step 238.

In step 238, the network equipment device 102 generates a reply to the SIP REFRESH REGISTER (AOR-1) message 234 without relaying the SIP REFRESH REGISTER (AOR-1) message 234 to the registrar 106 or sending any SIP REFRESH REGISTER message to the registrar 106 on behalf of the end device 108 AOR-1 as there is still time for registration expiry from the registrar 106 perspective. In step 238, the network equipment device 102 generates the SIP 200 (REGISTER) message 242 as the reply to the REFRESH REGISTER (AOR-1) message 234 received from the end device 108 AOR-1. Operation proceeds from step 238 to step 240.

In step 240, the network equipment device 102 transmits the generated SIP 200 (REGISTER) message 242 to the end device 108 AOR-1 in response to the REFRESH REGISTER (AOR-1) message 234. Operation proceeds from step 240 to step 244.

In step 244, the end device 108 AOR-1 receives and processes the SIP 200 (REGISTER) message 242 . . . 246 represents the continuation of the process of refreshing the registration by end device 108 AOR-1. Operation proceeds from step 244 to step 248.

In step 248, the end device 108 AOR-1 generates and transmits REFRESH REGISTER (AOR-1) message 250 to the network equipment device 102. Operation proceeds from step 248 to step 252.

In step 252, the network equipment device 102 receives and processes the REFRESH REGISTER (AOR-1) message 250. Operation proceeds from step 252 to step 254. In step 254, the network equipment device 102 generates SIP 200 (REGISTER) message 256 in response to the received REFRESH REGISTER (AOR-1) message 250 without relaying the SIP REFRESH REGISTER (AOR-1) message 250 to the registrar 106 or sending any SIP REFRESH REGISTER message to the registrar 106 on behalf of the end device 108 AOR-1 as there is still time for registration expiry from the registrar 106 perspective. In step 254, the network equipment device 102 also transmits the SIP 200 (REGISTER) message 256 to end device 1 108 AOR-1 in response to the SIP REFRESH REGISTER (AOR-1) message 250. Operation proceeds from step 254 to step 258.

In step 258 the end device 1 108 AOR-1 receives and processes the SIP 200 (REGISTER) message 256. Operation proceeds from step 258 to step 260.

In step 260, the end device 108 AOR-1 generates and transmits SIP REFRESH REGISTER (AOR-1) message 262 to the network equipment device 102. Operation proceeds from step 260 to step 264.

In step 264, the network equipment device 102 receives and processes the SIP REFRESH REGISTER (AOR-1) message 262. Operation proceeds from step 264 to step 266.

In step 266, the network equipment device 102 determines that it is close to the expiration value used between the network equipment device 102 and registrar 106 and therefore the received SIP REFRESH REGISTER (AOR-1) 262 message will need to be relayed to the registrar 106 or a refresh register message sent on behalf of the end device 1 108 AOR-1 to keep the AOR-1 registration from expiring. In step 266, the network equipment device 102 generates SIP REFRESH REGISTER (AOR-1) message 270 based on SIP REFRESH REGISTER (AOR-1) message 262. Operation proceeds from step 266 to step 268.

In step 268, the network equipment device 102 transmits the SIP REFRESH REGISTER (AOR-1) message 270 to the registrar 106. Operation proceeds from step 268 to step 272.

In step 272, the registrar 106 receives and processes the REFRESH REGISTER (AOR-1) message 270. Operation proceeds from step 272 to step 274.

In step 274, the registrar 106 generates and transmits SIP 200 (REGISTER) message 276 to network equipment device 102. Operation proceeds from step 276 to step 278.

In step 278, the network equipment device 102 receives and processed the SIP 200 (REGISTER) message 276. Operation proceeds from step 278 to step 280.

In step 280, the network equipment device 102 generates SIP 200 (REGISTER) message 282 based on and in response to SIP 200 (REGISTER) message 276. In step 280 in response to the SIP REFRESH REGISTER (AOR-1) message 262, the network equipment device 102 transmits the generated SIP 200 (REGISTER) message 282 to the end device 1 108 (AOR-1). Operation proceeds from step 280 to step 284.

In step 284, the end device 1 108 AOR-1 receives and processes the SIP 200 (REGISTER) message 282 which indicates that the end device 1 108 AOR-1 registration has been successfully refreshed.

The signaling illustrated in signaling/method diagram 200 shows an end device initial registers with a registrar via a network equipment device and how the network equipment devices connection with the registrar is refreshed at a lower rate than the end device connection to the network equipment device. The expiry timeout for the connection between the end device 1 108 AOR-1 and the network equipment device 102 is less than the expiry timeout for the connection between the network equipment device 102 and the registrar 106. This frees up resources at the registrar 106. The signaling illustrated in signaling/method diagram 200 also illustrates how the network equipment device 102 performs REGISTER message throttling during regular or normal mode of operation. In the diagram 200, the connection between the end device 108 AOR-1 and the network equipment device 102 is a TCP connection. While TCP sequence numbers for the connection are maintained by the network equipment device 102 of system 100, the TCP sequence numbers for the connection are not sent to or maintained by the secondary network equipment device 104 which in this embodiment is in an inactive mode in which it receives context updates for the AOR-1 context but does not maintain a TCP stack for the connection. The network equipment device 104 monitors the network equipment device 102 for a failure for example via communications link 118. For example, heart beat messages may be, and in some embodiments are, sent by the network equipment device 102 to network equipment device 104 over the communications link 118. The network equipment device 104 detects a failure of the network equipment device 102 upon the detection of the failure to receive heart beat messages by the network equipment device 104 from network equipment device 102. Upon detection of a failure by the secondary network equipment device 104 of the primary network equipment device 102, a network switchover of the secondary network equipment device 104 will occur wherein the secondary network equipment device 104 will be activated and begin servicing the communications connections previously serviced by the failed primary network equipment device. The signaling and method of operation after switchover will now be discussed in connection with FIG. 3.

Figure 3:
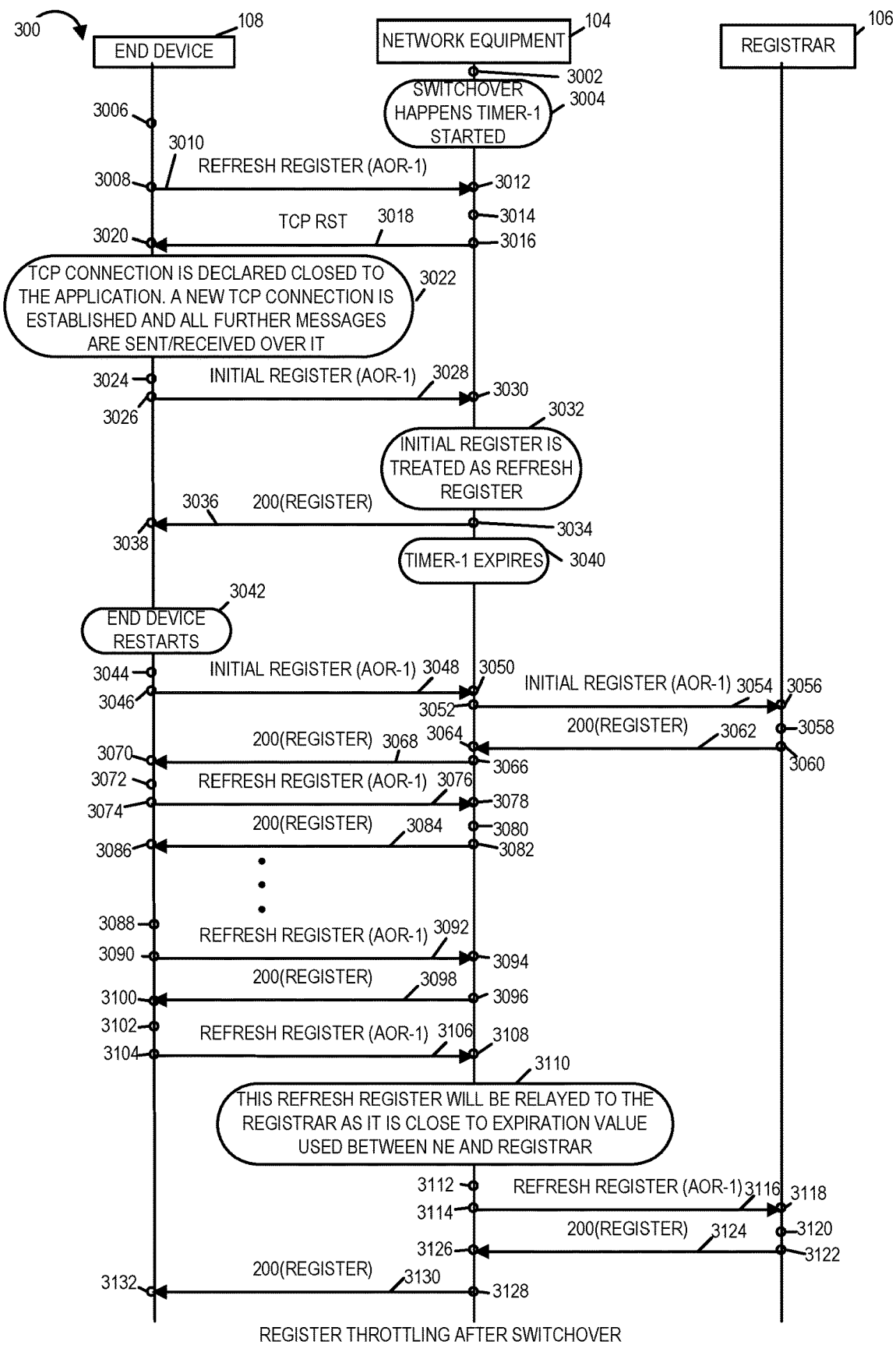
FIG. 3 illustrates an exemplary signaling flow diagram showing REGISTER message throttling by a network equipment device after switchover in an exemplary embodiment of the present invention.

Diagram 300 of FIG. 3 illustrates an exemplary signaling flow diagram showing REGISTER message throttling by a network equipment device in a switchover mode of operation and then in a regular or normal mode of operation after expiration of a timer in an exemplary embodiment of the present invention. FIG. 3 includes a diagram 300 illustrating exemplary signaling in an exemplary communications system 100 in accordance with an exemplary embodiment. The exemplary signaling includes communications and signaling between end device 1 108, secondary network equipment device 104, and Registrar 106.

Operation begins in start step 3002. Operation proceeds from start step 3002 to step 3004. In step 3004, the secondary network equipment device 104 detects a failure condition of the primary network equipment device 102 and a switchover occurs with the secondary network equipment device 104 switching from standby mode of operation to active mode of operation. In active mode of operation the secondary network equipment device assumes the IP address and responsibility for the services being provided by the primary network equipment device 102. The secondary equipment device 104 starts a timer-1, e.g., loads an expiration count down time value into timer-1. Timer-1 may be a hardware timer or a software timer included in the secondary network equipment device 104. Once timer-1 has been started the second network equipment device 104 enters a switchover mode of operation regarding procedures for handling register requests. The secondary network equipment device 104 has a copy or access to a copy of AOR contexts or records for the communications sessions that were being processed by the primary network equipment device 102 before the switchover occurred and the secondary network equipment device 104 became active. The secondary network equipment device 104 however does not have accurate TCP sequence numbers for the TCP communications that were active prior to the switchover.

In step 3006 the end device 1 108 which had an active registration with the registrar 106 via the primary network equipment device 102 prior to the switchover generates a SIP REFRESH REGISTER (AOR-1) message 3010 to refresh the registration and keep it alive/active. Operation proceeds from step 3006 to step 3008.

In step 3008, the end device 1 AOR-1 transmits the SIP REFRESH REGISTER (AOR-1) message 3010 to the IP address for the primary network equipment device 102 which has been assumed by the second network equipment device 104. Operation proceeds from step 3008 to step 3012.

In step 3012, the secondary network equipment device 104 receives and processes the SIP REFRESH REGISTER (AOR-1) message 3010. Operation proceeds from step 3012 to step 3014.

In step 3014, the network equipment device 104 in response to the SIP REFRESH REGISTER (AOR-1) message 3018 generates a TCP RST reset message 3018 to reset the TCP connection between the end device 108 AOR-1 and the network equipment device 104. Operation proceeds from step 3014 to step 3016.

In step 3016, the network equipment device 104 transmits the TCP RST message 3018 to the end device 108 AOR-1. Operation proceeds from step 3016 to step 3020.

In step 3020, the end device 108 AOR-1 receives and processes the TCP RST message 3018. Operation proceeds from step 3020 to step 3022.

In step 3022, in response to the TCP RST message 3018, the end device 108 AOR-1 closes the TCP connection over which the REFRESH REGISTER (AOR-1) message 3010 had been sent and declares to the AOR-1 application on the end device 1 108 that was using the TCP connection that the TCP connection has been closed. In step 3022, the end device 1 108 also establishes a new TCP connection for the AOR-1 application with the network equipment device 104 and all further messages from the AOR-1 application of the end device 1 108 are sent/received over it. Operation proceeds from step 3022 to step 3024.

In step 3024, the end device 1 108 AOR-1 generates the initial REGISTER (AOR-1) message 3028. Operation proceeds from step 3024 to step 3026.

In step 3026, the end device 1 108 AOR-1 transmits the SIP initial REGISTER (AOR-1) message 3028 to the network equipment device 104 over the newly established TCP connection. Operation proceeds from step 3026 to step 3030.

In step 3030, network equipment device 104 receives and processes the SIP initial REGISTER (AOR-1) message 3028. Operation proceeds from step 3030 to step 3032.

In step 3032, the network equipment device 104 extracts the address of record AOR-1 value from the SIP initial REGISTER (AOR-1) message 3028 and searches the existing contexts or records for a matching address of record AOR-1 value. Upon identifying a matching existing context or record containing the AOR-1 value, the network equipment device treats or processes the SIP initial REGISTER (AOR-1) message 3028 as a SIP REFRESH REGISTER message. In some embodiments, in addition to matching the address of record value a match of the source IP address of the SIP initial REGISTER message is also performed. In such embodiments, only when an existing context or record having both the source IP address and address of record that match the information in the received SIP initial REGISTER message does the network equipment device 104 determine that the existing context or record is a match for the received SIP initial REGISTER message and treat or process the SIP initial REGISTER message as a SIP REFRESH REGISTER message. When the network equipment device 104 is unable to find an existing context or record matching the received SIP initial REGISTER message it treats and/or processes the received SIP initial REGISTER message as a SIP initial REGISTER message and relays the message to the registrar 106. In the example shown in FIG. 3, the network equipment device 104 determines that there is a match as there is an existing context or record for AOR-1 and the network equipment device 104 treats or processes the SIP initial REGISTER message 3028 as SIP REFRESH REGISTER message. Operation proceeds from step 3032 to step 3034.

In step 3034, the network equipment device 104 generates and transmits SIP 200 (REGISTER) message 3036 to end device 1 108 AOR-1 in response to the SIP initial REGISTER (AOR-1) message 3028 without relaying or contacting the registrar 106 regarding SIP initial REGISTER (AOR-1) message 3028. Operation proceeds from step 3034 to step 3038.

In step 3038, the end device 1 108 AOR-1 receives and processes the SIP 200 (REGISTER) message 3036. Operation proceeds from step 3038 to step 3040.

In step 3040, the network equipment device 104's timer-1 expires and the network equipment device 104 switches from operating in the switchover mode of operation regarding REGISTER messages to operating in the normal mode or regular mode of operation described in signaling diagram/method 200 illustrated in FIG. 2 in connection with network equipment device 102. The regular or normal mode of operation described in signaling diagram/method 200 is also sometimes referred to as a standard mode of operation with respect to processing of registration messages.

Operation proceeds from step 3040 to step 3042. In step 3042 the end device 1 108 AOR-1 restarts closing the TCP connection between the end device 1 108 AOR-1 and the network equipment device 104. Operation proceeds from step 3042 to step 3044.

In step 3044, the end device 1 108 AOR-1 generates SIP initial REGISTER (AOR-1) message 3048. Operation proceeds from step 3044 to step 3046.

In step 3046, the end device 1 108 AOR-1 transmits the SIP initial REGISTER (AOR-1) message 3048 to network equipment device 104. Operation proceeds from step 3046 to step 3050.

In step 3050, the network equipment device 104 receives and processes the SIP initial REGISTER (AOR-1) message 3048 generating a new context or record for address AOR-1. The previous AOR-1 context having been deleted after the end device 108 restarted and the TCP connection was lost. Operation proceeds from step 3050 to step 3052.

In step 3052, the network equipment device 104 operating in a regular mode of operation since the timer-1 has expired upon receiving a SIP initial REGISTER message generates a SIP initial REGISTER message to be relayed to the registrar 106. In step 3052, the network equipment device 104 generates SIP initial REGISTER (AOR-1) message 3054 and transmits the SIP initial REGISTER (AOR-1) message 3054 to registrar 106. Operation proceeds from step 3052 to step 3056.

In step 3056, the registrar 106 receives and processes the SIP initial REGISTER (AOR-1) message 3054 from network equipment device 104. Operation proceeds from step 3056 to step 3058.

In step 3058, the registrar 106 generates SIP 200 (REGISTER) message 3062 in response to the received SIP initial REGISTER (AOR-1) message 3054 indicating that end device 1 108 AOR-1 has been successfully registered. Operation proceeds from step 3058 to step 3060.

In step 3060, the registrar 106 transmits the SIP 200 (REGISTER) message 3062 to the network equipment device 104. Operation proceeds from step 3060 to step 3064.

In step 3064, the network equipment device 104 receives and processes the SIP 200 (REGISTER) message 3062. Operation proceeds from step 3064 to step 3066.

In step 3066, the network equipment device 104 generates and transmits the SIP 200 (REGISTER) message 3068 to the end device 1 108 AOR-1 in response to the SIP initial REGISTER (AOR-1) message 3048 indicating that end device 1 108 AOR-1 has been successfully registered. The SIP 200 (REGISTER) message 3068 is based on the SIP 200 (REGISTER) message 3062. The network equipment device 104 can be considered to have relayed the SIP 200 (REGISTER) message 3062 from registrar 106 to the end device 1 108 AOR-1. Operation proceeds from step 3066 to step 3070.

In step 3070, the end device 1 108 AOR-1 receives and processes the SIP 200 (REGISTER) message 3068. Operation proceeds from step 3070 to step 3072.

In step 3072, the end device 108 AOR-1 determines that it needs to send a SIP REFRESH REGISTER message to refresh the registration with the network equipment device 104 so that it does not time out and the end device 108 AOR-1 be de-registered. Operation proceeds from step 3072 to step 3074.

In step 3074, the end device 1 108 AOR-1 generates and transmits SIP REFRESH REGISTER (AOR-1) message 3076 to the network equipment device 104. Operation proceeds from step 3074 to step 3078.

In step 3078, the network equipment device 104 receives and processes the SIP REFRESH REGISTER (AOR-1) message 3076. Operation proceeds from step 3078 to step 3080.

In step 3080, the network equipment device 104 determines that the amount of time that has passed since the registration with the registrar 106 is not near expiration value used between the network equipment device 104 and the registrar 106. As a result of the determination that a refresh register message is not required to keep the connection alive between the network equipment device 104 and the registrar 106, the network equipment device 104 does not relay or transmit a refresh register message to the registrar for end device 1 108 AOR-1. The network equipment device 104 generates SIP 200 (REGISTER) message 3084 locally to indicate to the end device 1 108 AOR-1 that the registration remains active. Operation proceeds from step 3080 to step 3082.

In step 3082, the network equipment device 104 transmits the generated SIP 200 (REGISTER) message 3084 to the end device 1 108 AOR-1. Operation proceeds from step 3082 to step 3086.

In step 3086, the end device 1 108 AOR-1 receives and processes the SIP 200 (REGISTER) message 3084. Operation proceeds from step 3086 to step 3088. The . . . between step 3086 and step 3088 indicate that the end device 1 108 AOR-1 and the network equipment device 104 continue to exchange messages, e.g., refresh message to keep the connection alive during this time.

In step 3088, the end device 108 AOR-1 determines that it needs to send a SIP REFRESH REGISTER message to refresh the registration with the network equipment device 104 so that it does not time out and the end device 108 AOR-1 be de-registered. Operation proceeds from step 3088 to step 3090.

In step 3090, the end device 1 108 AOR-1 generates and transmits SIP REFRESH REGISTER (AOR-1) message 3092 to the network equipment device 104. Operation proceeds from step 3090 to step 3094.

In step 3094, the network equipment device 104 receives and processes the SIP REFRESH REGISTER (AOR-1) message 3092. Operation proceeds from step 3094 to step 3096.

In step 3096, the network equipment device 104 determines that the amount of time that has passed since the registration with the registrar 106 is not near the expiration value used between the network equipment device 104 and the registrar 106. As a result of the determination that a refresh register message is not required to keep the connection alive between the network equipment device 104 and the registrar 106, the network equipment device 104 does not relay or transmit a refresh register message to the registrar for end device 1 108 AOR-1. The network equipment device 104 generates SIP 200 (REGISTER) message 3098 locally to indicate to the end device 1 108 AOR-1 that the registration remains active. In step 3096, the network equipment device 104 also transmits the generated SIP 200 (REGISTER) message 3098 to the end device 1 108 AOR-1. Operation proceeds from step 3096 to step 3100.

In step 3100, the end device 1 108 AOR-1 receives and processes the SIP 200 (REGISTER) message 3098. Operation proceeds from step 3100 to step 3102.

In step 3102, the end device 108 AOR-1 once again determines that it needs to send a SIP REFRESH REGISTER message to refresh the registration with the network equipment device 104 so that it does not time out and the end device 108 AOR-1 be de-registered. Operation proceeds from step 3102 to step 3104.

In step 3104, the end device 1 108 AOR-1 generates and transmits SIP REFRESH REGISTER (AOR-1) message 3106 to the network equipment device 104. Operation proceeds from step 3104 to step 3108.

In step 3108, the network equipment device 104 receives and processes the SIP REFRESH REGISTER (AOR-1) message 3106. Operation proceeds from step 3108 to step 3110.

In step 3110, the network equipment device 104 determines that the amount of time that has passed since the registration with the registrar 106 is close to the expiration value used between the network equipment device 104 and the registrar 106 and that the refresh register message should be relayed to the registrar 106 or sent to the registrar 106 on behalf of end device 1 108 AOR-1 so that the AOR-1 registration does not time out. Operation proceeds from step 3110 to step 3112.

In step 3112, as a result of the determination that a refresh register message is required to keep the connection alive between the network equipment device 104 and the registrar 106, the network equipment device 104 generates SIP REFRESH REGISTER (AOR-1) message 3116. Operation proceeds from step 3112 to step 3114.

In step 3114, the network equipment device 104 transmits or relays the SIP REFRESH REGISTER (AOR-1) message 3116 to the registrar 106. Operation proceeds from step 3114 to step 3118.

In step 3118, the registrar 106 receives and processes the SIP REFRESH REGISTER (AOR-1) message 3116. Operation proceeds from step 3118 to step 3120.

In step 3120, the registrar 106 generates SIP 200 (REGISTER) 3124 message indicating that the AOR-1 registration has been successfully updated in response to the SIP REFRESH REGISTER (AOR-1) message 3116. Operation proceeds from step 3120 to step 3122.

In step 3122, the registrar 106 transmits the SIP 200 (REGISTER) message 3124 to the network equipment device 104. Operation proceeds from step 3122 to step 3126.

In step 3126, the network equipment device 104 receives and processes the SIP 200 (REGISTER) message 3124. Operation proceeds from step 3126 to step 3128.

In step 3128, the network equipment device 104 generates and transmits the SIP 200 (REGISTER) message 3130 to the end device 1 108 AOR-1. Operation proceeds from step 3128 to step 3132.

In step 3132, the end device 1 108 AOR-1 receives and processes the SIP 200 (REGISTER) message 3130 which acknowledges that the registration for the end device 1 108 AOR-1 has been successful refreshed.

In the above signaling diagram/method 300, the steps shown are a procedure to handle a single address of record AOR-1. It should be understood that the same procedure may be and typically is used for additional addresses of record (e.g., AOR-2, AOR-3) for which contexts or records existed prior to the switchover. In some embodiments, the procedure of trying to match initial REGISTER messages to existing contexts or records is based not only on the address of record included in the initial REGISTER message but also on the source IP address of the message. Furthermore, in some embodiments, the procedure of trying to match initial REGISTER messages to existing contexts or records is applied only until the number of existing matching contexts are identified for the particular address of record. All subsequent initial REGISTER messages received from the particular address of record are treated using standard procedures for initial REGISTER messages and are relayed to the registrar or an initial REGISTER request message is sent on the AOR's behalf regardless of whether or not the timer-1 has timed out, i.e., expired.

Diagram 12 of FIG. 12 illustrates lines 1200, 1210, 1220, 1230, 1240, 1250, 1260, 2170, 1280, 1290, 1300, 1310, 1320, 1330, 1340, 1350, 1360, 1370, 1380, 1390, 1400 of pseudocode for implementing an exemplary method in accordance with one embodiment of the present invention in which matching of contexts, by the network equipment device while operating in a switchover mode of operation, is based on the address of record (AOR). Optionally, the matching of contexts can be based on the address of record and source IP address of the received SIP initial REGISTER message.

The present invention is also applicable to scenarios where there are a large number of end devices (e.g., user equipment devices, that experience a short term power outage resulting in restart of the end devices on the restoration of power or when a Network Address Translation (NAT) device or Network Address and Port Translation (NAPT) device restarts whether from a power outage or for other reasons (e.g., a reboot or a reset of the device). In such scenarios, the result is a high number of new SIP initial REGISTER requests occurring at or about the same time or within a short time period. This high number of SIP initial REGISTER request messages being sent to the registrar can exceed the number of requests that the registrar can handle and/or degrade the services that can be provided by the registrar due to the large number of initial registration requests being received.

In a first scenario there is a Network Address Translation (NAT) device(s) which includes Network Address and Port Translation (NAPT) device(s) reboot or reset or a short term power outage for a plurality of end devices such as for example user equipment devices. The scenario results in an excessive SIP initial REGISTER rate from end devices (e.g., UEs) before existing end device/network equipment device registration expiry. In an exemplary embodiment, the network equipment device monitors for a condition indicating that one or more NAT devices has gone through a reboot/reset or indicating that there has been a power outage affecting a plurality of end devices. Upon detecting the condition is satisfied the network equipment device, e.g., a session border controller (SBC), switches from a regular or standard mode of operation to a special mode of operation for handling SIP registration requests, e.g., SIP initial REG- ISTER messages and SIP REFRESH REGISTER messages, received from end devices, e.g., user equipment devices. In some embodiments, the monitored for condition is a SIP initial REGISTER rate exceeding a first threshold SIP initial REGISTER rate for the network equipment device. In some embodiments the first threshold SIP initial REGISTER rate is the average SIP initial REGISTER rate measured by the network equipment device over a period of time. In an exemplary embodiment, the network equipment device generates the SIP initial REGISTER rate based on a running average of SIP initial REGISTER messages being received at the network equipment device and compares it to a rate of SIP initial REGISTER messages received over a defined period of time for example 2, 3, or 5 seconds. When the rate of the SIP initial REGISTER messages being received for the last time period (2, 3, or 5 seconds) exceeds the rate of the running average then the network equipment device determines that the condition has been satisfied and switches from a regular mode of operation into a special mode of operation. In the special mode of operation, the network equipment device upon receipt of a SIP initial REGISTER message searches its existing context or records (e.g., register control block records) based on the address of record included in the SIP initial REGISTER message (or the address of record included in the SIP initial REGISTER message and the source IP address of the message). When a match is found the matching context is updated and the SIP initial REGISTER message is treated as a SIP REFRESH REGISTER message that is not relayed to the registrar but is instead handled locally by generating and sending a SIP 200 (REGISTER) message to the end device with the matching address of record and resetting the expiration time for the connection between the network equipment device and end device address of record from which the SIP initial REGISTER message was received. When there is no existing context or record that is found to be a match for the address of record (or combination address of record and source IP address for the received SIP initial REGISTER message), the network equipment device generates a new context or record (register control block) for the registration request and relays the SIP initial REGISTER message to the registrar.

Once the network equipment device has entered into the special mode of operation, it begins to monitor for a condition indicating that the network equipment device should switch to a normal/standard/regular mode of operation in handling SIP initial REGISTER requests/messages (e.g., the mode of operation discussed in connection with signaling diagram 200 illustrated in FIG. 2). When the network equipment device detects that the condition has been satisfied it switches back to the normal/standard/regular mode of operation in handling SIP initial REGISTER requests in that it no longer searches for a match based on the address of record of the SIP initial REGISTER message but instead relays the message to the registrar.

In some embodiments, the condition indicating that the network equipment device should switch to a normal/standard/regular mode of operation in handling received SIP initial REGISTER requests/messages is when a threshold number of the total number of existing contexts or records (e.g., Register Control Blocks) available to the network equipment device (e.g., stored in memory) have been updated or the SIP initial REGISTER message rate for the last time period drops to or below a second threshold value. The second threshold value may be, and in some embodiments is, the same as the first threshold value. For example, the condition in some embodiments is that all or a significant majority (e.g., over 90%) of the existing contexts or records (e.g., Register Control Blocks (RCBs)) have been matched and updated or the last SIP initial REGISTER rate measured has dropped to or below the average SIP initial REGISTER rate of SIP initial REGISTER messages being received by the network equipment device.

Diagram 13 of FIG. 13 illustrates lines 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740 of pseudocode for use in a network equipment device implementing the steps of a method embodiment that addresses a short term power end device (UE) power outage and/or a Network Address Translation Device restart/reboot/reset scenario.

In a second scenario there is a long term power outage for end devices, e.g., user equipment devices. The symptoms or conditions of this second scenario are that there an excessive registration expiry between the end devices (UEs) and the network equipment device, e.g., SBC, and a low SIP REFRESH REGISTER rate compared to average REFRESH REGISTER rate. The SIP REFRESH REGISTER rate being the rate of SIP REFRESH REGISTER messages are received by the network equipment device over a period of time. In an exemplary embodiment which addresses this scenario the network equipment device monitors for a condition indicating that the network equipment device is to switch from a regular/normal/standard mode of operation (e.g., mode of operation discussed in connection with signaling diagram/method 200 of FIG. 2) to a special mode of operation regarding procedures for handling registration messages. In some embodiments, the condition is rate of registration expires between the end devices and network equipment device being greater than a first threshold value and/or the refresh REGISTER rate for refresh REGISTER messages received from the end devices being lower than a second threshold value. When the network equipment device detects that the condition is satisfied, the network equipment device keeps the existing contexts or records (e.g., Register Control Blocks (RCBs)) until they expire based on the network equipment device to registrar connection. That is even though the context or records (e.g., RCBs) are normally deleted when the end device fails to send a refresh REGISTER message before the expiration of a registration or connection refresh time period which has been negotiated between the end device and the network equipment device, in this case the network equipment device will not delete the context or record (e.g., RCBs) but will instead wait until the expiration of the expiry refresh time period between the network equipment device and register for the connection/registration of the address of record. While in the special mode of operation, the network equipment device, e.g., SBC, upon receiving a SIP initial REGISTER message will determine if a context or record (e.g., RCB) exists for the address of record by matching the address of record of the received message or the address of record and source IP address of the received message and if there is a match it will update the context or record and treat the SIP initial REGISTER message as a SIP REFRESH REGISTER message resetting the expiration time for the connection between the end device address of record which was matched and the network equipment device and generating and sending a SIP 200 (REGISTER) message to the end device from which the SIP initial REGISTER message was received as described above in connection with short term power outage.

Upon switch over to the special mode of operation, the network equipment device begins to monitor for a condition indicating that the network equipment device should switch back to a normal/standard/regular mode of operation regarding handling of SIP registration messages. In some embodiments, the condition is that a threshold number of existing contexts or records (e.g., RCBs) have been updated or have expired for the network equipment to registrar leg of the connection (e.g., all or 90% of existing contexts or records (e.g., RCBs). When the network equipment device detects that the condition indicating that the network equipment device should switch back to a normal/standard/regular mode of operation regarding handling of SIP registration messages has been satisfied, the network equipment device deletes any remaining contexts or records (e.g., RCBs) which had expired for failure to receive timely SIP REFRESH REGISTER messages from the end device addresses of record and begins relaying newly received SIP initial REGISTER messages to the registrar.

Diagram 14 of FIG. 14 illustrates lines 1800, 1810, 1820, 1830, 1840, 1850, 1860, 1870, 1880, 1890, 1900, 1910, 1920, 1930, 1940, 1950, 1960, and 1970 of pseudocode for use in a network equipment device implementing the steps of a method embodiment that addresses a long term power end device (UE) power outage scenario.

In scenarios in which a very long term power outage has occurred for end devices, e.g., UEs, the contexts or records for the leg of connection between the network equipment device and the registrar will expire as well as the leg of the connection between the end devices and the network equipment device. In such scenarios no special actions are taken and the network equipment device will not switch to a special mode of operation regarding procedures for handling SIP registration messages instead the network equipment device will remain in its regular/normal/standard mode of operation regarding procedures for handling SIP registration messages as shown in FIG. 2 and described above.

In another embodiment of the present invention, the network equipment device uses two modes of operation in connection with operations, procedures and/or steps used in handling SIP SUBSCRIBE requests/messages.

In the regular SIP SUBSCRIBE message handling mode of operation, when a subscriber control block (SCB) structure, e.g., context or record is created, the SCB is linked to the corresponding Register Control Block (context or record) when it is created. As mentioned this occurs before a mode switchover occurs during regular operation and linkage synchronization. The network equipment device stores the "last event state" in the SCB before switchover during regular operation and event state synchronization. The network equipment also stores the subscription expiry duration and the time the subscription was last updated before switchover during regular operation and expiry duration/last update time synchronization.

In special mode of operation the end device, UE, establishes a new TCP/TLS connection and registers. An existing Registration Control Block context or record is used and the linkage to the Subscriber Control Blocks are still in existence. A SIP SUBSCRIBE message is received by the network equipment device. The network equipment device searches the existing RCBs for a RCB which includes the 5 tuple (source IP address, source port, destination IP address, destination port, protocol) and/or address of record and source IP address of the received SIP SUBSCRIBE message. When the RCB is found, the corresponding SCB is determined based on the linkage between the RCB and the SCB and the event package name included in the SIP SUBSCRIBE message. When the time left on the subscription expiry is x, the network equipment device negotiates expiry as x-5 (or other configurable value) with the end device, e.g., UE device. The network equipment device then generates a SIP NOTIFY message locally and uses the last stored event state in the generated NOTIFY message. The next REFRESH SUBSCRIBE message received from the end device is then relayed to the registrar. Any SIP NOTIFY messages received from the Registrar when the end device is not reachable (e.g., during a power outage) is updated with the "last event state". The network equipment device generates and sends a SIP 200 (NOTIFY) reply message to the Registrar in response to the SIP NOTIFY message received from the Registrar. The network equipment device locally generates the SIP 200 reply message (i.e., without communicating with the end device) as the end device is not reachable. While the registrar could send a SIP NOTIFY message while the network equipment device is in the process of switching over from the regular mode of operation to the special mode of operation, the probability of such an event occurring and the corresponding transaction timing out is marginal considering expiration times/transaction timeout.

Figure 4:
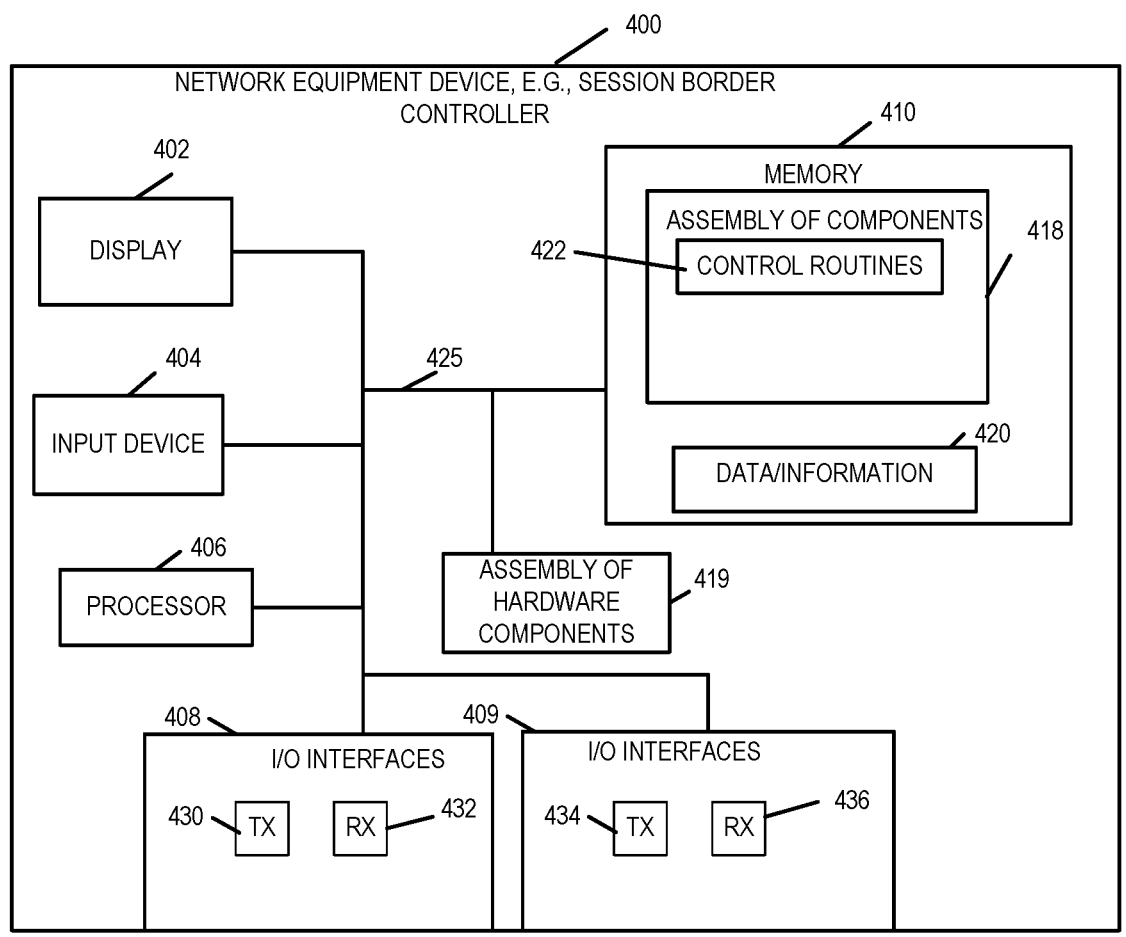
FIG. 4 illustrates exemplary aspects of a network equipment device in accordance with one embodiment of the present invention.

FIG. 4 illustrates an exemplary network equipment device 400, such as for example, a Session Border Controller (SBC).

In some embodiments, the network equipment devices 102 and 104 shown in FIGS. 1, 2 and 3 are implemented in accordance with the network equipment device 400. Exemplary network equipment device 400 includes an optional display 402, an input device 404, a processor 406, e.g., a CPU, I/O interfaces 408 and 409, which couple the network equipment device 400 to networks or communications links and/or various other devices, memory 410, and an assembly of hardware components 419, e.g., circuits corresponding to different components and/or modules, coupled together via a bus 425 over which the various elements may interchange data and information.

Memory 410 includes an assembly of components 418, e.g., an assembly of software components, and data/information 420. The assembly of software components 418 includes a control routines component 422 which includes software instructions which when processed and executed by processor 406 control the operation of the network equipment device 400 to perform various functions and/or one or more steps of the various method embodiments of the invention.

The I/O interfaces 408 includes transmitters 430 and receivers 432. The I/O interfaces 409 includes transmitters 434 and receivers 436. The I/O interfaces are hardware interfaces including hardware circuitry. The network equipment device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), Session Initiation Protocol (SIP), Session Description Protocol (SDP), Real-time Transport Protocol (RTP), and RTP Control Protocol (RTCP). In some embodiments, the network equipment device 400 includes a communication component configured to operate using IP, TCP, SDP and SIP protocol signaling methods. In some embodiments, the communications component is a hardware component, a software component or a component including hardware and software components. In some embodiments, instead of a single processor 406, the network equipment device 400 includes a plurality of processors.

Figure 5:
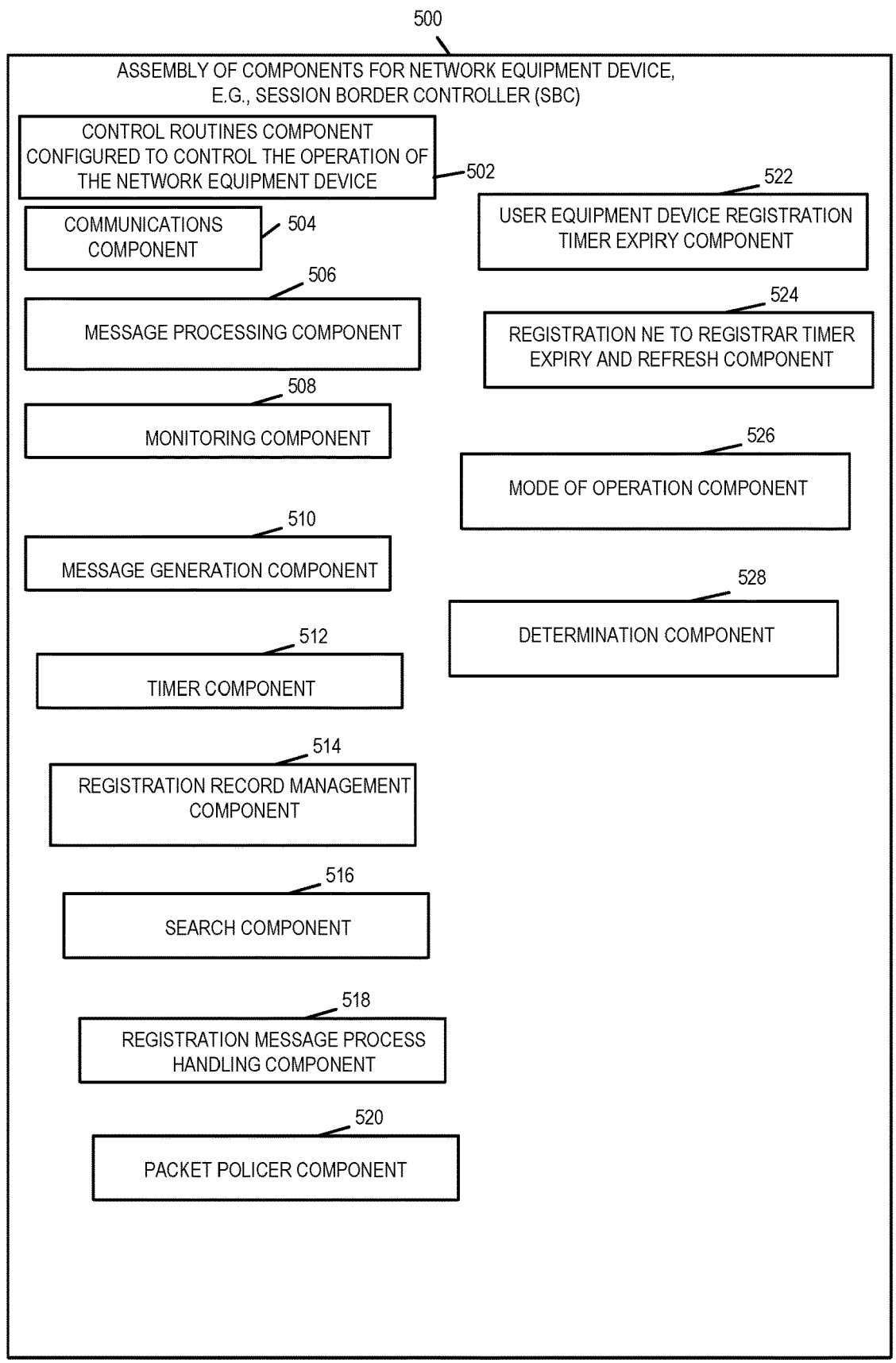
FIG. 5 illustrates an exemplary assembly of components for use in a network equipment device in accordance with one embodiment of the present invention.

An exemplary assembly of components 500 for a network equipment device in accordance with an embodiment of the present invention is illustrated in FIG. 5. One or more of the assembly of components may be implemented as hardware components in the assembly of hardware components 419 or as software components in the assembly of software components 418 stored in memory 410 of the exemplary network equipment device 400. The assembly of components 500 will be discussed in further detail below.

Figure 6:
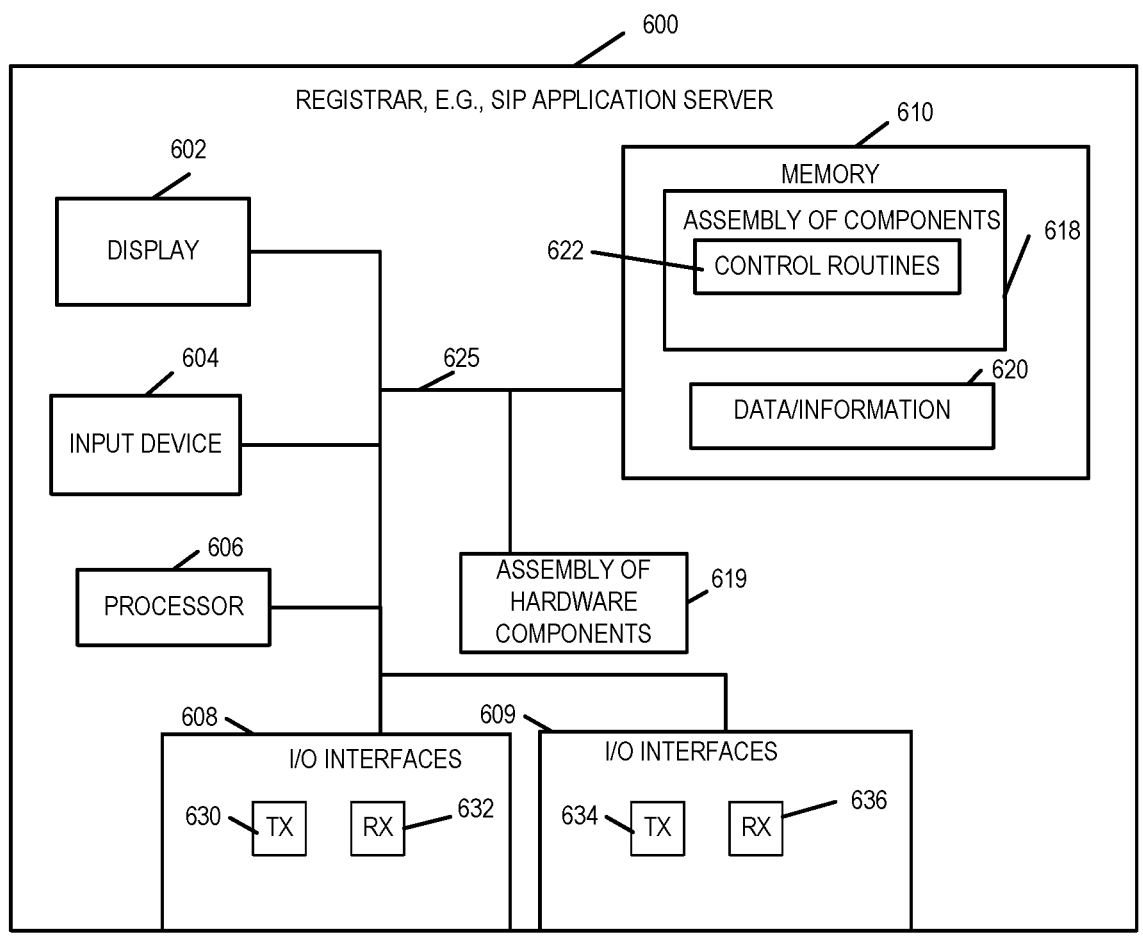
FIG. 6 illustrates exemplary aspects of a Registrar in accordance with one embodiment of the present invention.

FIG. 6 illustrates a Registrar, e.g., a SIP application server that provides SIP application services as well as registration services (e.g., authentication of end devices or user devices before providing requested services). In some embodiments, the Registrar serves endpoint devices such as for example, user equipment devices in connection with providing Voice Over Internet Protocol communications services. In some embodiments, the Registrar 106 shown in FIG. 1 is implemented in accordance with Registrar device 600. Exemplary Registrar 600 includes an optional display 602, an input device 604, a processor 606, e.g., a CPU, I/O interfaces 608 and 609, which couple the Registrar 600 to networks or communications links and/or various other devices such as network equipment devices 102 and 104, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the Registrar 600 device to perform various functions and/or one or more steps of the various method embodiments of the invention. The I/O interfaces 608 includes transmitters 630 and receivers 632. The I/O interfaces 609 includes transmitters 634 and receivers 636. The I/O interfaces are hardware interfaces including hardware circuitry. The Registrar 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the SIP, SDP, IP, Transport Control Protocol (TCP) protocols. In some embodiments, the Registrar device 600 includes a communications component configured to operate using SIP, SDP, IP, and TCP protocols. In some embodiments, the communications component is a hardware component, a software component or a component including hardware and software components.

Figure 7:
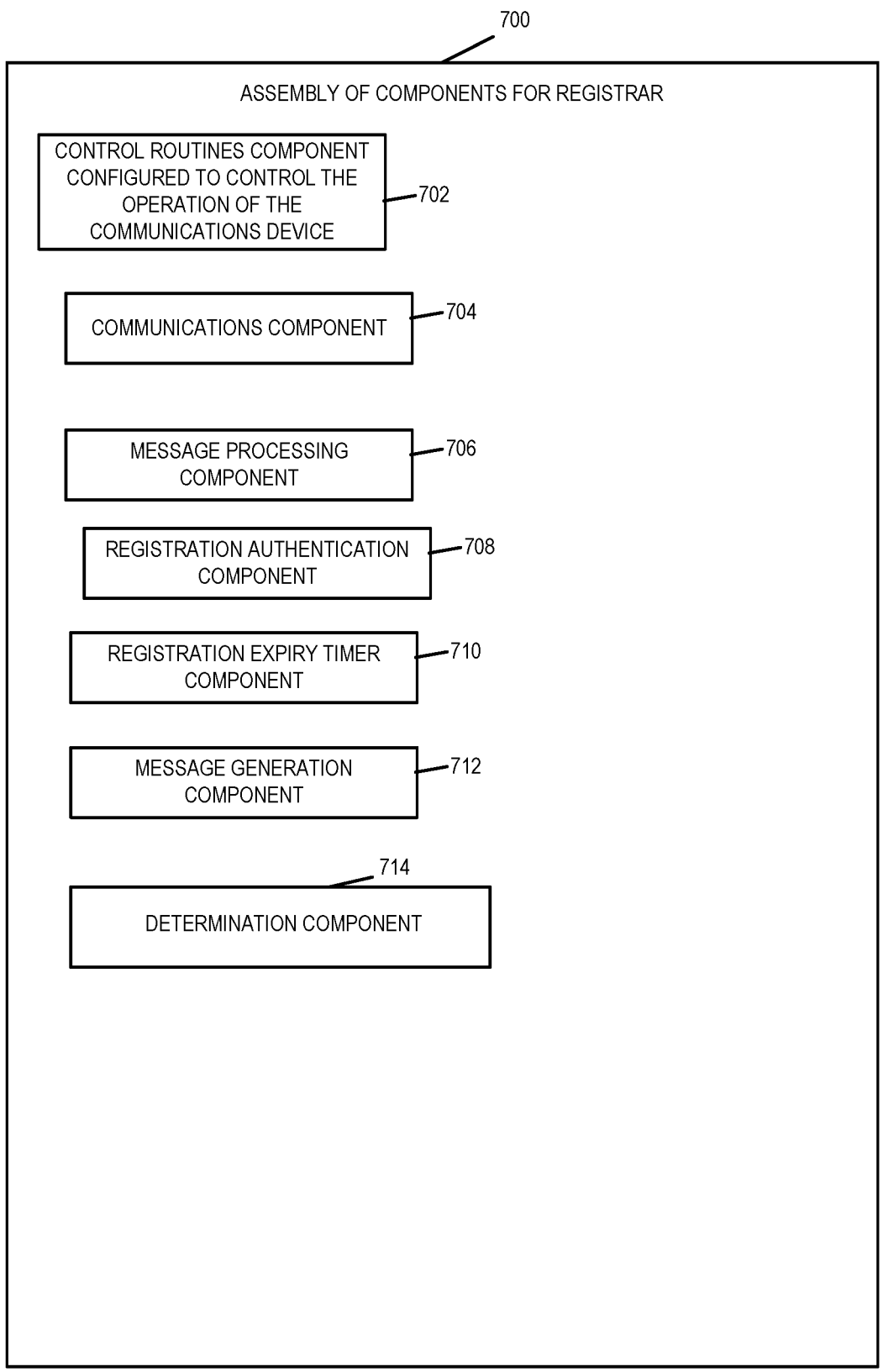
FIG. 7 illustrates an exemplary assembly of components for use in a Registrar in accordance with one embodiment of the present invention.

An exemplary assembly of components 700 for a Registrar in accordance with an embodiment of the present invention is illustrated in FIG. 7. One or more of the assembly of components 700 may be implemented as hardware components in the assembly of hardware components 619 or as software components in the assembly of software components 618 stored in memory 610 of the exemplary Registrar 600. The assembly of components 700 will be discussed in further detail below.

Figure 8:
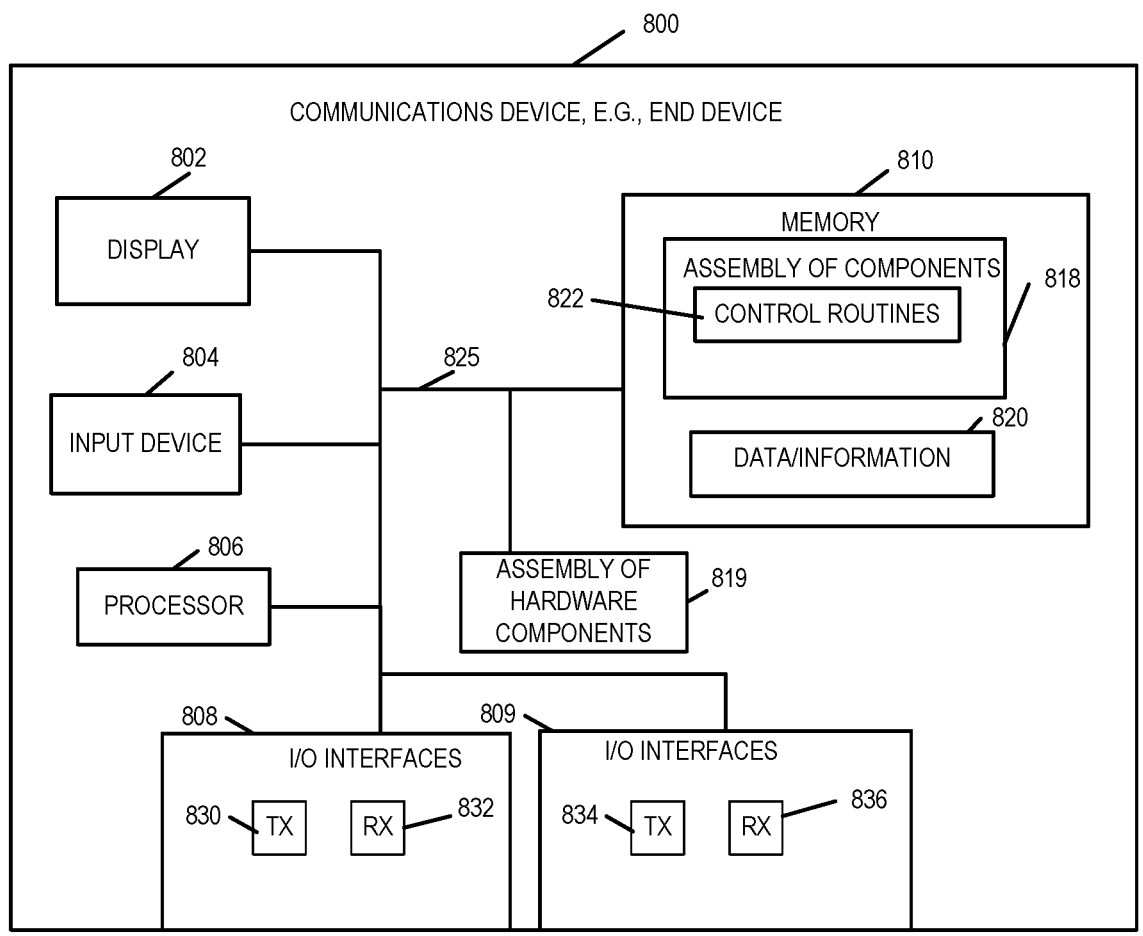
FIG. 8 illustrates exemplary aspects of a communication device illustrated as an end device in accordance with one embodiment of the present invention.

FIG. 8 illustrates an exemplary communications device 800, e.g., an end device or a user equipment device such as a plain old telephone, a mobile phone, a Voice Over Internet Protocol telephone, IP telephone, a computer, a laptop, a tablet, smartphone. In some embodiments, the following devices and/or systems are implemented in accordance with the exemplary communications device 800: end device 1 106, end device 2 110, end device 3 112, . . . , end device N 114, end device B1 124, end device B2 126, . . . , end device BM 128.

Exemplary communications device 800 includes an optional display 802, an input device 804, a processor 806, e.g., a CPU, I/O interfaces 808 and 809, which couple the communications device 800 to networks or communications links and/or various other devices such as network equipment devices 102 and 104 and NA(P)T device 122, memory 810, and an assembly of hardware components 819, e.g., circuits corresponding to different components and/or modules, coupled together via a bus 825 over which the various elements may interchange data and information. Memory 810 includes an assembly of components 818, e.g., an assembly of software components, and data/information 820. The assembly of software components 818 includes a control routines component 822 which includes software instructions which when processed and executed by processor 806 control the operation of the communications device 800 to perform various functions and/or one or more steps of the various method embodiments of the invention. The I/O interfaces 808 include transmitters 830 and receivers 832. The I/O interfaces 809 include transmitters 834 and receivers 836. The I/O interfaces are hardware interfaces including hardware circuitry. The communications device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), Session Initiation Protocol (SIP), Session Description Protocol (SDP), Real-time Transport Protocol (RTP), and RTP Control Protocol (RTCP). In some embodiments, the communications device 800 includes a communication component configured to operate using IP, TCP, SDP and SIP protocol signaling methods. In some embodiments, the communications component is a hardware component, a software component or a component including hardware and software components.

Figure 9:
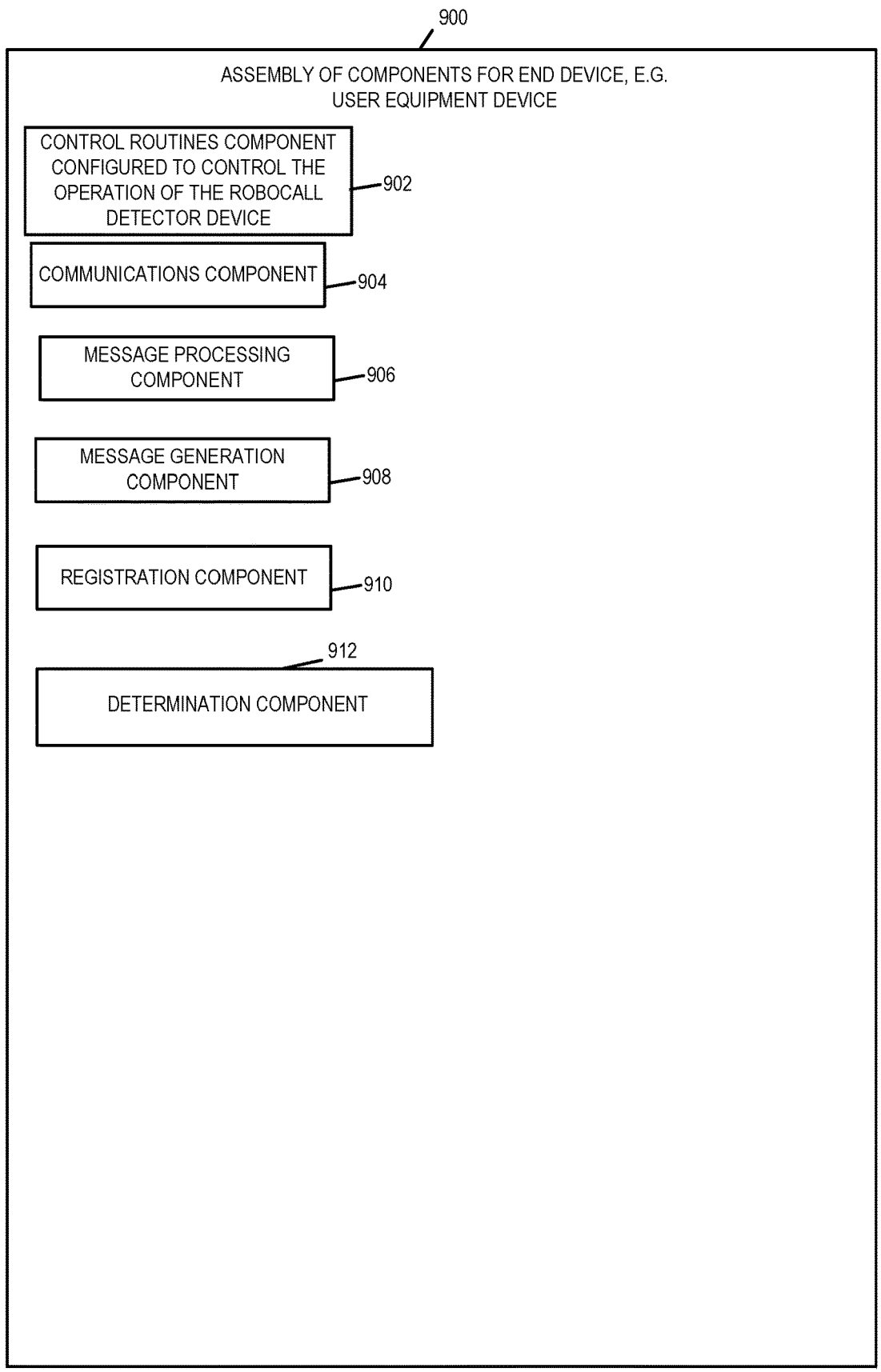
FIG. 9 illustrates an exemplary assembly of components for use in a communications device such as an end device in accordance with one embodiment of the present invention.

FIG. 9 illustrates an exemplary assembly of components 900 for a communications device wherein one or more of the components may be, and are used, in implementing one more of the communications devices illustrated in FIG. 1 as end devices 108, 110, 112, 113, . . . , 114, 124, 126, . . . , 128.

One or more of the assembly of components 900 may be implemented as hardware components in the assembly of hardware components 819 or as software components in the assembly of software components 818 stored in memory 810 of the exemplary communications device 800. The assembly of components 900 will be discussed in further detail below.

Figure 15:
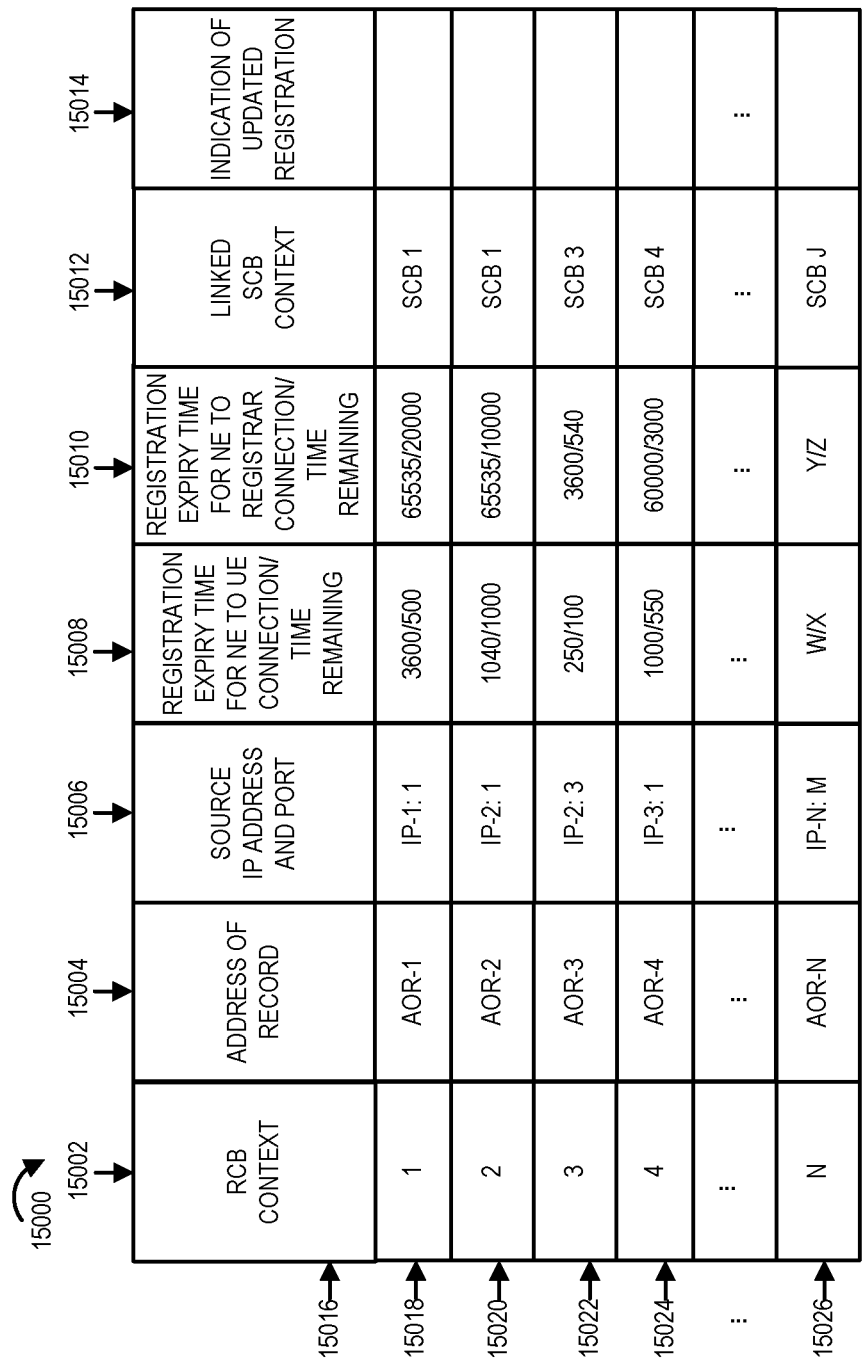
FIG. 15 illustrates exemplary information included in exemplary registration records in accordance with an embodiment of the present invention.

FIG. 15 illustrates a table 15000 showing information included in exemplary fields of exemplary registration records referred to as registration control block (RCB) contexts.

The registration records may be, and in some embodiments are, generated by a network equipment device, for example, network equipment device 400 of FIG. 4 and stored in memory, e.g., data/information section 420 of memory 410. Row 15016 of table 15000 is not part of the information included in the table but is a header which has been included for explanatory purposes. Table 15000 includes registration record identification information referred to as RCB context information included in column 15002, address of record information included in column 15004, source IP address and port number information included in column 15006, registration expiry time for the network equipment device to end device (e.g., UE) information and the time remaining before expiration of the registration at the network equipment device is included in column 15008, registration expiry time for network equipment device to registrar connection and the time remaining before expiration of the registration at the registrar is included in column 15010, linked subscriber control block record information is included in column 15012 which is referred to as a SCB context and which provides identifying information linking the registration to a particular subscriber control block record, and an indication of whether the registration has been updated since entering this mode of operation is included in column 15014. Each of the rows 15018, 15020, 15022, 15024, . . . , 15026 of table 15000 is a record that associates the RBC context registration record identified in column 15002 of the row with the corresponding registration information including the address of record in column 15004, source IP address and port number in column 15006, registration expiry time for NE to UE registration connection/amount of time remaining before registration time out at network equipment device in column 15008, registration expiry time for NE to Registrar registration connection/amount of time remaining before registration time out at registrar in column 15010, information linking registration to SCB context record in column 15012 and information indicating whether the RCB context record has been updated since entering this mode of operation in column 15014. For example, row 15018 is information corresponding to registration record including RCB context 1 (row 15018, column 15002 entry) which is the registration record identifier assigned by the network equipment device in connection with the creation of the registration record to track a registration by an end device with a registrar, address of record information to which the registration record corresponds is included in row 15018, column 15004 entry which includes the address of record AOR-1, the source IP address and port number corresponding to the registration is included in row 15018, column 15006 entry and includes IP-1:1 referring to source IP address 1 and port number 1, registration expiry time for NE to UE registration connection and the time remaining before expiration by the NE is shown in row 15018, column 15008 which includes 3600 seconds for the registration expiry time and 500 seconds for the time remaining before the registration expires, i.e., times out, at the network equipment device, registration expiry time for NE to registrar registration connection and the time remaining before the registration connection expires, i.e., times out, at the registrar is shown in row 15018, column 15010 entry which includes 65535 seconds and 20000 seconds remaining before the registration connection expires, i.e., times out, at the registrar, the SCB context to which this registration is linked is included in row 15018, column 15012 entry which includes SCB 1, and an indication of whether the registration record has been updated is included in row 15018, column 15014 entry which is currently unpopulated indicating this registration has not been updated. The entries in this column are populated when the network equipment device begins processing registration messages in a mode of operation different than its normal mode of operation, e.g., when it switches to a mode of operation wherein the network equipment device begins treating initial registration request messages as refresh request registration messages and then updates the registration record. The RCB context record may also include TCP stack information but as previously noted if this is a RCB context record in a network equipment device operating in a backup standby mode of operation the TCP sequence numbers included in the TCP stack information will not be synchronized with the TCP sequence numbers for the same RCB context record included in the primary network equipment device operating in the active mode of operation. Rows 15020, 15022, 15024, . . . , 15026, each contain information corresponding to a different RCB context registration record with information pertaining to a different registration. In some embodiments, the network equipment device uses the records/information stored in table 15000 to properly correlate requests for service such as for example an initial SIP REGISTER request, refresh SIP REGISTER request, a subscription service request, etc., with their corresponding registration and also the status of the registration, e.g., when a registration refresh message needs to be received from an end device before the registration expires at the network equipment device, and tracking when the network equipment device needs to send or relay a refresh registration request to the registrar to prevent the registration from expiring at the registrar. The network equipment device uses the information in table 15000 to efficiently handle registration request messages after power outages affecting a plurality of end devices, after switchover from primary network equipment devices to standby network equipment devices, and/or when NAT devices interacting with the network equipment device experience a reset as described herein.

Figure 16:
FIG. 16 illustrates exemplary information included in exemplary registration records in accordance with an embodiment of the present invention.

FIG. 16 illustrates a table 15000' showing information included in exemplary fields of exemplary registration records referred to as registration control block (RCB) contexts. The difference between table 15000 of FIG. 15 and table 15000' of FIG. 16 is that the column 15006' source IP address, port information has been updated for rows 15018' and 15022' and the indication of updated registration column information column 15014' has been populated for rows 15018', 15020', 15022', 25024', . . . , 15026'. In this example, when the network equipment device switches modes of operation it clears the indication of whether the registration record had been updated for this mode of operation, e.g., by entering NO in column 15014' the record entry. Thereafter while operating in the new mode of operation the network equipment device will indicate whether the registration record has been updated as previously described. RCB contexts 1 and 3 have entries (row 15018', column 15014' and row 15022', column 15014') of YES indicating that these registration records have been updated while the network equipment device has been operating in this mode of operation. The registration record illustrated in 15018' has been updated so that the source IP address and port has been updated from IP-1: 1 (row 15018, column 15006 entry) to IP-1: 3 (row 15018', column 15006' entry) meaning that while the address of record and source IP address have not changed for the corresponding registration, the source port number has changed from port 1 to port 3. Similarly, the source IP address and port number for RCB context registration record 3 has been updated from IP-2: 3 (row 15022, column 15006 entry) to IP-2:4 (row 15022', column 15006' entry) meaning that while the address of record and source IP address have not changed for the registration, the source port number has changed from port 3 to port 4.

Figure 17:
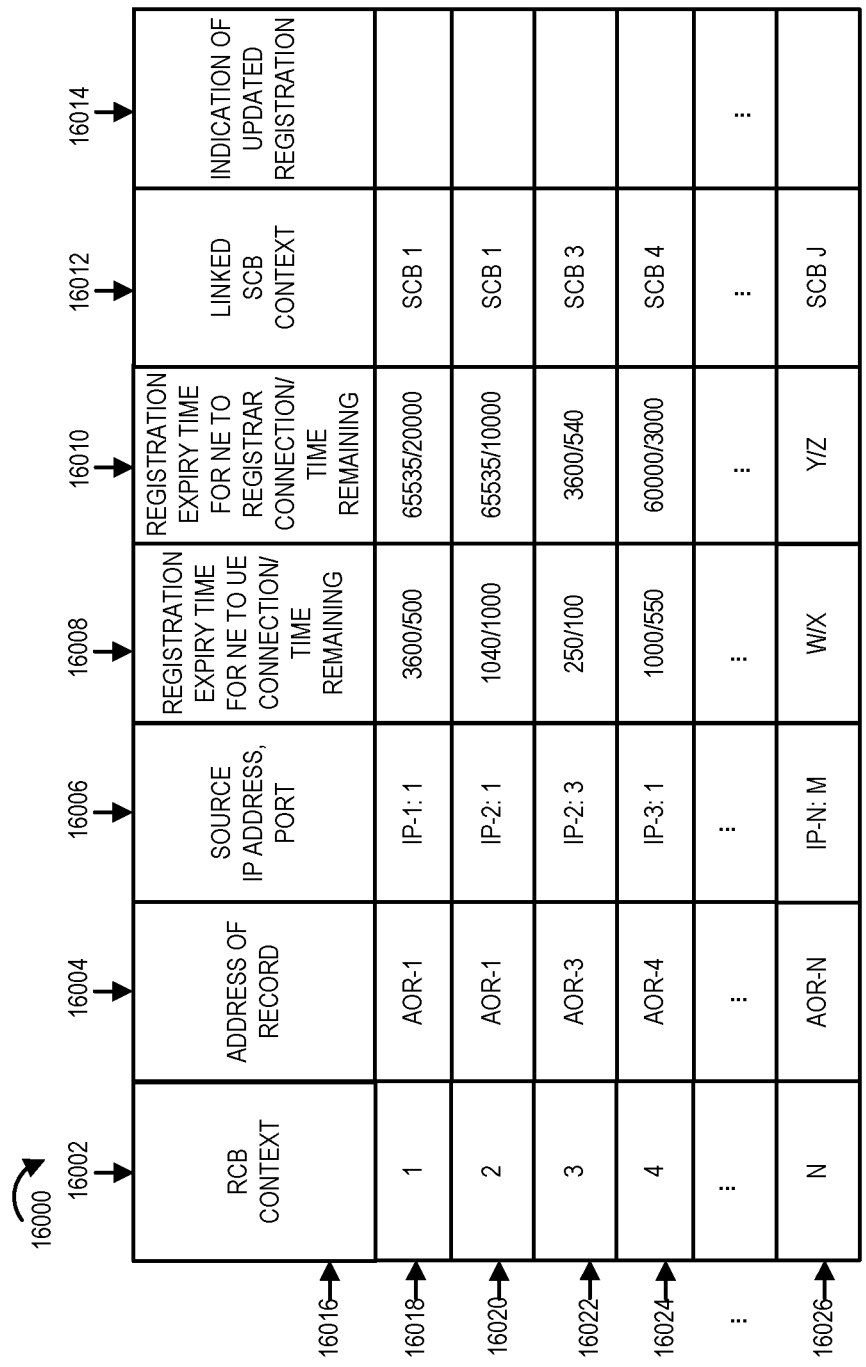
FIG. 17 illustrates exemplary information included in exemplary registration records in accordance with an embodiment of the present invention.

FIG. 17 illustrates a table 16000 showing information included in exemplary fields of exemplary registration records referred to as registration control block (RCB) contexts.

The registration records may be, and in some embodiments are, generated by a network equipment device, for example, network equipment device 400 of FIG. 4 and stored in memory, e.g., data/information section 420 of memory 410. Row 16016 of table 16000 is not part of the information included in the table but is a header which has been included for explanatory purposes.

The information contained in the rows 16016, 16018, 16020, 16022, 16024, . . . , 16026 are similar to the information contained in rows 15016, 15018, 15020, 15022, 15024, . . . , 15026 of table 15000 respectively with the exception that RBC context 2 registration record information indicates in entry of row 16020, column 16004, that the address of record is AOR-1 which is the same as the address of record for RCB context 1 registration record in entry row 16018, column 16004 entry. In this example, the address of record AOR-1 has multiple registrations and the source IP address and port number are used to distinguish between the two registrations with the same AOR-1 address of record.

Figure 18:
FIG. 18 illustrates exemplary information included in exemplary registration records in accordance with an embodiment of the present invention.

FIG. 18 illustrates a table 16000' which is table 16000 of FIG. 17 updated to illustrate changes since a network equipment device switches modes of operation similar to the changes illustrated and discussed in connection with FIG. 16 with the exception that the RCB context 2 registration record has an address of record AOR-1. It will be appreciated that to identify a matching registration record upon receipt of a registration message in the context of registration records shown in tables 16000 and 16000' both the address of record and source IP address included in the SIP registration request message are utilized so as to be able to distinguish between the registration corresponding to the RCB context 1 registration record and registration corresponding to the RCB context 2 registration record both of which have AOR-1 as the address of record.

It should be understood that in connection with FIGS. 16 and 18 the time remaining represents the time remaining after the time remaining for NE to UE registration connection was reset when the update of the record occurred after a registration message from an end device was matched to the record.

In FIGS. 15, 16, 17 and 18 N is an integer greater then 4, M is an integer representing a port number, W, X, Y and Z are integers in units of seconds, J is an integer greater than 4 representing a SCB conext.

Figure 10A:
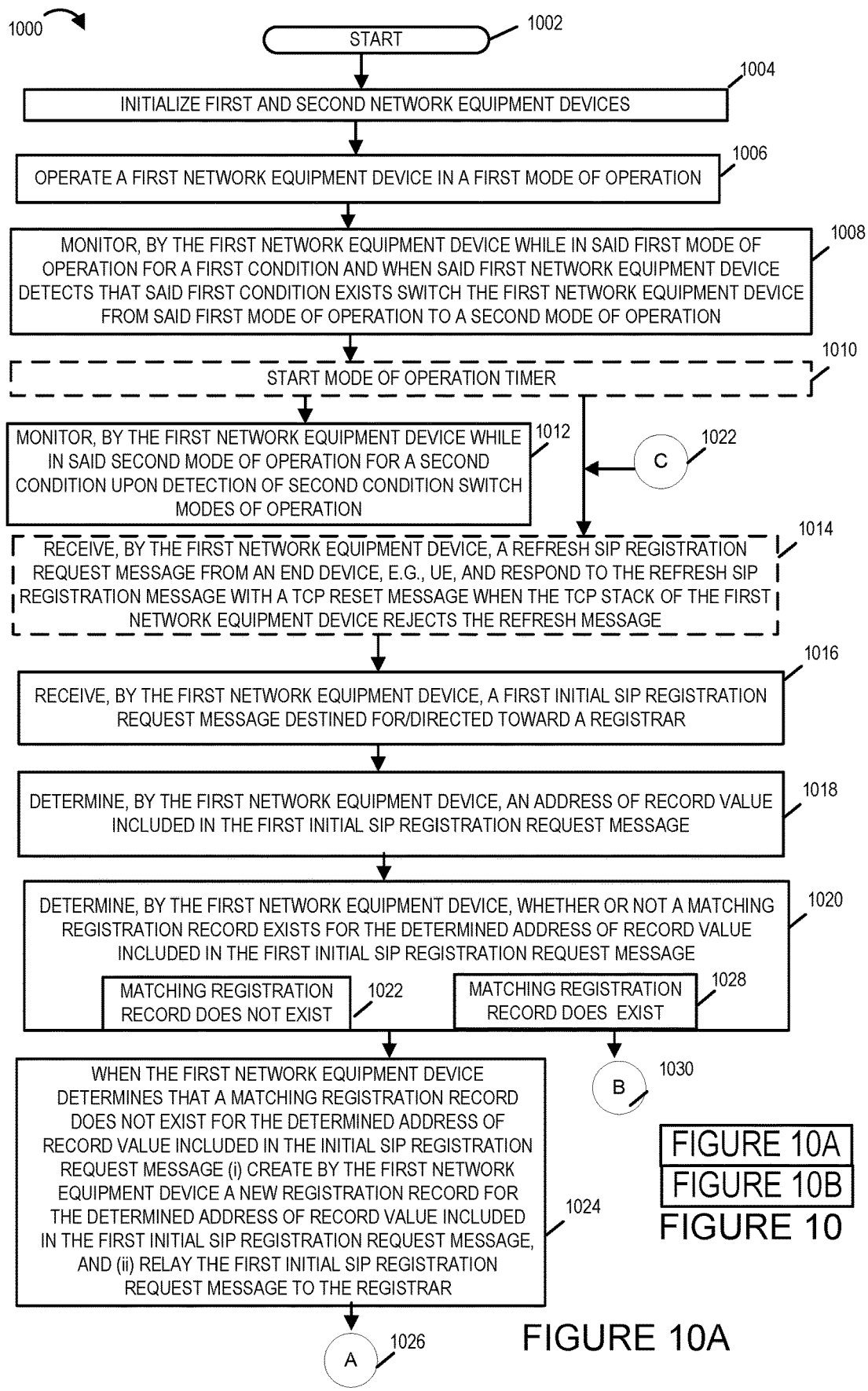
FIG. 10A illustrates a first part of a flowchart showing the steps of an exemplary communications method in accordance with one embodiment of the present invention.
Figure 10B:
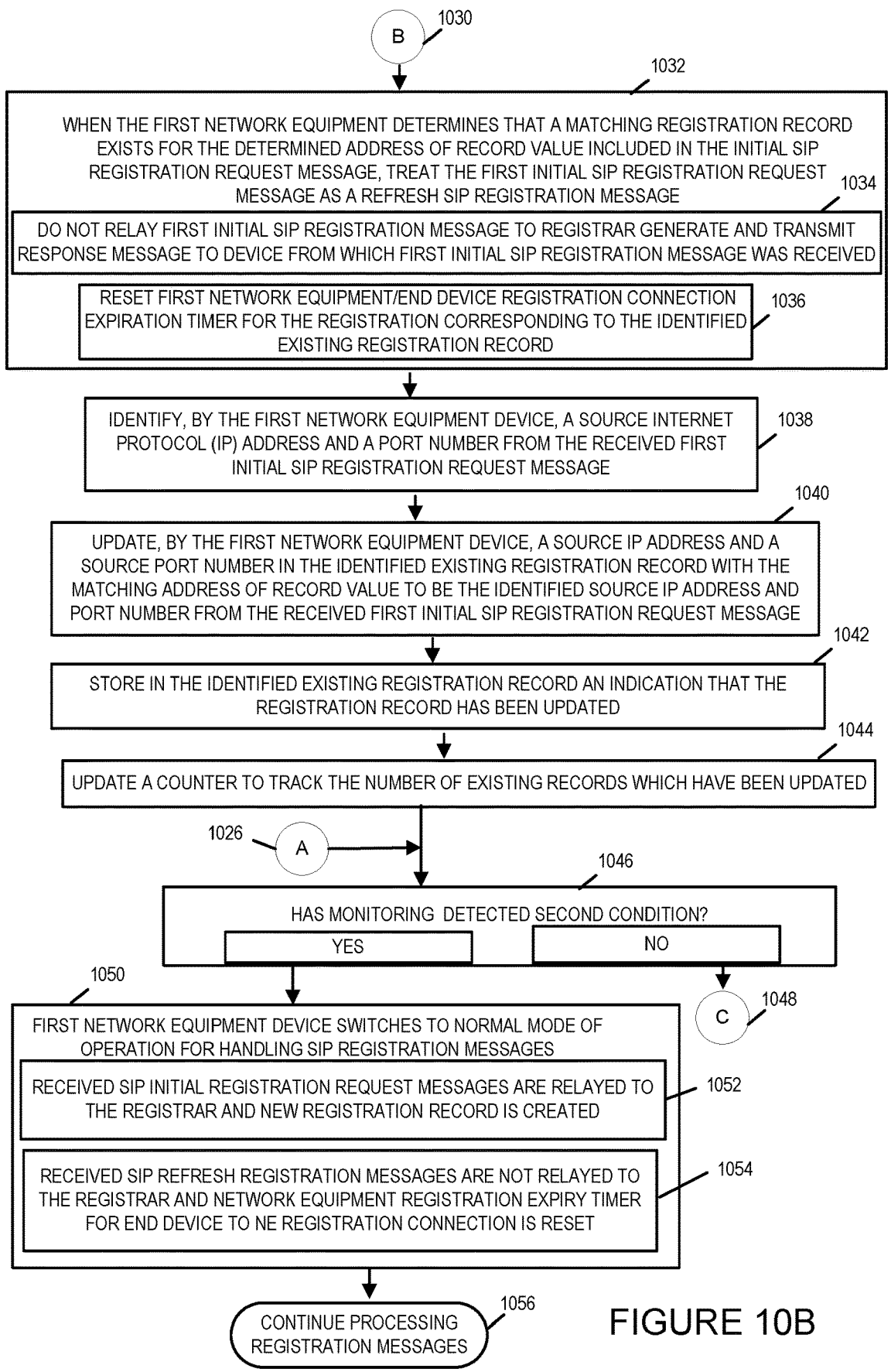
FIG. 10B illustrates a second part of a flowchart showing the steps of an exemplary communications method in accordance with one embodiment of the present invention.

FIG. 10 comprises the combination of FIGS. 10A and 10B. FIG. 10A illustrates a first part of a flowchart of an exemplary method in accordance with an embodiment of the present invention. FIG. 10B illustrates a second part of a flowchart of an exemplary method in accordance with an embodiment of the present invention. The steps of method 1000 illustrated in FIG. 10 may be, and in some embodiments are, implemented on devices illustrated in the system of FIG. 1. The exemplary method 1000 will now be explained in connection with exemplary system 100 though it should be understood that system 100 is only be used for explanatory purposes and that the method 1000 may be implemented on other devices and in other systems.

The method 1000 begins at start step 1002 shown on FIG. 10A. Operation proceeds from start step 1002 to step 1004.

In step 1004, first and second network equipment devices are initialized, e.g., network equipment devices 102 and 104 from system 100 illustrated in FIG. 1. In some embodiments in which only a single network equipment device is operated then only a single network equipment device (e.g., network equipment device 102) is initialized. During initialization the network equipment devices are placed in a first mode of operation, the first mode of operation may be different for different devices. For example, a primary network device may be placed in an active mode of operation wherein it services incoming requests while a secondary network equipment device may be placed in a standby mode of operation wherein it receives copies of registration records generated by the primary network equipment device and monitors for a condition indicating the primary network equipment device has failed but does not actively handle service requests. In another example wherein there is only a single network equipment device, the single network equipment device may be placed in a mode of operation in which it handles registration messages using a regular registration handling procedure such as for example the procedure described in signaling diagram/method 200 illustrated in FIG. 2. Operation proceeds from step 1004 to step 1006.

In step 1006, the first network equipment device controlled by one or more processors is operated in a first mode of operation. Operation proceeds from step 1006 to step 1008.

In step 1008, the first network equipment device while operating in said first mode of operation monitors for a first condition and when said first network equipment device detects that said first condition exists switches from operating in the first mode of operation to operating in a second mode of operation. In some embodiments such as when the first network equipment device is operating in a first mode of operation which is a standby or backup mode of operation, the first condition is a condition indicative of a failure of another network equipment device (i.e., the primary network equipment from which the first network equipment device will take over handling current and future service requests. In some such embodiments, the first network equipment device monitors for heart beat signals or other signals indicating the health of the primary network equipment device and for an indication that the primary network equipment device has failed such as the failure to receive heart beat signals from the primary network equipment device. Operation proceeds from step 1008 to optional step 1010 or if optional step 1010 is not implemented to steps 1012 and optional step 1014. If optional step 1014 is not implemented than to step 1016.

In optional step 1010, the first network equipment device upon switching to the second mode of operation starts a mode of operation timer. Optional step 1010 is typically implemented when the first mode of operation is a standby mode of operation and the second mode of operation is an active mode of operation wherein the first network equipment device takes over for a failed network equipment device. Operation proceeds from step 1010 to steps 1012 and optional step 1014.

In step 1012, the first network equipment device while operating in the second mode of operation monitors for a second condition and upon detection of the second condition switches modes of operation, for example to a third mode of operation or back to the first mode of operation. The monitoring goes on continuously while first network equipment device is operating in the second mode of operation.

In optional step 1014, the first network equipment device receives a refresh SIP registration message from an end device, e.g., end device 108 of system 100 illustrated in FIG. 1 and responds to the refresh SIP registration message with a TCP RST (reset) message when the TCP stack of the first network equipment device rejects the refresh message, e.g., because the TCP sequence number is not keep in the corresponding registration record or the TCP sequence number in the corresponding registration record does not match (i.e., the TCP connection synchronization has been lost). This typically occurs when a switchover has occurred from a primary network equipment device to a secondary or standby network equipment device after a failure of the primary network equipment device when the standby network equipment device does not have registration records including TCP sequence number synchronization. When the end device receives, the TCP reset message it will terminate the TCP connection over which the SIP refresh registration message was sent to the first network equipment device, establish a new TCP connection with the first network equipment device and transmit a first initial SIP registration record to the first network equipment device. Operation proceeds from optional step 1014 to step 1016.

In step 1016, the first network equipment device receives a first initial SIP registration request message destined and/or directed toward a registrar, e.g., registrar 106 illustrated in system 100 of FIG. 1. In embodiments in which optional step 1014 was implemented, the first initial SIP registration request message is the message transmitted by the end device which registered the TCP reset message. Operation proceeds from step 1016 to step 1018.

In step 1018, the first network equipment device determines an address of record value included in the first initial SIP registration request message. Operation proceeds from step 1018 to step 1020.

In step 1020, the first network equipment device determines whether or not a matching registration record exists for the determined address of record value included in the first initial SIP registration request message. When the first network equipment device determines that a matching registration record does not exist operation proceeds from step 1020 sub-step 1022 to step 1024. When the first network equipment device determines that a matching registration record does exist operation proceeds from step 1020 sub-step 1028 via connection node B 1030 to step 1032 shown on FIG. 10B.

In step 1024, the first network equipment device generates or creates a new registration record for the determined address of record value included in the first initial SIP registration request message and relays the first initial SIP registration request message to the registrar. Operation proceeds from step 1024 via connection node A 1026 to step 1046 illustrated on FIG. 10B.

Returning to step 1032, in step 1032 when the first network equipment determines that a matching registration record exists for the determined address of record value included in the initial SIP registration request message, the first network equipment device treats the initial SIP registration request message as a refresh SIP registration message. In some embodiments, step 1032 includes one or more sub-steps 1034 and 1036.

In sub-step 1034, the first network equipment device does not relay the first initial SIP registration record to the registrar but instead generates and transmits a response message to the device from which the first initial SIP registration message was received.

In sub-step 1036, the first network equipment device resets the first network equipment device/end device registration connection expiration timer for the registration corresponding to the identified existing registration record.

Operation proceeds from step 1030 to step 1038. In step 1038, the first network equipment device identifies a source Internet Protocol (IP) address and a source port number from the received first initial SIP registration request message. Operation proceeds from step 1038 to step 1040.

In step 1040, the first network equipment device updates a source IP address and a source port number in the identified existing registration records with the matching address of record value to be the identified source IP address and source port number from the received first initial registration request message. Operation proceeds from step 1040 to step 1042.

In step 1042, the first network equipment device stores in the identified existing registration record an indication that the registration record has been updated. Operation proceeds from step 1042 to step 1044.

In step 1044, the first network equipment device updates a counter to track the number of existing registration records which have been updated. In at least some embodiments, the first network equipment device also updates the number of existing registration records to reflect not only the number of existing registration records which have been updated but also the number of existing registration which have expired and been deleted, e.g., expiration and deletion of registration and corresponding registration record because registration expiry timer at first network equipment device expired (end device/first network equipment device registration expiration) without being refreshed or expiration and deletion of registration and corresponding registration record because registration expiry timer at registrar expired (first network equipment device/registrar registration expiration) without being refreshed by first network equipment device. This allows the tracking of the number of existing registration records from the time the first network equipment device entered the second mode of operation which are still in existence and which can possibly be updated. Operation proceeds from step 1044 to step 1046.

In step 1046, the first network equipment device determines whether the monitoring commenced in step 1012 has detected the existence of the second condition. In some embodiments such as those in which the first mode of operation is a standby mode of operation, the second mode of operation is an active mode of operation, the first condition is a condition indicative of a failure of another network equipment device and the second condition is the expiration of the mode of operation timer started in step 1010. In some embodiments, the second condition includes the expiration of the second mode of operation duration timer or the completion of updating a first threshold number of registration records of the set of existing registration records. In some such embodiments, first threshold number is the number of registration records of the set of existing registration records at the time the first network equipment device switched to the second mode of operation. In some embodiments, the first threshold number is the number of existing registration records of the set of existing registration records at the time the first network equipment device switched to the second mode of operation minus the number of registration records which have been deleted, e.g., due to registration timeout at the registrar or the first network equipment device which resulted in the registration being terminated and the existing registration record deleted.

In step 1046, operation proceeds from step 1046 via connection node C 1048 back to optional step 1014 or step 1016 if optional step 1014 is not implemented when the existence of the second condition has not been detected by the first network equipment device. It should be noted that the first network equipment device remains in the second mode of operation and continues to monitor for the second condition. Furthermore, it should also be appreciated that the processing continues from step 1014 or step 1016 wherein the next initial SIP registration message is processed in the same manner as the first initial SIP registration request message. The references to first SIP registration request is replaced in the steps of the method by next initial SIP registration message as the process proceeds.

In step 1046, operation proceeds from step 1046 to optional step 1014 or step 1050 when the existence of the second condition has been detected by the first network equipment device.

In step 1050, the first network equipment device once again switches modes of operation switching from the second mode of operation to a regular mode of operation for handling SIP registration messages, also sometimes referred to a standard or normal mode of operation. In some embodiments, step 1050 includes sub-step 1052 and 1054. In sub-step 1052 when the first network equipment device is operating in the normal mode of operation received SIP initial registration request message are relayed to the registrar and a new registration record is created or generated for the registration. In sub-step 1054, when the first network equipment device is operating in the normal mode of operation received refresh SIP registration messages are not relayed to the registrar but are handled locally at the first network equipment device with the corresponding network equipment registration expiry timer for end device to network equipment registration connection being reset upon receipt and processing of the refresh SIP registration message. In the exemplary normal mode of operation, initial SIP registration request messages are not treated as refresh SIP registration messages. In some embodiments, the normal mode of operation includes the procedures discussed in method 200 of FIG. 2. Operation proceeds from step 1054 to step 1056.

In step 1056, the first network equipment device continues processing for registration messages. In some embodiments, the first mode of operation is the normal mode of operation. In some of such embodiments, the first network equipment device in proceeds from step 1046 back to step 1006 after having cleared the indicators corresponding to which registration records have been updated. Operation then proceeds as previously described in connection with the method 1000.

Various additional features and embodiments will now be discussed in connection with the method 1000.

In some embodiments, the mode of operation timer expiry value is based on one or more of the expiry times included in the registration records of the set of existing registration records.

In some embodiments, operating in the second mode of operation further includes the step of instructing or controlling packet level policers used to gate or restrict packet traffic flow to the first network equipment device from unknown Internet Protocol address and port number pairs to increase the number of packets allowed to pass the policer. In some such embodiments, when the first network equipment device switches from the second mode of operation to the normal mode of operation, the first network equipment device instructs or controls the packet level policers used to gate or restrict packet traffic flow to the first network equipment device from unknown Internet Protocol address and port number pairs to decrease the number of packets allowed to pass the policer, e.g., to decrease the number before the aforementioned increase.

In some embodiments, treating the initial SIP registration request messages as a refresh SIP registration message includes: (i) resetting a refresh registration expiry timer for the determined address of record registration, and (ii) responding to the first initial SIP registration request message without relaying the first initial SIP registration request message to the registrar.

When referring to messages, SIP messages, SIP requests it should be understood that the IP packet headers which include the source IP address and port, destination IP address and port, protocol type are considered to be part of the request or message.

In some embodiments, when the first network equipment device is operating in the second mode of operation and has identified an existing matching registration record, the first network equipment device performs authentication operations in connection with the registration message, generating or obtaining a challenge from the existing matching registration record and sending it to the end device from which the first initial registration message was received and then verifying the response to the challenge from the end device before updating the existing registration record.

In some embodiments, such as those in which the first network equipment device first mode of operation is a standby mode of operation, the existing registration records are generated by another network equipment device that the first network equipment device is monitoring for a failure condition, the failure condition being the first condition discussed in 1008. The existing registration records corresponding to active registrations being handled by the network equipment device being monitored by the first network equipment device. The existing registration records having synchronized AOR, source IP address and port information but TCP sequence numbers. The lack of the requirement to have synchronized TCP sequence numbers for the registration connection eliminating the extensive and difficult processing which would be required for this activity if it would be done.

A discussion of features of embodiments which address NA(P)T resets and/or short term power failures/outages affecting user devices will now be discussed and how throttling of messages is achieve which protects the registrar from an avalanche of initial SIP registration requests while also minimizing impacts on service, e.g., interruptions due to delays in re-registrations after connection losses of short durations. These features take advantage of the fact that many of the registration expiration timers at the network equipment device for the affected user devices have not yet expired.

In the some embodiments the first mode of operation is the regular mode of operation for handling registration messages described in signaling diagram/method 200. The first condition is a condition indicative of power outage affecting a plurality of user equipment devices being serviced by the first network equipment device or a reset of a NA(P)T device through which a plurality of user equipment devices are receiving services from the first network equipment device. In some embodiments, the condition indicative of power outage affecting a plurality of user equipment devices being serviced by the first network equipment device includes a condition in which the most recent or last initial REGISTER rate (i.e., rate of receipt of initial REGISTER request messages over a predetermined time period) exceeds an average initial REGISTER rate (rate of receipt of initial REGISTER messages averaged over a number of the predetermined time periods or a running average). In some embodiments, operating in the first mode of operation includes as part of monitoring for the existence of the first condition: measuring the rate of receipt of initial registration request messages during a predefined time period on an on-going periodic basis, generating based on the on-going periodic basis measured rates of receipt of initial registration request messages an average rate of receipt of initial registration request messages and determining when the most recent rate of receipt of initial registration request messages exceeds a first threshold rate of receipt of initial registration request messages. The first threshold rate of receipt of initial registration request messages being based on the average rate of receipt of initial registration request messages.

Typically with such embodiments, the second condition being monitored for by the first network equipment device in step 1012 while the first network equipment device is operating in the second mode of operation is that the rate of the most recent rate of receipt of initial registration request messages is less than a second threshold rate of receipt of initial registration request messages. In some embodiments the second threshold rate of receipt of initial registration request messages is based on the average rate of receipt of initial registration request messages. In some embodiments, the average rate is the average rate calculated by the first network equipment device entering the second mode of operation and in other embodiments the average rate continues to be periodically generated including information while the first network equipment device is operating in the second mode of operation. In each case, the first network equipment device continues to measure the rate of receipt of initial registration request messages during the predefined time period on an on-going periodic basis. In addition to monitoring for the change in the rate of receipt of initial SIP registration request messages as part of the second condition the first network equipment device also monitors for the detection of the completion of the updating a threshold number of registration records of the set of existing registration records. The threshold number may, and in some embodiments is, the number of existing registration records at the time of switchover to the second mode of operation excluding the number of registration which has since expired and been deleted.

A discussion of features of embodiments which address longer power failures/outages affecting user devices being serviced by the first network equipment device will now be discussed and how throttling of messages is achieve which protects the registrar from an avalanche of initial SIP registration requests while also minimizing impacts on service, e.g., interruptions due to delays in re-registrations after connection losses of long durations but not longer than the registration expiry time of the first network equipment device to registrar for the connection. These features take advantage of the fact that many of the registration expiration timers at the network equipment device for the affected user devices have not yet expired or the corresponding network equipment device/registrar registration connection have not expired.

In various embodiments which address the longer power outages affecting user devices, the monitoring for a first condition step further includes the steps of the first network equipment device while operating in the first mode of operation: (i) measuring the rate of receipt to refresh registration messages during a predefined time period on an on-going periodic basis and generating based on the on-going periodic basis measured rates of receipt of refresh messages an average rate of receipt of refresh registration messages. In some of the embodiments, the first network equipment device determines that the first condition exists when the most recent rate of receipt of refresh registration messages is below a first threshold rate of receipt of refresh registration messages. The first threshold rate of receipt of refresh registration messages being based on the average rate of receipt of refresh registration request messages (e.g., being significantly below such as for example 40% below the average rate of receipt of refresh registration request messages). When the first network equipment device enters the second mode of operation upon detecting this first condition which is an indication of long term power outage, the first network equipment device disables or ignores its end device/network equipment device registration expiry timer and does not delete registrations or registration records until the expiration of the network equipment device/registrar registrar expiry timer expires. That is when the first network equipment device is operating in the second mode of operation, the first network equipment device only deletes existing registration records upon failure to receive a refresh register message or a first initial register message matched to an existing registration record before the expiration of the time by which the first network equipment device is required to transmit a refresh register message to the registrar to avoid a timeout of the registration by the registrar. Thereby taking advantage of the longer expiration times between the first network equipment device and the registrar registration connections.

In these embodiments directed to the longer power outages, the second condition monitored for in step 1012 may, and in some embodiments is, that a threshold number of registration records existing at the time of the switchover from the first mode of operation to the second mode of operation has either been updated or expired based on the timeout of the registration by the registrar (e.g., registrar registration timer expiration).

As previously discussed in connection with some embodiments directed to long term power outages instead of measuring the rate of receipt of refresh SIP registration messages, the most recent measured rate of expirations of the UE/network device registration connections as compared to the average rate of UE/network expirations may be used. In such instances, if the most recent rate of expiration is much higher than the average rate, e.g., exceeds a certain threshold, then the first condition will be considered to be satisfied.

Figure 11:
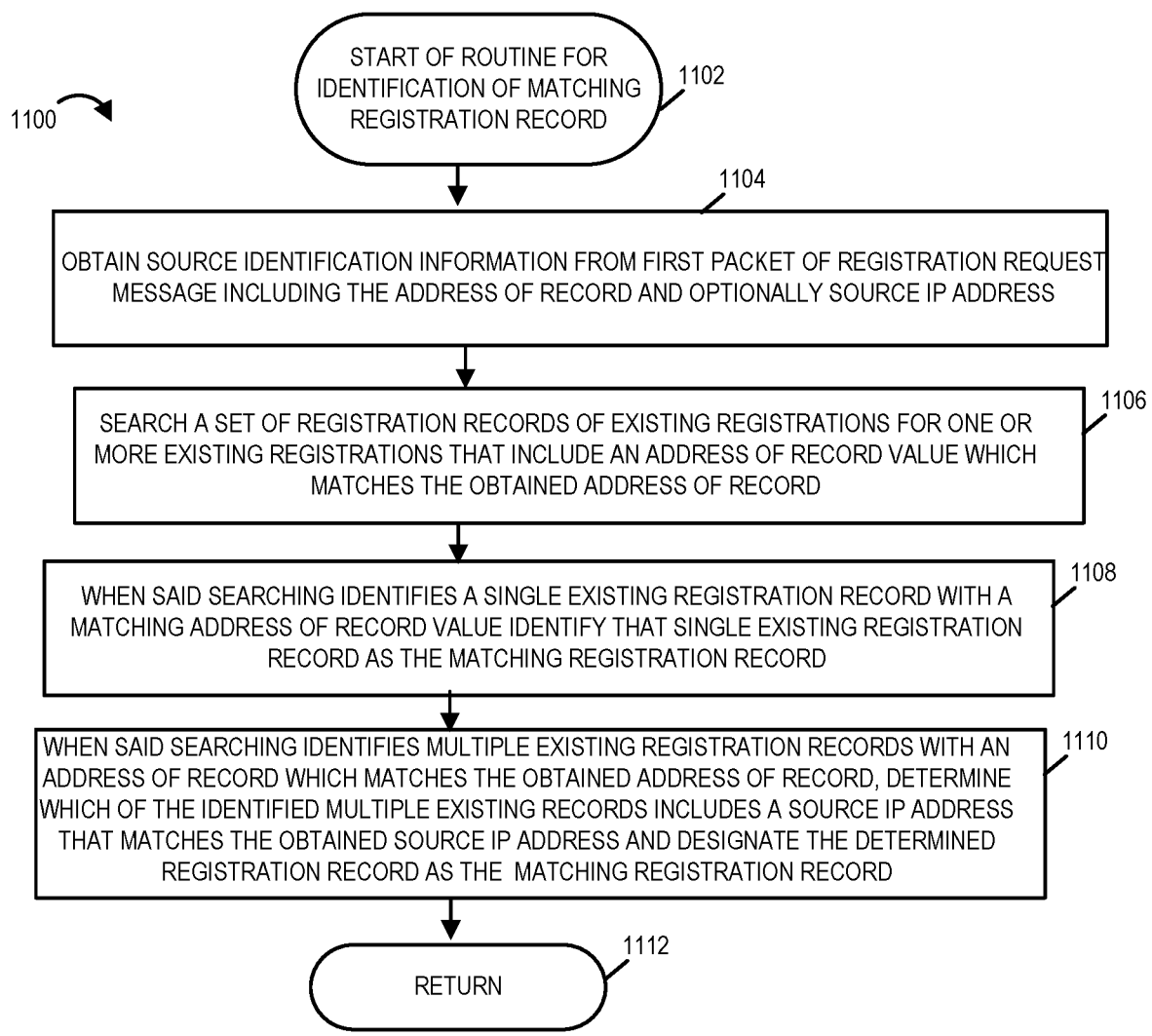
FIG. 11 illustrates a routine for identifying an existing registration record based on source identification information included in a registration message in accordance with one embodiment of the present invention.

FIG. 11 illustrates an exemplary routine/method 1100 for use in identifying registration records which match registration messages which may be, and in some embodiments is, used by a network equipment device in accordance with an embodiment of the present invention.

Operation begins in start step 1102 and proceeds to step 1104.

In step 1104, the first network equipment device obtains source identification information from the first packet of a registration request message, e.g., initial SIP registration request message, including the address of record (AOR), and optionally source IP address. Operation proceeds from step 1104 to step 1106.

In step 1106, the first network equipment device searches a set of registration records of existing registrations for one or more existing registrations that include an address of record value which matches the obtained address of record value. Operation proceeds from step 1106 to step 1108.

In step 1108, when the searching identifies a single existing registration record with a matching address of record value that single existing registration record is identified by the first network equipment device as the registration record which matches the registration request message. Operation proceeds from step 1108 to step 1110.

In step 1110, when the searching in step 1106 identifies multiple existing registration records with an address of record value that matches the obtained address of record, the first network equipment device determines which of the identified multiple existing registration records includes a source IP address that matches the obtained source IP address and designates the determined registration record as the registration record which matches the registration request message. Operation proceeds from step 1110 to step 1112.

In step 1112, the routine/method ends and processing returns to the method/routine which called the routine 1100.

Exemplary assembly of components for the network equipment device, communications device, e.g., end device, and registrar will now be discussed.

An exemplary assembly of components 500 for a network equipment device, (e.g., Session Border Controller), which may be included in the exemplary network equipment device 400 implemented in accordance with one embodiment of the present invention is illustrated in FIG. 5. The components in the assembly of components 500 can, and in some embodiments are, implemented fully in hardware within a processor, e.g., processor 406, e.g., as individual circuits. The components in the assembly of components 500 can, and in some embodiments are, implemented fully in hardware within the assembly of hardware components 419, e.g., as individual circuits corresponding to the different components. In other embodiments some of the components are implemented, e.g., as circuits, within processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the network equipment device 400, with the components controlling operation of network equipment device 400 to implement the functions corresponding to the components when the components are executed by a processor e.g., processor 406. In some such embodiments, the assembly of components 500 is included in the memory 410 as assembly of software components 418. In still other embodiments, various components in assembly of components 500 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 500 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the network equipment device 400 or elements therein such as the processor 406, to perform the functions of corresponding steps illustrated and/or described in the method of one or more of the flowcharts, signaling diagrams and/or described with respect to any of the Figures. Thus the assembly of components 500 includes various components that perform functions of corresponding one or more described and/or illustrated steps of an exemplary method.

The exemplary assembly of components 500 include the following components: a control routines component 502, a communications component 504, a message processing component 506, monitoring component 508, message generation component 510, timer component 512, a registration record management component 514, a search and identification component 516, a registration message process handling component 518, packet policer component 520, user equipment device registration timer expiry component 522, registration network equipment to registrar timer expiry and refresh component 524, a mode of operation component 526, and a determination component 528.

The control routines component 502 controls the operation of the network equipment device.

The communications component 504 performs communications operations for incoming and outgoing signals and messages, e.g., generating messages, receiving and processing messages in accordance with the various supported communications protocols.

The message processing component 506 processes received messages including for example processing initial registration request message, refresh registration messages, generating authentication challenges, and performing authentication of credentials. In some embodiments, the message processing component is a sub-component of the communications component 504.

The monitoring component 508 monitors for when specified conditions exist for example when a condition indicating a network equipment failure exists, when condition indicating a short term power outage affecting user equipment devices being serviced by the network equipment device exists, when condition indicating a network address (or port) translation device in communication with the network equipment device has gone through a reset, when a condition indicating a long term power outage affecting user equipment devices being serviced by the network equipment device exists, when a threshold condition has been met, when a threshold of expirations of UE registration expiry timers at the network equipment device has been met during over time period.

The message generation component 510 generates and/or relays messages including for example, initial registration request messages, response messages, registration rejection response messages, registration success response messages, registration authentication challenge messages, refresh registration request messages, response to service request messages, TCP reset messages. The message generation component 510 in some embodiments is included as a sub-component of the communications component 504.

The timer component 512 includes one or more timers for tracking the passage of time including mode of operation timer for measuring the duration of timer until switching modes, network equipment device registration expiry timers for determining when a registration connection between an end device and the network equipment device will expire if no refresh registration message is received, a network equipment device registration expiry timer for determining when a registration connection between the network equipment device and the registrar will expire if the registrar doesn't receive a refresh message from the network equipment device, a network equipment refresh timer for determining when a refresh message is to be sent to the registrar to keep the registration connection from expiring.

The registration record management component 514 manages registration records including the creation, updating, synchronizing, storing, searching and deletion of registration records.

The search component 516 performs searches for registration records (e.g., contexts) which match criteria, e.g., AOR or optionally AOR and source IP address included in a received registration message. In some embodiments, the search component implements the method 1100 illustrated in FIG. 11.

The registration message process handling component 518 is configured to process received registration messages, e.g., to perform processing steps of the various methods disclosed relating to the handling and response to received registration messages.

The packet policer component 520 polices incoming messages directed to the network equipment device and controls the adjustment of the number of messages with unknown source IP and port number pair to be allowed to pass the policer.

The user equipment device registration timer expiry component 522 is a timer that determines when an active registration is to expire or timeout if a refresh request message is not received or the refresh timer reset before the timer expiration. In some embodiments, component 522 is a sub-component of timer component 512.

The registration NE to registrar timer expiry and refresh component 524 is configured to determine when an active registration between the network equipment device and registrar is to expire at the registrar if a refresh message is not received from the network equipment device at the registrar. The component 524 also determines and sends refresh messages to the registrar to ensure that a registration does not expire unless the registration has expired because of intentional termination or expiration of user equipment registration timer because of a failure to receive a refresh from the corresponding user equipment device.

The determination component 526 makes various determinations for the network equipment device including for example whether a condition exists, when a threshold has been met or exceeded, what mode of operation to switch to, what registration procedures are to be carried out in the mode of operation in which the network device is currently operating, when a timer has expired, when a refresh registration message is to be sent to the registrar, when a received initial registration request is to be treated as a refresh registration request, when an initial registration request is to be relayed to the registrar, when throttling of registration messages sent to a registrar via the network equipment device is to be implemented and the level of throttling to be implemented.

An exemplary assembly of components 700 for a registrar (e.g., SIP registrar), which may be included in the exemplary registrar 600 implemented in accordance with one embodiment of the present invention is illustrated in FIG. 7. The components in the assembly of components 700 can, and in some embodiments are, implemented fully in hardware within a processor, e.g., processor 606, e.g., as individual circuits. The components in the assembly of components 700 can, and in some embodiments are, implemented fully in hardware within the assembly of hardware components 619, e.g., as individual circuits corresponding to the different components. In other embodiments some of the components are implemented, e.g., as circuits, within processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the registrar 600, with the components controlling operation of registrar 600 to implement the functions corresponding to the components when the components are executed by a processor e.g., processor 606. In some such embodiments, the assembly of components 700 is included in the memory 610 as assembly of software components 618. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the registrar 600 or elements therein such as the processor 606, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

The exemplary assembly of components 700 include the following components: a control routines component 702, a communications component 704, a message processing component 706, registration authentication component 708, registration expiry timer component 710, message generation component 712, and a determination component 714.

The control routines component 702 controls the operation of the registrar device.

The communications component 704 performs communications operations for incoming and outgoing signals and messages, e.g., generating messages, receiving and processing messages in accordance with the various supported communications protocols.

The message processing component 706 processes received messages including for example processing initial registration request message, refresh registration messages, generating authentication challenges, and performing authentication of credentials. In some embodiments, the message processing component is a sub-component of the communications component 704.

The registration authentication component 708 performs operations for challenging and authenticating registration and other service requests.

The registration expiry timer component 710 is a timer that determines when an active registration is to expire or timeout if a refresh request message is not refreshed before the timer expiration.

The message generation component 712 generates messages including for example, response messages, registration rejection response messages, registration successfully messages, registration authentication challenge messages refresh registration request messages, response to service request messages. The message generation component 712 in some embodiments is included as a sub-component of the communications component 704.

The determination component 714 makes various determinations for the registrar including for example whether to send a challenge in response to a registration request, accept the registration request and register the address of record and send a registration success message, or reject a registration request.

An exemplary assembly of components 900 for a communications device, e.g. end device (e.g., user equipment device), which may be included in the exemplary communications device/system 800 implemented in accordance with one embodiment of the present invention is illustrated in FIG. 9. The components in the assembly of components 900 can, and in some embodiments are, implemented fully in hardware within a processor, e.g., processor 806, e.g., as individual circuits. The components in the assembly of components 900 can, and in some embodiments are, implemented fully in hardware within the assembly of hardware components 819, e.g., as individual circuits corresponding to the different components. In other embodiments some of the components are implemented, e.g., as circuits, within processor 806 with other components being implemented, e.g., as circuits within assembly of components 819, external to and coupled to the processor 806. As should be appreciated the level of integration of components on the processor and/or with some components being external to the processor may be one of design choice. Alternatively, rather than being implemented as circuits, all or some of the components may be implemented in software and stored in the memory 810 of the communications device 800, with the components controlling operation of communications device 800 to implement the functions corresponding to the components when the components are executed by a processor e.g., processor 806. In some such embodiments, the assembly of components 900 is included in the memory 810 as assembly of software components 818. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 806, configure the processor to implement the function corresponding to the component. In embodiments where the assembly of components 900 is stored in the memory 810, the memory 810 is a computer program product comprising a computer readable medium comprising code, e.g., individual code for each component, for causing at least one computer, e.g., processor 806, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the communications device 800 or elements therein such as the processor 806, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

The exemplary assembly of components 900 include the following components: a control routines component 902, a communications component 904, a message processing component 906, a message generation component 908, a registration component 910, and a determination component 912.

The control routines component 902 controls the operation of the communications device.

The communications component 904 performs communications operations for incoming and outgoing signals and messages, e.g., generating messages, receiving and processing messages in accordance with the various supported communications protocols.

The message processing component 906 processes received messages including for example generating responses to authentication challenges and resetting TCP connections in response to TCP RST messages. In some embodiments, the message processing component is a sub-component of the communications component 904.

The message generation component 908 generates messages including initial registration request messages, e.g., initial SIP registration request messages, refresh registration request messages, service request messages, responses messages, e.g., messages responding to challenges. The message generation component 908 in some embodiments is included as a sub-component of the communications component.

The registration component 910 performs operation for requesting, obtaining, and keeping registrations with servers (e.g., SIP servers) active, e.g., sending refresh requests.

The determination component 912 makes various determinations for the communications device including when to send initial SIP registration messages and refresh SIP registration messages.

In various embodiments of the present invention, the primary and secondary network equipment devices of system 100 are components of a redundancy network equipment device, e.g., high availability network equipment device which utilizes a shared interface, e.g., shared IP address. In some such embodiments, the monitoring and detection of various conditions, e.g., conditions indicative of a primary network equipment device failure, conditions indicative of a short term power outage affecting end devices, conditions indicative of a long term power outage affecting end devices, conditions indicative of a NA(P)T device reset/reboot, is performed by the redundancy network equipment device. In some embodiments, the redundancy network equipment device includes an additional processor and memory wherein the memory includes control routines, e.g., executable instructions, that when executed by the additional processor control the operation of the redundancy network equipment device to monitor and detect conditions and change from one mode of operation to another mode of operation. In some embodiments, the redundancy network equipment device operates in the regular mode of operation as discussed in connection with signaling diagram/method 200 until it detects one of the following: (i) a condition indicative of the failure of the primary network equipment device, (ii) a condition indicative of a short term power outage affecting end devices it is servicing, (iii) a condition indicative of a NA(P)T reset/robot of NA(P)T affecting TCP connections established between the NA(P)T and the redundancy network equipment device, or (iv) a condition indicative of long term power outage affecting end devices being serviced by the redundancy network equipment device.

When the redundancy network equipment device detects a condition indicative of the failure of the primary network equipment device, the redundancy network equipment device switches to a mode of operation in which it handles registration messages as discussed in connection with the signaling diagram/method 300 illustrated in FIG. 3. When the redundancy network equipment device detects a condition indicative of a short term power outage affecting end devices it is servicing or a condition indicative of a NA(P)T reset/robot of NA(P)T affecting TCP connections established between the NA(P)T and the redundancy network equipment device, the redundancy network equipment device switches to a mode of operation in which it handles registration messages as discussed in connection with the signaling diagram/method 300 illustrated in FIG. 3 with the exceptions of steps 3008, 3012, 3014, 3016, 3020, and 3022 as power outage and/or NA(P)T reset or reboot will cause the closure of the TCP connections between the end device and the redundancy network equipment device and between the NA(P)T and the redundancy network equipment device. When the redundancy network equipment device detects the condition indicative of a long term power outage affecting end devices being serviced by the redundancy network equipment device, the redundancy network equipment device switches to a mode of operation in which the registration message handling operations described in the pseudocode 14 of FIG. 14 are implemented.

Various exemplary embodiments illustrating different features of the present invention will now be discussed.

LIST OF A SET OF EXEMPLARY NUMBERED METHOD EMBODIMENTS

Method Embodiment 1

A communications method, the method comprising: operating a first network equipment device in a first mode of operation; monitoring, at a first network equipment device, for a first condition; when said first network equipment device detects that said first condition exists, switching the first network equipment device from said first mode of operation to a second mode of operation, said second mode of operation including: receiving, by the first network equipment device, a first initial SIP registration request message destined for a registrar; determining, by the first network equipment device, an address of record value included in the first initial SIP registration request message; determining, by the first network equipment device, whether or not a matching registration record exists for the determined address of record value included in the first initial SIP registration request message; and when the first network equipment device determines that a matching registration record exists for the determined address of record value included in the initial SIP registration request message, treating, by the first network equipment device, said first initial SIP registration request message as a refresh SIP registration message.

Method Embodiment 2

The method of method embodiment 1, wherein said first network equipment device is a first Session Border Controller positioned between a first user equipment device and the registrar, said first initial SIP registration request message being received from the first user equipment device over a TCP connection established in response to a TCP reset message transmitted to the first user equipment device from the first Session Border Controller.

Method Embodiment 3

The method of method embodiment 2, wherein prior to receiving said first initial SIP registration request message at the first network equipment device transmitting said TCP reset message to the first user equipment device in response to receiving a first refresh SIP registration message from the first user equipment device over a second TCP connection while operating in said second mode of operation.

Method Embodiment 4

The method of method embodiment 1, wherein the first network equipment device determines that a matching registration record does not exist for the determined address of record value included in the first initial SIP registration request message under the following conditions: (i) no existing registration record in the set of existing registration records includes the determined address of record value included in the first initial SIP registration request message, (ii) multiple existing registration records in the set of registration records include the same address of record as the determined address of record value included in the first initial SIP registration message but said multiple existing registration records do not include a source IP address matching a source IP address included in the first initial SIP registration request message, (iii) multiple existing registration records in the set of registration records include the same address of record and source IP address as the determined address of record value and the source IP address included in the first initial SIP registration message but do not include a source port number which matches a source port number included in the first initial SIP registration request message; and wherein said second mode of operation further includes: when said first network equipment device determines that a matching registration record does not exist for the determined address of record value included in the first initial SIP registration request message: (i) creating a new registration record for the determined address of record value included in the first initial SIP registration request message, and (ii) relaying the first initial SIP registration request message to the registrar.

Method Embodiment 5

The method of method embodiment 4, wherein relaying the first initial SIP registration request message to the registrar includes generating a new initial SIP registration request message based on the received first initial SIP registration request message and transmitting the new initial SIP registration request message to the SIP registrar.

Method Embodiment 6

The method of method embodiment 1, wherein said first network equipment device is a session border controller operating in a Session Initiation Protocol back to back user agent configuration positioned between a plurality of end devices and a SIP registrar (e.g., SIP Application Server that provides SIP registration services).

Method Embodiment 7

The method of method embodiment 1, wherein said first condition is a condition indicative of one or more of the following: a network equipment device having failed, one or more NAT devices or NAPT devices having reset, or a power outage affecting a plurality of end devices.

Method Embodiment 8

The method of method embodiment 1, further including while operating in said second mode of operation: receiving, by the first network equipment device, additional first initial SIP registration request messages destined for a registrar; determining, by the first network equipment device, an address of record value included in each of the additional first initial SIP registration request message; determining, by the first network equipment device, whether or not a matching registration record exists for each of the determined address of record values included in the corresponding additional first initial SIP registration request message; and when the first network equipment device determines that a matching registration record exists for the determined address of record value included in the additional initial SIP registration request message, treating, by the first network equipment device, said additional first initial SIP registration request message as a refresh SIP registration message.

Method Embodiment 9

The method of method embodiment 1, wherein said determining whether or not a registration record exists for the determined address of record value includes: searching, by the first network equipment device, a set of registration records of existing registrations for one or more existing registration records that include an address of record value which matches the determined address of record value included in the first initial SIP registration request message; and determining that a registration record exists for the determined address of record value when the searching identifies in the set of registration records of existing registrations a single existing record that includes the address of record value which matches the determined address of record value included in the first initial SIP registration request message.

Method Embodiment 10

The method of method embodiment 9, wherein said determining whether or not a registration record exists for the determined address of record value further includes: when more than one existing registration record in the set of existing recordation records includes the address of record value included in the first initial registration request message: determining whether a single existing record from the set of registration records of existing registrations includes an address of record value and a source IP address which matches the address of record value and a source IP address included in the first initial SIP registration request message; and when a single existing record from the set of registration records of existing registrations is determined to include the address of record value and the source IP address included in the first initial SIP registration request message determining that a registration record exists for the determined address of record value.

Method Embodiment 11

The method of method embodiment 9, further comprising: identifying, by the first network equipment device, a source Internet Protocol (IP) address and a port number from the received first initial SIP registration request message; updating a source IP address and a port number included in the identified existing registration record with the matching address of record value to be the identified source IP address and port number from the received first initial SIP registration request message.

Method Embodiment 12

The method of method embodiment 11, further comprising: storing in each existing registration record that is updated information indicating that the registration record has been updated.

Method Embodiment 13

The method of method embodiment 1, wherein said first mode of operation is a standby mode of operation; wherein said second mode of operation is an active mode of operation; and wherein said first condition is a condition indicative of a failure of another network equipment device.

Method Embodiment 14

The method of method embodiment 13, wherein said condition indicative of a failure of another network equipment device is the failure to receive a heartbeat signal from said another network equipment device.

Method Embodiment 15

The method of method embodiment 13, wherein said second mode of operation further includes: monitoring, at the first network equipment device, for a second condition; and when said first network equipment device detects that the second condition exists switching to a third mode of operation, said third mode of operation including: relaying additional received initial SIP registration request messages destined for the registrar to the registrar without determining whether or not a matching registration record exists for the determined address of record value of the additional received initial SIP registration request messages.

Method Embodiment 16

The method of method embodiment 15, further comprising: wherein operating in said second mode of operation further includes: starting a second mode of operation duration timer, said second mode of operation duration timer having a first expiration time; and wherein said second condition includes the expiration of the second mode of operation duration timer or completion of updating a first threshold number of registration records of the set of existing registration records.

Method Embodiment 17

The method of method embodiment 16, wherein the first threshold number is the number of registration records in the set of exiting registration records at the time the first network equipment device switches from the first mode of operation to the second mode of operation.

Method Embodiment 18

The method of method embodiment 17, further comprising: determining, by the first network equipment device, the first expiration time based on one or more of the expiry times included in the registration records of the set of existing registration records.

Method Embodiment 19

The method of method embodiment 16, wherein operating in said second mode of operation further includes: instructing packet level policers used to gate or restrict packet traffic flow to the first network equipment device from unknown Internet Protocol address and port number pairs to increase the number of packets allowed to be pass the policer.

Method Embodiment 20

The method of method embodiment 19, wherein operating in said third mode of operation further includes: instructing packet level policers used to gate or restrict packet traffic flow to the first network equipment device from unknown Internet Protocol address and port number pairs to decrease the number of packets allowed to be pass the policer.

Method Embodiment 21

The method of method embodiment 1, wherein said treating said first initial SIP registration request message as a refresh SIP registration message includes: resetting a refresh registration expiry timer for the determined address of record registration; and responding to the first initial SIP registration request message without relaying the first initial SIP registration request message to the registrar.

Method Embodiment 22

The method of method embodiment 1, wherein said second mode of operation further includes: sending, by the first network equipment device, a challenge (e.g., SIP 4XX message including challenge) to the received first initial SIP registration request message after identifying an existing registration record including an address of record value which matches the address of record value included in the first initial SIP registration request, said challenge being included in said existing registration record including the address of record value matching the address of record value included in the first SIP registration request; and verifying the response to the challenge based on information (e.g., credentials) included in the existing registration record including an address of record value which matches the address of record value included in the first initial SIP registration request.

Method Embodiment 23

The method of method embodiment 21, wherein said challenge and information used to verify the response to the challenge (e.g., credentials) are stored in the existing registration record with the address of record value matching the address of record value included in the first initial SIP registration request message before said first network equipment device switches from said first mode of operation to said second mode of operation.

Method Embodiment 24

The method of method embodiment 13, wherein said set of existing registration records are based upon registration records created by a second network equipment device prior to said first network equipment device switching from said first mode of operation to said second mode of operation, said set of existing registration records not including: (i) TCP sequence numbers, or (ii) TCP sequence numbers synchronized with the TCP sequence numbers included in the registration records created by the second network equipment device.

Method Embodiment 25

The method of method embodiment 11, further comprising: wherein the first network equipment device while operating in the first mode of operation: (i) measures the rate of receipt of initial registration request messages during a predefined time period on an on-going periodic basis; (ii) generates based on the on-going periodic basis measured rates of receipt of initial registration request messages an average rate of receipt of initial registration request messages; and wherein said first condition is determined to exist when the most recent rate of receipt of initial registration request messages exceeds a first threshold rate of receipt of initial registration request messages, said first threshold rate of receipt of initial registration request messages being based on said the average rate of receipt of initial registration request messages.

Method Embodiment 26

The method of method embodiment 25, wherein the first threshold rate of receipt of initial registration request messages is the average rate of receipt of initial registration request messages.

Method Embodiment 27

The method of method embodiment 25, further comprising: generating, by said first network equipment device, said set of existing registration records while operating in said first mode of operation prior to said detection of said first condition; in response to detecting a second condition while operating in said second mode of operation switching from operating in said second mode of operation back to operating in said first mode of operation; and when operating in said first mode of operation relaying, by said first network equipment device, received initial SIP registration request messages destined for the registrar to the registrar without determining whether or not a matching registration record exists for the determined address of record value included in said received initial SIP registration request messages.

Method Embodiment 28

The method of method embodiment 27, further comprising: wherein the first network equipment device while operating in the second mode of operation continues to: (i) measure the rate of receipt of initial registration request messages during a predefined time period on an on-going periodic basis; (ii) generate based on the on-going periodic basis measured rates of receipt of initial registration request messages an average rate of receipt of initial registration request messages; and wherein said detecting a second condition exists includes detecting when the most recent rate or receipt of initial registration request messages is less than a second threshold rate of receipt of initial registration request messages, said second threshold rate of receipt of initial registration request messages being based on said average rate of receipt of initial registration request messages or detecting the completion of updating a threshold number of registration records of the set of existing registration records.

Method Embodiment 29

The method of method embodiment 28, wherein the second threshold rate of receipt of initial registration request messages is the average rate of receipt of initial registration request messages.

Method Embodiment 30

The method of method embodiment 28, wherein the threshold number of registration records of the set of existing registration records is the number of existing registration records at the time the first network equipment device switched from the first mode of operation to the second mode of operation.

Method Embodiment 31

The method of method embodiment 11, further comprising: wherein the first network equipment device while operating in the first mode of operation: (i) measures the rate of receipt of refresh registration messages during a predefined time period on an on-going periodic basis; (ii) generates based on the on-going periodic basis measured rates of receipt of refresh registration messages an average rate of receipt of refresh registration messages; and wherein said first condition is determined to exist when the most recent rate of receipt of refresh registration messages is below a first threshold rate of receipt of refresh registration messages, said first threshold rate of receipt of refresh registration messages being based on the average rate of receipt of refresh registration request messages.

Method Embodiment 32

The method of method embodiment 31, wherein the first threshold rate of receipt of refresh registration messages is the average rate of receipt of refresh registration request messages.

Method Embodiment 33

The method of method embodiment 31, further comprising: generating, by said first network equipment device, said set of existing registration records while operating in said first mode of operation prior to said detection of said first condition; in response to detecting a second condition while operating in said second mode of operation switching from operating in said second mode of operation back to operating in said first mode of operation; and when operating in said first mode of operation relaying, by said first network equipment device, received initial SIP registration request messages destined for the registrar to the registrar without determining whether or not a matching registration record exists for the determined address of record value included in said received initial SIP registration request messages.

Method Embodiment 34

The method of method embodiment 33, further comprising: wherein the first network equipment device while operating in the second mode of operation continues to: (i) measure the rate of receipt of refresh registration messages during a predefined time period on an on-going periodic basis; (ii) generate based on the on-going periodic basis measured rates of receipt of refresh registration messages an average rate of receipt of refresh registration request messages; and wherein when the first network equipment device is operating in the second mode of operation, the first network equipment device only deletes existing registration records upon failure to receive a refresh register message or a SIP initial register message which matches an existing registration record before the expiration of the time by which the first network equipment device is required to transmit a refresh register message to the registrar to avoid timeout of the registration by the registrar; wherein said detecting a second condition exists includes determining whether each of the registration records existing at the time of the switchover from the first mode of operation to the second mode of operation has either been updated or expired based on the timeout of the registration by the registrar.

Method Embodiment 35

The method of method embodiment 34, wherein said first network equipment device determines that said second condition exists when it determines that each of the registration records existing at the time of the switchover from the first mode of operation to the second mode of operation has either been updated or expired based on the timeout of the registration by the registrar.

Method Embodiment 36

A communications method, the method comprising: operating a first network equipment device in a first mode of operation; monitoring, at a first network equipment device, for a first condition; when said first network equipment device detects that said first condition exists, switching the first network equipment device from said first mode of operation to a second mode of operation, said second mode of operation including: receiving, by the first network equipment device, a plurality of SIP registration messages from a plurality of user equipment devices destined for a registrar, each of said SIP registration messages including source identification information including: an address of record and a source IP address and port number pair; determining for each of the received SIP registration messages of the plurality of SIP registration messages, whether the received SIP registration message is an initial SIP registration request message or a refresh SIP registration request message; for each SIP packet determined to be an initial SIP registration request message determining based on at least some of said source identification information included in the corresponding initial SIP registration request message whether an existing registration record exists at the first network device; and when the first network equipment device determines that an existing registration record exists further determining whether said existing registration record has been updated and when said existing registration record has not been previously marked as updated: (i) treating, by the first network equipment device, said first initial SIP registration request message as a refresh SIP registration message, and (ii) marking said existing registration record as having been updated; and when the first network equipment device determines that an existing registration record does not exist or has been previously marked as updated relaying, by the first network equipment device, said first initial SIP registration request message to the registrar.

Method Embodiment 37

The method of method embodiment 36, wherein at least some of said source identification information includes only an address of record.

Method Embodiment 38

The method of method embodiment 37, wherein as least some of said source identification information includes only an address of record and a source Internet Protocol address and excludes the source port number.

Method Embodiment 39

The method of method embodiment 36, wherein said first network equipment device is a Session Border Controller positioned in a communication path between said plurality of user equipment devices and the registrar.

Method Embodiment 40

The method of method embodiment 39, wherein a Network Address and Port Translation device is positioned in a communications path between at least some of said plurality of user equipment devices and the Session Border Controller.

Method Embodiment 41

The method of method embodiment 39, wherein said received registration request messages are received over a TCP connection.

Method Embodiment 42

The method of method embodiment 39, wherein said first condition is a condition indicative of a power outage affecting a plurality of user equipment devices.

Method Embodiment 43

The method of method embodiment 36, wherein said first mode of operation is a standby mode of operation; wherein said second mode of operation is an active mode of operation; and wherein said first condition is a condition indicative of a failure of another network equipment device.

Method Embodiment 44

The method of method embodiment 43, wherein said condition indicative of a failure of another network equipment device is the failure to receive a heartbeat signal from said another network equipment device.

Method Embodiment 45

The method of method embodiment 43, wherein said second mode of operation further includes: monitoring, at the first network equipment device, for a second condition; and when said first network equipment device detects that the second condition exists switching to a third mode of operation, said third mode of operation including: relaying initial SIP registration request messages destined for the registrar received while operating in said third mode of operation to said registrar without determining whether or not a matching registration record exists.

Method Embodiment 46

The method of method embodiment 45, further comprising: wherein operating in said second mode of operation further includes: starting a second mode of operation duration timer, said second mode of operation duration timer having a first expiration time; and said second condition includes the expiration of the second mode of operation duration timer or completion of updating a first threshold number of registration records of the set of existing registration records.

Method Embodiment 47

The method of method embodiment 46, wherein the first threshold number is the number of registration records in the set of exiting registration records at the time the first network equipment device switches from the first mode of operation to the second mode of operation.

Method Embodiment 48

The method of method embodiment 47, further comprising: determining, by the first network equipment device, the first expiration time based on one or more of the expiry times included in the registration records of the set of existing registration records.

Method Embodiment 49

The method of method embodiment 46, wherein operating in said second mode of operation further includes: instructing packet level policers used to gate or restrict packet traffic flow to the first network equipment device from unknown Internet Protocol address and port number pairs to increase the number of packets allowed to be pass the policer.

Method Embodiment 50

The method of method embodiment 49, wherein operating in said third mode of operation further includes: instructing packet level policers used to gate or restrict packet traffic flow to the first network equipment device from unknown Internet Protocol address and port number pairs to decrease the number of packets allowed to be pass the policer.

Method Embodiment 51

The method of method embodiment 36, wherein said treating said initial SIP registration request message as a refresh SIP registration message includes: resetting a refresh registration expiry timer for the determined address of record registration; and responding to the initial SIP registration request message without relaying the first initial SIP registration request message to the registrar.

Method Embodiment 52

The method of method embodiment 36, wherein said second mode of operation further includes: sending, by the first network equipment device, a challenge (e.g., SIP 4XX message including challenge) to the received initial SIP registration request message after identifying an existing registration record including an address of record value which matches the address of record value included in the initial SIP registration request message, said challenge being included in said existing registration record including the address of record value matching the address of record value included in the first SIP registration request; and verifying the response to the challenge based on information (e.g., credentials) included in the existing registration record including an address of record value which matches the address of record value included in the first initial SIP registration request.

Method Embodiment 53

The method of method embodiment 51, wherein said challenge and information used to verify the response to the challenge (e.g., credentials) are stored in the existing registration record with the address of record value matching the address of record value included in the initial SIP registration request message before said first network equipment device switches from said first mode of operation to said second mode of operation.

Method Embodiment 54

The method of method embodiment 43, wherein said set of existing registration records are based upon registration records created by a second network equipment device prior to said first network equipment device switching from said first mode of operation to said second mode of operation, said set of existing registration records not including: (i) TCP sequence numbers, or (ii) TCP sequence numbers synchronized with the TCP sequence numbers included in the registration records created by the second network equipment device.

List of a Set of Exemplary Numbered Apparatus Embodiments

Apparatus Embodiment 1

A first network equipment device comprising: memory; a processor that controls the operations of the first network equipment device to: operate in a first mode of operation; monitor for a first condition; and when the first network equipment device detects that said first condition exists, switch from operating in said first mode of operation to operating in a second mode of operation, wherein said processor controls said first network equipment device when operating in said second mode of operation to: receive a first initial SIP registration request message destined for a registrar; determine an address of record value included in the first initial SIP registration request message; determine whether or not a matching registration record exists for the determined address of record value included in the first initial SIP registration request message; and when the first network equipment device determines that a matching registration record exists for the determined address of record value included in the initial SIP registration request message, said processor controls the first network equipment device to treat said first initial SIP registration request message as a refresh SIP registration message.

Apparatus Embodiment 2

The first network equipment device of apparatus embodiment 1, wherein said first network equipment device is a first Session Border Controller positioned between a first user equipment device and the registrar, said first initial SIP registration request message being received from the first user equipment device over a TCP connection established in response to a TCP reset message transmitted to the first user equipment device from the first Session Border Controller.

Apparatus Embodiment 3

The first network equipment device of apparatus embodiment 2, wherein prior to receiving said first initial SIP registration request message at the first network equipment device, said processor controls the first network equipment device to transmit said TCP reset message to the first user equipment device in response to receiving a first refresh SIP registration message from the first user equipment device over a second TCP connection while operating in said second mode of operation.

Apparatus Embodiment 4

The first network equipment device of apparatus embodiment 1, wherein the first network equipment device is controlled by the processor to determine that a matching registration record does not exist for the determined address of record value included in the first initial SIP registration request message under the following conditions: (i) no existing registration record in the set of existing registration records includes the determined address of record value included in the first initial SIP registration request message, (ii) multiple existing registration records in the set of registration records include the same address of record as the determined address of record value included in the first initial SIP registration message but said multiple existing registration records do not include a source IP address matching a source IP address included in the first initial SIP registration request message, (iii) multiple existing registration records in the set of registration records include the same address of record and source IP address as the determined address of record value and the source IP address included in the first initial SIP registration message but do not include a source port number which matches a source port number included in the first initial SIP registration request message; and when said first network equipment device determines that a matching registration record does not exist for the determined address of record value included in the first initial SIP registration request message while operating in said second mode of operation said processor controls the first network equipment device to: (i) create a new registration record for the determined address of record value included in the first initial SIP registration request message, and (ii) relay the first initial SIP registration request message to the registrar.

Apparatus Embodiment 5

The first network equipment device of apparatus embodiment 4, wherein the operation to relay the first initial SIP registration request message to the registrar includes generating a new initial SIP registration request message based on the received first initial SIP registration request message and transmitting the new initial SIP registration request message to the SIP registrar.

Apparatus Embodiment 6

The first network equipment device of apparatus embodiment 1, wherein said first network equipment device is a session border controller operating in a Session Initiation Protocol back to back user agent configuration positioned between a plurality of end devices and a SIP registrar (e.g., SIP Application Server that provides SIP registration services).

Apparatus Embodiment 7

The first network equipment device of apparatus embodiment 1, wherein said first condition is a condition indicative of one or more of the following: a network equipment device having failed, one or more NAT devices or NAPT devices having reset, or a power outage affecting a plurality of end devices.

Apparatus Embodiment 8

The first network equipment device of apparatus embodiment 1, wherein said processor further controls the first network equipment device while operating in said second mode of operation to perform the following operations: receive additional first initial SIP registration request messages destined for a registrar; determine an address of record value included in each of the additional first initial SIP registration request message; determine whether or not a matching registration record exists for each of the determined address of record values included in the corresponding additional first initial SIP registration request message; and when the first network equipment device determines that a matching registration record exists for the determined address of record value included in the additional initial SIP registration request message, treat, by the first network equipment device, said additional first initial SIP registration request message as a refresh SIP registration message.

Apparatus Embodiment 9

The first network device of apparatus embodiment 1, wherein said operation to determine whether or not a registration record exists for the determined address of record value includes: searching, by the first network equipment device, a set of registration records of existing registrations for one or more existing registration records that include an address of record value which matches the determined address of record value included in the first initial SIP registration request message; and determining that a registration record exists for the determined address of record value when the searching identifies in the set of registration records of existing registrations a single existing record that includes the address of record value which matches the determined address of record value included in the first initial SIP registration request message.

Apparatus Embodiment 10

The first network equipment device of apparatus embodiment 9, wherein said operation to determine whether or not a registration record exists for the determined address of record value further includes: when more than one existing registration record in the set of existing recordation records includes the address of record value included in the first initial registration request message performing the following operations: determine whether a single existing record from the set of registration records of existing registrations includes an address of record value and a source IP address which matches the address of record value and a source IP address included in the first initial SIP registration request message; and when a single existing record from the set of registration records of existing registrations is determined to include the address of record value and the source IP address included in the first initial SIP registration request message to make the determination that a registration record exists for the determined address of record value.

Apparatus Embodiment 11

The first network equipment device of apparatus embodiment 9, wherein said processor further controls the first network equipment device to perform the following operations while operating in the second mode of operation: identify a source Internet Protocol (IP) address and a port number from the received first initial SIP registration request message; and update a source IP address and a port number included in the identified existing registration record with the matching address of record value to be the identified source IP address and port number from the received first initial SIP registration request message.

Apparatus Embodiment 12

The first network equipment device of apparatus embodiment 11, wherein said processor further controls the first network equipment device to perform the following additional operation: store in each existing registration record that is updated information indicating that the registration record has been updated.

Apparatus Embodiment 13

The first network equipment device of apparatus embodiment 1, wherein said first mode of operation is a standby mode of operation; wherein said second mode of operation is an active mode of operation; and wherein said first condition is a condition indicative of a failure of another network equipment device.

Apparatus Embodiment 14

The first network equipment device of apparatus embodiment 13, wherein said condition indicative of a failure of another network equipment device is the failure to receive a heartbeat signal from said another network equipment device.

Apparatus Embodiment 15

The first network equipment device of apparatus embodiment 13, wherein said processor further controls the first network equipment device to perform the following operations while said first network equipment device is operating in the second mode of operation: monitor for a second condition; and when said first network equipment device detects that the second condition exists switch from operating in said second mode of operation to operating in a third mode of operation, said processor controls said first network equipment device when operating in said second mode of operation to perform the following operation: relay additional received initial SIP registration request messages destined for the registrar to the registrar without determining whether or not a matching registration record exists for the determined address of record value of the additional received initial SIP registration request messages.

Apparatus Embodiment 16

The first network equipment device of apparatus embodiment 15, further comprising: wherein said processor further controls the first network equipment device to perform the following additional operations while operating in the second mode of operation: start a second mode of operation duration timer, said second mode of operation duration timer having a first expiration time; and wherein said second condition includes the expiration of the second mode of operation duration timer or completion of updating a first threshold number of registration records of the set of existing registration records.

Apparatus Embodiment 17

The first network equipment device of apparatus embodiment 16, wherein the first threshold number is the number of registration records in the set of exiting registration records at the time the first network equipment device switches from the first mode of operation to the second mode of operation.

Apparatus Embodiment 18

The first network equipment device of apparatus embodiment 17, wherein the processor further controls the first network equipment device to determine the first expiration time based on one or more of the expiry times included in the registration records of the set of existing registration records.

Apparatus Embodiment 19

The first network equipment device of apparatus embodiment 16, wherein said processor further controls the first network equipment device while operating in said second mode of operation to instruct packet level policers used to gate or restrict packet traffic flow to the first network equipment device from unknown Internet Protocol address and port number pairs to increase the number of packets allowed to be pass the policer.

Apparatus Embodiment 20

The first network equipment device of apparatus embodiment 19, wherein the processor controls the first network equipment device while operating in said third mode of operation to: instruct packet level policers used to gate or restrict packet traffic flow to the first network equipment device from unknown Internet Protocol address and port number pairs to decrease the number of packets allowed to be pass the policer.

Apparatus Embodiment 21

The first network equipment device of apparatus embodiment 1, wherein said operation to treat said first initial SIP registration request message as a refresh SIP registration message includes: resetting a refresh registration expiry timer for the determined address of record registration; and responding to the first initial SIP registration request message without relaying the first initial SIP registration request message to the registrar.

Apparatus Embodiment 22

The first network equipment device of apparatus embodiment 1, wherein when operating in said second mode of operation said processor further controls the first network equipment device to perform the following operations: send a challenge (e.g., SIP 4XX message including challenge) to the received first initial SIP registration request message after identifying an existing registration record including an address of record value which matches the address of record value included in the first initial SIP registration request, said challenge being included in said existing registration record including the address of record value matching the address of record value included in the first SIP registration request; and verify the response to the challenge based on information (e.g., credentials) included in the existing registration record including an address of record value which matches the address of record value included in the first initial SIP registration request.

Apparatus Embodiment 23

The first network equipment device of apparatus embodiment 22, wherein said challenge and information used to verify the response to the challenge (e.g., credentials) are stored in the existing registration record with the address of record value matching the address of record value included in the first initial SIP registration request message before said first network equipment device switches from said first mode of operation to said second mode of operation.

Apparatus Embodiment 24

The first network equipment device of apparatus embodiment 13, wherein said set of existing registration records are based upon registration records created by a second network equipment device prior to said first network equipment device switching from said first mode of operation to said second mode of operation, said set of existing registration records not including: (i) TCP sequence numbers, or (ii) TCP sequence numbers synchronized with the TCP sequence numbers included in the registration records created by the second network equipment device.

Apparatus Embodiment 25

The first network equipment device of apparatus embodiment 11, further comprising: wherein the first network equipment device while operating in the first mode of operation is controlled by the processor to perform the following operations: (i) measure the rate of receipt of initial registration request messages during a predefined time period on an on-going periodic basis; (ii) generate based on the on-going periodic basis measured rates of receipt of initial registration request messages an average rate of receipt of initial registration request messages; and wherein said first condition is determined to exist when the most recent rate of receipt of initial registration request messages exceeds a first threshold rate of receipt of initial registration request messages, said first threshold rate of receipt of initial registration request messages being based on said the average rate of receipt of initial registration request messages.

Apparatus Embodiment 26

The first network equipment device of apparatus embodiment 25, wherein the first threshold rate of receipt of initial registration request messages is the average rate of receipt of initial registration request messages.

Apparatus Embodiment 27

The first network equipment device of apparatus embodiment 25, wherein said processor further controls the first network equipment device to perform the following operations: generate said set of existing registration records while operating in said first mode of operation prior to said detection of said first condition; in response to detecting a second condition while operating in said second mode of operation switch from operating in said second mode of operation back to operating in said first mode of operation; and when operating in said first mode of operation relay received initial SIP registration request messages destined for the registrar to the registrar without determining whether or not a matching registration record exists for the determined address of record value included in said received initial SIP registration request messages.

Apparatus Embodiment 28

The first network equipment device of apparatus embodiment 27, wherein the first network equipment device while operating in the second mode of operation is controlled by the first processor to continue to: (i) measure the rate of receipt of initial registration request messages during a predefined time period on an on-going periodic basis; (ii) generate based on the on-going periodic basis measured rates of receipt of initial registration request messages an average rate of receipt of initial registration request messages; and wherein said detecting a second condition exists includes detecting when the most recent rate or receipt of initial registration request messages is less than a second threshold rate of receipt of initial registration request messages, said second threshold rate of receipt of initial registration request messages being based on said average rate of receipt of initial registration request messages or detecting the completion of updating a threshold number of registration records of the set of existing registration records.

Apparatus Embodiment 29

The first network equipment device of apparatus embodiment 28, wherein the second threshold rate of receipt of initial registration request messages is the average rate of receipt of initial registration request messages.

Apparatus Embodiment 30

The first network equipment of apparatus embodiment 28, wherein the threshold number of registration records of the set of existing registration records is the number of existing registration records at the time the first network equipment device switched from the first mode of operation to the second mode of operation.

Apparatus Embodiment 31

The first network equipment device of apparatus embodiment 11, wherein the first network equipment device while operating in the first mode of operation is further controlled by the processor to: (i) measure the rate of receipt of refresh registration messages during a predefined time period on an on-going periodic basis; (ii) generate based on the on-going periodic basis measured rates of receipt of refresh registration messages an average rate of receipt of refresh registration messages; and wherein said first condition is determined to exist when the most recent rate of receipt of refresh registration messages is below a first threshold rate of receipt of refresh registration messages, said first threshold rate of receipt of refresh registration messages being based on the average rate of receipt of refresh registration request messages.

Apparatus Embodiment 32

The first network equipment device of apparatus embodiment 31, wherein the first threshold rate of receipt of refresh registration messages is the average rate of receipt of refresh registration request messages.

Apparatus Embodiment 33

The first network equipment device of apparatus embodiment 31, wherein said processor further controls the first network equipment device to: generate said set of existing registration records while operating in said first mode of operation prior to said detection of said first condition; in response to detecting a second condition while operating in said second mode of operation switch from operating in said second mode of operation back to operating in said first mode of operation; and when operating in said first mode of operation relay received initial SIP registration request messages destined for the registrar to the registrar without determining whether or not a matching registration record exists for the determined address of record value included in said received initial SIP registration request messages.

Apparatus Embodiment 34

The first network equipment device of apparatus embodiment 33, wherein the first network equipment device while operating in the second mode of operation is controlled by the processor to continue to: (i) measure the rate of receipt of refresh registration messages during a predefined time period on an on-going periodic basis; (ii) generate based on the on-going periodic basis measured rates of receipt of refresh registration messages an average rate of receipt of refresh registration request messages; and wherein when the first network equipment device is operating in the second mode of operation, the first network equipment device only deletes existing registration records upon failure to receive a refresh register message or a SIP initial register message which matches an existing registration record before the expiration of the time by which the first network equipment device is required to transmit a refresh register message to the registrar to avoid timeout of the registration by the registrar; and wherein said detecting a second condition exists includes determining whether each of the registration records existing at the time of the switchover from the first mode of operation to the second mode of operation has either been updated or expired based on the timeout of the registration by the registrar.

Apparatus Embodiment 35

The first network equipment device of apparatus embodiment 34, wherein said first network equipment device is controlled by the processor to determine that said second condition exists when the first network equipment device determines that each of the registration records existing at the time of the switchover from the first mode of operation to the second mode of operation has either been updated or expired based on the timeout of the registration by the registrar.

Apparatus Embodiment 36

A first network equipment device comprising: a processor that controls the first network equipment device to operate in a first mode of operation; and while operating in the first mode of operation the processor controls the first network equipment device to: monitor, at a first network equipment device, for a first condition; and when said first network equipment device detects that said first condition exists, switch from operating in the first mode of operation to operating in a second mode of operation, and while operating in the second mode of operation to: receive a plurality of SIP registration messages from a plurality of user equipment devices destined for a registrar, each of said SIP registration messages including source identification information including: an address of record and a source IP address and port number pair; determine for each of the received SIP registration messages of the plurality of SIP registration messages, whether the received SIP registration message is an initial SIP registration request message or a refresh SIP registration request message; and for each SIP packet determined to be an initial SIP registration request message determine based on at least some of said source identification information included in the corresponding initial SIP registration request message whether an existing registration record exists at the first network device; and when the first network equipment device determines that an existing registration record exists further determine whether said existing registration record has been updated and when said existing registration record has not been previously marked as updated to: (i) treat, by the first network equipment device, said first initial SIP registration request message as a refresh SIP registration message, and (ii) mark said existing registration record as having been updated; and when the first network equipment device determines that an existing registration record does not exist or has been previously marked as updated to relay, by the first network equipment device, said first initial SIP registration request message to the registrar.

Apparatus Embodiment 37

The first network equipment device of apparatus embodiment 36, wherein at least some of said source identification information includes only an address of record.

Apparatus Embodiment 38

The first network equipment device of apparatus embodiment 37, wherein as least some of said source identification information includes only an address of record and a source Internet Protocol address and excludes the source port number.

Apparatus Embodiment 39

The first network equipment device of apparatus embodiment 36, wherein said first network equipment device is a Session Border Controller positioned in a communication path between said plurality of user equipment devices and the registrar.

Apparatus Embodiment 40

The first network equipment device of apparatus embodiment 39, wherein a Network Address and Port Translation device is positioned in a communications path between at least some of said plurality of user equipment devices and the Session Border Controller.

Apparatus Embodiment 41

The first network equipment device of apparatus embodiment 39, wherein said received registration request messages are received over a TCP connection.

Apparatus Embodiment 42

The first network equipment device of apparatus embodiment 39, wherein said first condition is a condition indicative of a power outage affecting a plurality of user equipment devices.

Apparatus Embodiment 43

The first network equipment device of apparatus embodiment 36, wherein said first mode of operation is a standby mode of operation; wherein said second mode of operation is an active mode of operation; and wherein said first condition is a condition indicative of a failure of another network equipment device.

Apparatus Embodiment 44

The first network equipment device of apparatus embodiment 43, wherein said condition indicative of a failure of another network equipment device is the failure to receive a heartbeat signal from said another network equipment device.

Apparatus Embodiment 45

The first network equipment device of apparatus embodiment 43, wherein while operating in said second mode of operation the processor further controls the first network equipment device to: monitor, at the first network equipment device, for a second condition; and when said first network equipment device detects that the second condition exists to switch to operating in a third mode of operation, wherein while operating in said third mode of operation said processor controls the first network equipment device to relay initial SIP registration request messages destined for the registrar received while operating in said third mode of operation to said registrar without determining whether or not a matching registration record exists.

Apparatus Embodiment 46

The first network equipment device of apparatus embodiment 45, wherein said processor further controls the first network equipment device while operating in said second mode of operation to: start a second mode of operation duration timer, said second mode of operation duration timer having a first expiration time; and wherein said second condition includes the expiration of the second mode of operation duration timer or completion of updating a first threshold number of registration records of the set of existing registration records.

Apparatus Embodiment 47

The first network equipment device of apparatus embodiment 46, wherein the first threshold number is the number of registration records in the set of exiting registration records at the time the first network equipment device switches from the first mode of operation to the second mode of operation.

Apparatus Embodiment 48

The first network equipment device of apparatus embodiment 47, wherein said processor further controls the first network equipment device to determine the first expiration time based on one or more of the expiry times included in the registration records of the set of existing registration records.

Apparatus Embodiment 49

The first network equipment device of apparatus embodiment 46, wherein said processor further controls the first network equipment device while operating in said second mode of operation to instruct packet level policers used to gate or restrict packet traffic flow to the first network equipment device from unknown Internet Protocol address and port number pairs to increase the number of packets allowed to be pass the policer.

Apparatus Embodiment 50

The first network equipment device of apparatus embodiment 49, wherein said processor further controls the first network equipment device while operating in said third mode of operation to instruct packet level policers used to gate or restrict packet traffic flow to the first network equipment device from unknown Internet Protocol address and port number pairs to decrease the number of packets allowed to be pass the policer.

Apparatus Embodiment 51

The first network equipment device of apparatus embodiment 36, wherein said to treat said initial SIP registration request message as a refresh SIP registration message includes performing the operations of: resetting a refresh registration expiry timer for the determined address of record registration; and responding to the initial SIP registration request message without relaying the first initial SIP registration request message to the registrar.

Apparatus Embodiment 52

The first network equipment device of apparatus embodiment 36, wherein the processor controls the first network equipment device while operating in said second mode of operation to: send a challenge (e.g., SIP 4XX message including challenge) to the received initial SIP registration request message after identifying an existing registration record including an address of record value which matches the address of record value included in the initial SIP registration request message, said challenge being included in said existing registration record including the address of record value matching the address of record value included in the first SIP registration request; and verify the response to the challenge based on information (e.g., credentials) included in the existing registration record including an address of record value which matches the address of record value included in the first initial SIP registration request.

Apparatus Embodiment 53

The first network equipment device of apparatus embodiment 51, wherein said challenge and information used to verify the response to the challenge (e.g., credentials) are stored in the existing registration record with the address of record value matching the address of record value included in the initial SIP registration request message before said first network equipment device switches from said first mode of operation to said second mode of operation.

Apparatus Embodiment 54

The first network equipment device of apparatus embodiment 43, wherein said set of existing registration records are based upon registration records created by a second network equipment device prior to said first network equipment device switching from said first mode of operation to said second mode of operation, said set of existing registration records not including: (i) TCP sequence numbers, or (ii) TCP sequence numbers synchronized with the TCP sequence numbers included in the registration records created by the second network equipment device.

List of Exemplary Numbered Computer Readable Medium Embodiments

Computer Readable Medium Embodiment 1

A non-transitory computer readable medium including a first set of computer executable instructions which when executed by a processor of a first network equipment device cause the first network equipment device to: operate in a first mode of operation and while operating in said first mode of operation to: monitor for a first condition; and when the first network equipment device detects that said first condition exists, switch from operating in said first mode of operation to operating in a second mode of operation, and while operating in said second mode of operation to: receive a first initial SIP registration request message destined for a registrar; determine an address of record value included in the first initial SIP registration request message; determine whether or not a matching registration record exists for the determined address of record value included in the first initial SIP registration request message; and when the first network equipment device determines that a matching registration record exists for the determined address of record value included in the initial SIP registration request message to treat by the first network equipment device said first initial SIP registration request message as a refresh SIP registration message.

Computer Readable Medium Embodiment 2

The computer readable medium embodiment of computer readable medium embodiment 1, wherein said determine whether or not a registration record exists for the determined address of record value includes: searching, by the first network equipment device, a set of registration records of existing registrations for one or more existing registration records that include an address of record value which matches the determined address of record value included in the first initial SIP registration request message; and determining that a registration record exists for the determined address of record value when the searching identifies in the set of registration records of existing registrations a single existing record that includes the address of record value which matches the determined address of record value included in the first initial SIP registration request message.

Computer Readable Medium Embodiment 3

The computer readable medium of computer readable medium embodiment 3, wherein said instructions further cause the first network equipment device to perform the following operations while operating in the second mode of operation: identify a source Internet Protocol (IP) address and a port number from the received first initial SIP registration request message; and update a source IP address and a port number included in the identified existing registration record with the matching address of record value to be the identified source IP address and port number from the received first initial SIP registration request message.

The techniques of various embodiments may be implemented using software, hardware and/or a combination of software and hardware. Various embodiments are directed to apparatus such as for example a network equipment device, session border controller, Registrar, SIP application server, communications devices, end devices, user devices, and/or network nodes. Various embodiments are also directed to methods, e.g., method of controlling and/or operating devices such as network equipment devices, session border controllers, SIP Application Server/Registrar, network nodes and/or communications devices, end devices or user devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a network equipment device, a session border controller, an end device, a user device, an application server, a registrar device including a processor configured to implement one, multiple or all of the steps of one or more methods of the invention.

In some embodiments, the processor or processors, e.g., CPUs, of one or more devices e.g., a network equipment device, a session border controller, an end device, a user device, an application server, a registrar device, are configured to perform the steps of the methods described as being performed by the device. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a network equipment device, a session border controller, an end device, a user device, an application server, a registrar device with a processor which includes a component corresponding to each of the steps of the various described methods performed by the device in which the processor is included. In some but not all embodiments a device, e.g., a network equipment device, a session border controller, an end device, a user device, an application server, a registrar device e.g., includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
 operating a first network equipment device in a first mode of operation;
 monitoring, at the first network equipment device, for a first condition;

when said first network equipment device detects that said first condition exists, switching the first network equipment device from said first mode of operation to a second mode of operation, said second mode of operation including:
receiving, by the first network equipment device, a first initial SIP registration request message destined for a registrar;
determining, by the first network equipment device, an address of record value included in the first initial SIP registration request message;
determining, by the first network equipment device, whether or not a matching registration record exists for the determined address of record value included in the first initial SIP registration request message; and
when the first network equipment device determines that a matching registration record exists for the determined address of record value included in the initial SIP registration request message, treating, by the first network equipment device, said first initial SIP registration request message as a refresh SIP registration message.

2. The method of claim 1, wherein said determining whether or not a matching registration record exists for the determined address of record value includes:
searching, by the first network equipment device, a set of registration records of existing registrations for one or more existing registration records that include an address of record value which matches the determined address of record value included in the first initial SIP registration request message; and
determining that a registration record exists for the determined address of record value when the searching identifies in the set of registration records of existing registrations a single existing registration record that includes the address of record value which matches the determined address of record value included in the first initial SIP registration request message.

3. The method of claim 2, further comprising:
identifying, by the first network equipment device, a source Internet Protocol (IP) address and a port number from the received first initial SIP registration request message; and
updating a source IP address and a port number included in the identified single existing registration record having the matching address of record value to be the identified source IP address and port number from the received first initial SIP registration request message.

4. The method of claim 1,
wherein said first mode of operation is a standby mode of operation;
wherein said second mode of operation is an active mode of operation; and
wherein said first condition is a condition indicative of a failure of another network equipment device.

5. The method of claim 4, wherein said second mode of operation further includes:
monitoring, at the first network equipment device, for a second condition; and
when said first network equipment device detects that the second condition exists switching to a third mode of operation, said third mode of operation including:
relaying additional received initial SIP registration request messages destined for the registrar to the registrar without determining whether or not a matching registration record exists for address of record values included in the additional received initial SIP registration request messages.

6. The method of claim 5,
wherein operating in said second mode of operation further includes:
starting a second mode of operation duration timer, said second mode of operation duration timer having a first expiration time; and
wherein said second condition includes expiration of the second mode of operation duration timer or completion of updating a first threshold number of registration records of a set of existing registration records.

7. The method of claim 3, further comprising:
wherein the first network equipment device while operating in the first mode of operation:
(i) measures the rate of receipt of initial registration request messages during a predefined time period on an on-going periodic basis;
(ii) generates, based on the on-going periodic basis measured rates of receipt of initial registration request messages, an average rate of receipt of initial registration request messages; and
wherein said first condition is determined to exist when the most recent rate of receipt of initial registration request messages exceeds a first threshold rate of receipt of initial registration request messages, said first threshold rate of receipt of initial registration request messages being based on the average rate of receipt of initial registration request messages.

8. The method of claim 7, further comprising:
generating, by said first network equipment device, said set of registration records of existing registrations while operating in said first mode of operation prior to said detection of said first condition;
in response to detecting a second condition while operating in said second mode of operation switching from operating in said second mode of operation back to operating in said first mode of operation; and
when operating in said first mode of operation relaying, by said first network equipment device, received initial SIP registration request messages destined for the registrar to the registrar without determining whether or not a matching registration record exists for the determined address of record value included in said received initial SIP registration request messages.

9. The method of claim 8, further comprising:
wherein the first network equipment device while operating in the second mode of operation continues to:
(i) measure the rate of receipt of initial registration request messages during a predefined time period on an on-going periodic basis;
(ii) generate, based on the on-going periodic basis measured rates of receipt of initial registration request messages, an average rate of receipt of initial registration request messages; and
wherein said detecting a second condition exists includes detecting when the most recent rate or receipt of initial registration request messages is less than a second threshold rate of receipt of initial registration request messages, said second threshold rate of receipt of initial registration request messages being based on said average rate of receipt of initial registration request messages or detecting the completion of updating a threshold number of registration records of the set of registration records of existing registrations.

10. The method of claim 3, further comprising:
wherein the first network equipment device while operating in the first mode of operation:

(i) measures the rate of receipt of refresh registration messages during a predefined time period on an on-going periodic basis;
(ii) generates, based on the on-going periodic basis measured rates of receipt of refresh registration messages, an average rate of receipt of refresh registration messages; and
wherein said first condition is determined to exist when the most recent rate of receipt of refresh registration messages is below a first threshold rate of receipt of refresh registration messages, said first threshold rate of receipt of refresh registration messages being based on the average rate of receipt of refresh registration request messages.

11. The method of claim 10, further comprising:
generating, by said first network equipment device, said set of registration record of existing registrations while operating in said first mode of operation prior to said detection of said first condition;
in response to detecting a second condition while operating in said second mode of operation switching from operating in said second mode of operation back to operating in said first mode of operation; and
when operating in said first mode of operation relaying, by said first network equipment device, received initial SIP registration request messages destined for the registrar to the registrar without determining whether or not a matching registration record exists for the determined address of record value included in said received initial SIP registration request messages.

12. A first network equipment device comprising:
memory;
a processor that controls the operations of the first network equipment device to:
operate in a first mode of operation;
monitor for a first condition; and
when the first network equipment device detects that said first condition exists, switch from operating in said first mode of operation to operating in a second mode of operation, wherein said processor controls said first network equipment device when operating in said second mode of operation to:
receive a first initial SIP registration request message destined for a registrar;
determine an address of record value included in the first initial SIP registration request message;
determine whether or not a matching registration record exists for the determined address of record value included in the first initial SIP registration request message; and
when the first network equipment device determines that a matching registration record exists for the determined address of record value included in the initial SIP registration request message, said processor controls the first network equipment device to treat said first initial SIP registration request message as a refresh SIP registration message.

13. The first network equipment device of claim 12, wherein said operating in the second mode of operation to determine whether or not a matching registration record exists for the determined address of record value includes:
searching, by the first network equipment device, a set of registration records of existing registrations for one or more existing registration records that include an address of record value which matches the determined address of record value included in the first initial SIP registration request message; and
determining that a registration record exists for the determined address of record value when the searching identifies in the set of registration records of existing registrations a single existing registration record that includes the address of record value which matches the determined address of record value included in the first initial SIP registration request message.

14. The first network equipment device of claim 13, wherein said processor further controls the first network equipment device to perform the following operations while operating in the second mode of operation:
identify a source Internet Protocol (IP) address and a port number from the received first initial SIP registration request message; and
update a source IP address and a port number included in the identified existing registration record having the matching address of record value to be the identified source IP address and port number from the received first initial SIP registration request message.

15. The first network equipment device of claim 12,
wherein said first mode of operation is a standby mode of operation;
wherein said second mode of operation is an active mode of operation; and
wherein said first condition is a condition indicative of a failure of another network equipment device.

16. The first network equipment device of claim 15, wherein said processor further controls the first network equipment device to perform the following operations while said first network equipment device is operating in the second mode of operation:
monitor for a second condition; and
when said first network equipment device detects that the second condition exists switch from operating in said second mode of operation to operating in a third mode of operation, said processor controls said first network equipment device when operating in said second mode of operation to perform the following operation:
relay additional received initial SIP registration request messages destined for the registrar to the registrar without determining whether or not a matching registration record exists for the determined address of record value of the additional received initial SIP registration request messages.

17. The first network equipment device of claim 14,
wherein the first network equipment device while operating in the first mode of operation is controlled by the processor to perform the following operations:
(i) measure the rate of receipt of initial registration request messages during a predefined time period on an on-going periodic basis;
(ii) generate, based on the on-going periodic basis measured rates of receipt of initial registration request messages, an average rate of receipt of initial registration request messages; and
wherein said first condition is determined to exist when the most recent rate of receipt of initial registration request messages exceeds a first threshold rate of receipt of initial registration request messages, said first threshold rate of receipt of initial registration request messages being based on the average rate of receipt of initial registration request messages.

18. The first network equipment device of claim 17, wherein said processor further controls the first network equipment device to perform the following operations:

generate said set of registration records of existing registrations while operating in said first mode of operation prior to said detection of said first condition;

in response to detecting a second condition while operating in said second mode of operation switch from operating in said second mode of operation back to operating in said first mode of operation; and when operating in said first mode of operation relay received initial SIP registration request messages destined for the registrar to the registrar without determining whether or not a matching registration record exists for the determined address of record value included in said received initial SIP registration request messages.

19. The first network equipment device of claim 14, wherein the first network equipment device while operating in the first mode of operation is further controlled by the processor to:

(i) measure the rate of receipt of refresh registration messages during a predefined time period on an on-going periodic basis;

(ii) generate, based on the on-going periodic basis measured rates of receipt of refresh registration messages, an average rate of receipt of refresh registration messages; and wherein said first condition is determined to exist when the most recent rate of receipt of refresh registration messages is below a first threshold rate of receipt of refresh registration messages, said first threshold rate of receipt of refresh registration messages being based on the average rate of receipt of refresh registration request messages.

20. A non-transitory computer readable medium including a first set of computer executable instructions which when executed by a processor of a first network equipment device cause the first network equipment device to:

operate in a first mode of operation and while operating in said first mode of operation to:

monitor for a first condition; and when the first network equipment device detects that said first condition exists, switch from operating in said first mode of operation to operating in a second mode of operation, and while operating in said second mode of operation to:

receive a first initial SIP registration request message destined for a registrar;

determine an address of record value included in the first initial SIP registration request message;

determine whether or not a matching registration record exists for the determined address of record value included in the first initial SIP registration request message; and when the first network equipment device determines that a matching registration record exists for the determined address of record value included in the initial SIP registration request message to treat by the first network equipment device said first initial SIP registration request message as a refresh SIP registration message.

* * * * *